US012578609B2

(12) United States Patent
Klawuhn et al.

(10) Patent No.: US 12,578,609 B2
(45) Date of Patent: Mar. 17, 2026

(54) METHODS OF CONTROLLING MULTI-ZONE TINTABLE WINDOWS

(71) Applicant: View, Inc., Milpitas, CA (US)

(72) Inventors: Erich Robert Klawuhn, Santa Barbara, CA (US); Stephen Clark Brown, San Mateo, CA (US); Dhairya Shrivastava, Los Altos, CA (US); Douglas S. Silkwood, San Jose, CA (US); Jason David Zedlitz, Rancho Cordova, CA (US); Trevor Gustav Frank, San Jose, CA (US); Charudatta Joshi, Fremont, CA (US); Thomas Anthony Gubiotti, Mountain View, CA (US)

(73) Assignee: View Operating Corporation, San Jose, CA (US)

( * ) Notice: Subject to any disclaimer, the term of this patent is extended or adjusted under 35 U.S.C. 154(b) by 0 days.

(21) Appl. No.: 17/931,014

(22) Filed: Sep. 9, 2022

(65) Prior Publication Data

US 2023/0004059 A1 Jan. 5, 2023

Related U.S. Application Data

(63) Continuation of application No. 15/762,077, filed as application No. PCT/US2016/055005 on Sep. 30, (Continued)

(51) Int. Cl.
*G02F 1/153* (2006.01)
*E06B 3/67* (2006.01)
(Continued)

(52) U.S. Cl.
CPC ............ *G02F 1/163* (2013.01); *E06B 3/6722* (2013.01); *E06B 9/24* (2013.01);
(Continued)

(58) Field of Classification Search
CPC .. E06B 3/6722; E06B 9/24; E06B 2009/2405; E06B 2009/2411;
(Continued)

(56) References Cited

U.S. PATENT DOCUMENTS 3,302,002 A 1/1967 Warren
3,963,347 A 6/1976 Segre et al.
(Continued)

FOREIGN PATENT DOCUMENTS

CN 1333807 A 1/2002
CN 1359479 A 7/2002
(Continued)

OTHER PUBLICATIONS

"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.
(Continued)

*Primary Examiner* — Mahidere S Sahle
(74) *Attorney, Agent, or Firm* — Cha & Reiter, LLC.

(57) ABSTRACT

Window controllers and methods for controlling tinting and other functions of tinting zones of multi-zone tintable windows and multiple tinting zones of a group of tintable windows.

12 Claims, 31 Drawing Sheets

Related U.S. Application Data 2016, now Pat. No. 11,635,666, which is a continuation-in-part of application No. 15/094,897, filed on Apr. 8, 2016, now Pat. No. 10,301,871, which is a continuation of application No. 14/137,644, filed on Dec. 20, 2013, now Pat. No. 9,341,912, which is a continuation-in-part of application No. PCT/US2013/069913, filed on Nov. 13, 2013, and a continuation-in-part of application No. PCT/US2013/031098, filed on Mar. 13, 2013.

(60) Provisional application No. 62/236,032, filed on Oct. 1, 2015, provisional application No. 61/740,651, filed on Dec. 21, 2012, provisional application No. 61/725,980, filed on Nov. 13, 2012, provisional application No. 61/610,241, filed on Mar. 13, 2012.

(51) Int. Cl.

| | |
|---|---|
| *E06B 9/24* | (2006.01) |
| *G02F 1/1335* | (2006.01) |
| *G02F 1/163* | (2006.01) |
| *G02B 5/23* | (2006.01) |
| *G02F 1/157* | (2006.01) |

(52) U.S. Cl.
CPC .. *G02F 1/133504* (2013.01); *G02F 1/133514* (2013.01); *G02F 1/133553* (2013.01); *E06B 2009/2405* (2013.01); *E06B 2009/2411* (2013.01); *E06B 2009/2464* (2013.01); *G02B 5/23* (2013.01); *G02F 1/157* (2013.01)

(58) Field of Classification Search
CPC ... E06B 2009/2464; G02B 5/23; G02F 1/163; G02F 1/133504; G02F 1/133514; G02F 1/13355; G02F 1/157
USPC .......................................... 359/245, 265, 275
See application file for complete search history.

(56) References Cited

U.S. PATENT DOCUMENTS

| | | |
|---|---|---|
| 4,129,861 A | 12/1978 | Giglia |
| 4,355,896 A | 10/1982 | Frosch et al. |
| 4,832,468 A | 5/1989 | Ito et al. |
| 4,923,289 A | 5/1990 | Demiryont |
| 5,076,673 A | 12/1991 | Lynam et al. |
| 5,124,833 A | 6/1992 | Barton et al. |
| 5,128,513 A | 7/1992 | Byars et al. |
| 5,140,455 A | 8/1992 | Varaprasad et al. |
| 5,142,407 A | 8/1992 | Varaprasad et al. |
| 5,145,609 A | 9/1992 | Varaprasad et al. |
| 5,151,816 A | 9/1992 | Varaprasad et al. |
| 5,170,108 A | 12/1992 | Peterson et al. |
| 5,187,607 A | 2/1993 | Endo et al. |
| 5,204,778 A | 4/1993 | Bechtel |
| 5,220,317 A | 6/1993 | Lynam et al. |
| 5,233,461 A | 8/1993 | Dornan et al. |
| 5,239,405 A | 8/1993 | Varaprasad et al. |
| 5,290,986 A | 3/1994 | Colon et al. |
| 5,340,503 A | 8/1994 | Varaprasad et al. |
| 5,353,148 A | 10/1994 | Eid et al. |
| 5,365,365 A | 11/1994 | Ripoche et al. |
| 5,379,146 A | 1/1995 | Defendini |
| 5,379,215 A | 1/1995 | Kruhoeffer et al. |
| 5,384,578 A | 1/1995 | Lynam et al. |
| 5,402,144 A | 3/1995 | Ripoche |
| 5,451,822 A | 9/1995 | Bechtel et al. |
| 5,471,338 A | 11/1995 | Yu et al. |
| 5,472,643 A | 12/1995 | Varaprasad et al. |
| 5,500,760 A | 3/1996 | Varaprasad et al. |
| 5,567,360 A | 10/1996 | Varaprasad et al. |
| 5,583,972 A | 12/1996 | Miller |

| | | |
|---|---|---|
| 5,598,000 A | 1/1997 | Popat |
| 5,621,526 A | 4/1997 | Kuze |
| 5,657,149 A | 8/1997 | Buffat et al. |
| 5,657,150 A | 8/1997 | Kallman et al. |
| 5,663,621 A | 9/1997 | Popat |
| 5,668,663 A | 9/1997 | Varaprasad et al. |
| 5,673,028 A | 9/1997 | Levy |
| 5,694,144 A | 12/1997 | Lefrou et al. |
| 5,724,175 A | 3/1998 | Hichwa et al. |
| 5,724,176 A | 3/1998 | Nishikitani et al. |
| 5,724,187 A | 3/1998 | Varaprasad et al. |
| 5,760,558 A | 6/1998 | Popat |
| 5,764,402 A | 6/1998 | Thomas et al. |
| 5,777,603 A | 7/1998 | Jaeger |
| 5,805,330 A | 9/1998 | Byker et al. |
| 5,814,195 A | 9/1998 | Lehan et al. |
| 5,822,107 A | 10/1998 | Lefrou et al. |
| 5,830,336 A | 11/1998 | Schulz |
| 5,900,720 A | 5/1999 | Kallman et al. |
| 5,910,854 A | 6/1999 | Varaprasad et al. |
| 5,953,150 A | 9/1999 | Smarto et al. |
| 5,956,012 A | 9/1999 | Turnbull et al. |
| 5,969,847 A | 10/1999 | Coleman et al. |
| 5,973,818 A | 10/1999 | Sjursen et al. |
| 5,973,819 A | 10/1999 | Pletcher et al. |
| 5,978,126 A | 11/1999 | Sjursen |
| 5,985,184 A | 11/1999 | Lynam |
| 5,995,271 A | 11/1999 | Zieba et al. |
| 6,001,487 A | 12/1999 | Ladang et al. |
| 6,002,511 A | 12/1999 | Varaprasad et al. |
| 6,039,390 A | 3/2000 | Agrawal et al. |
| 6,039,850 A | 3/2000 | Schulz |
| 6,045,643 A | 4/2000 | Byker et al. |
| 6,045,896 A | 4/2000 | Boire et al. |
| 6,055,088 A | 4/2000 | Fix et al. |
| 6,055,089 A | 4/2000 | Schulz et al. |
| 6,064,949 A | 5/2000 | Werner et al. |
| 6,074,279 A | 6/2000 | Yoshimura et al. |
| 6,084,231 A | 7/2000 | Popat |
| 6,084,700 A | 7/2000 | Knapp et al. |
| 6,094,292 A | 7/2000 | Goldner et al. |
| 6,118,573 A | 9/2000 | Kubo et al. |
| 6,125,327 A | 9/2000 | Kalenian |
| 6,130,448 A | 10/2000 | Bauer et al. |
| 6,130,772 A | 10/2000 | Cava |
| 6,143,209 A | 11/2000 | Lynam |
| 6,154,306 A | 11/2000 | Varaprasad et al. |
| 6,163,756 A | 12/2000 | Baron et al. |
| 6,166,849 A | 12/2000 | Coleman et al. |
| 6,178,034 B1 | 1/2001 | Allemand et al. |
| 6,204,953 B1 | 3/2001 | Zieba et al. |
| 6,207,083 B1 | 3/2001 | Varaprasad et al. |
| 6,222,177 B1 | 4/2001 | Bechtel et al. |
| 6,244,716 B1 | 6/2001 | Steenwyk et al. |
| 6,261,641 B1 | 7/2001 | Zieba et al. |
| 6,262,831 B1 | 7/2001 | Bauer et al. |
| 6,266,063 B1 | 7/2001 | Baron et al. |
| 6,317,248 B1 | 11/2001 | Agrawal et al. |
| 6,337,758 B1 | 1/2002 | Beteille et al. |
| 6,386,713 B1 | 5/2002 | Turnbull et al. |
| 6,398,118 B1 | 6/2002 | Rosen et al. |
| 6,407,468 B1 | 6/2002 | LeVesque et al. |
| 6,407,847 B1 | 6/2002 | Poll et al. |
| 6,433,913 B1 | 8/2002 | Bauer et al. |
| 6,449,082 B1 | 9/2002 | Agrawal et al. |
| 6,471,360 B2 | 10/2002 | Rukavina et al. |
| 6,493,128 B1 | 12/2002 | Agrawal et al. |
| 6,515,787 B1 | 2/2003 | Westfall et al. |
| 6,529,308 B2 | 3/2003 | Beteille et al. |
| 6,535,126 B2 | 3/2003 | Lin et al. |
| 6,559,411 B2 | 5/2003 | Borgeson et al. |
| 6,561,460 B2 | 5/2003 | Rukavina et al. |
| 6,567,708 B1 | 5/2003 | Bechtel et al. |
| 6,614,577 B1 | 9/2003 | Yu et al. |
| 6,639,709 B2 | 10/2003 | Vincent et al. |
| 6,749,103 B1 | 6/2004 | Ivanov et al. |
| 6,783,099 B2 | 8/2004 | Rukavina et al. |
| 6,795,226 B2 | 9/2004 | Agrawal et al. |
| 6,798,556 B2 | 9/2004 | Tench et al. |

(56)                References Cited

U.S. PATENT DOCUMENTS

| | | | |
|---|---|---|---|
| 6,819,367 | B1 | 11/2004 | Cava |
| 6,822,778 | B2 | 11/2004 | Westfall et al. |
| 6,829,511 | B2 | 12/2004 | Bechtel et al. |
| 6,853,472 | B2 | 2/2005 | Warner et al. |
| 6,856,444 | B2 | 2/2005 | Ingalls et al. |
| 6,862,125 | B2 | 3/2005 | Warner et al. |
| 6,897,936 | B1 | 5/2005 | Li et al. |
| 6,906,842 | B2 | 6/2005 | Agrawal et al. |
| 6,919,530 | B2 | 7/2005 | Borgeson et al. |
| 6,937,380 | B2 | 8/2005 | Fanton et al. |
| 6,940,627 | B2 | 9/2005 | Freeman et al. |
| 6,965,813 | B2 | 11/2005 | Granqvist et al. |
| 6,995,891 | B2 | 2/2006 | Agrawal et al. |
| 6,995,892 | B2 | 2/2006 | Fanton et al. |
| 7,002,720 | B2 | 2/2006 | Beteille et al. |
| 7,004,592 | B2 | 2/2006 | Varaprasad et al. |
| 7,033,655 | B2 | 4/2006 | Beteille et al. |
| 7,085,609 | B2 | 8/2006 | Bechtel et al. |
| 7,111,952 | B2 | 9/2006 | Veskovic |
| 7,114,643 | B2 | 10/2006 | Ivanov et al. |
| 7,130,101 | B2 | 10/2006 | Rukavina et al. |
| 7,133,181 | B2 | 11/2006 | Greer |
| 7,146,703 | B2 | 12/2006 | Ivanov |
| 7,173,750 | B2 | 2/2007 | Rukavina |
| 7,202,987 | B2 | 4/2007 | Varaprasad et al. |
| 7,215,318 | B2 | 5/2007 | Turnbull et al. |
| 7,230,748 | B2 | 6/2007 | Giron et al. |
| 7,248,392 | B2 | 7/2007 | Rukavina et al. |
| 7,256,923 | B2 | 8/2007 | Liu et al. |
| 7,277,215 | B2 | 10/2007 | Greer |
| 7,300,166 | B2 | 11/2007 | Agrawal et al. |
| 7,304,787 | B2 | 12/2007 | Whitesides et al. |
| 7,317,106 | B2 | 1/2008 | Warner et al. |
| 7,324,261 | B2 | 1/2008 | Tonar et al. |
| 7,333,258 | B2 | 2/2008 | Yang et al. |
| 7,362,491 | B2 | 4/2008 | Busick et al. |
| 7,372,610 | B2 | 5/2008 | Burdis et al. |
| 7,417,397 | B2 | 8/2008 | Berman et al. |
| 7,450,294 | B2 | 11/2008 | Weidner |
| 7,467,741 | B2 | 12/2008 | Wickersham, Jr. et al. |
| 7,531,101 | B2 | 5/2009 | Beteille |
| 7,542,809 | B2 | 6/2009 | Bechtel et al. |
| 7,548,833 | B2 | 6/2009 | Ahmed |
| 7,567,183 | B2 | 7/2009 | Schwenke |
| 7,588,067 | B2 | 9/2009 | Veskovic |
| 7,610,910 | B2 | 11/2009 | Ahmed |
| 7,649,668 | B2 | 1/2010 | Fanton et al. |
| 7,710,671 | B1 | 5/2010 | Kwak et al. |
| 7,719,751 | B2 | 5/2010 | Egerton et al. |
| 7,724,416 | B2 | 5/2010 | Miller |
| 7,800,812 | B2 | 9/2010 | Moskowitz |
| 7,817,326 | B1 | 10/2010 | Rennig et al. |
| 7,822,490 | B2 | 10/2010 | Bechtel et al. |
| 7,869,114 | B2 | 1/2011 | Valentin et al. |
| 7,873,490 | B2 | 1/2011 | MacDonald |
| 7,894,119 | B2 | 2/2011 | Valentin et al. |
| 7,929,194 | B2 | 4/2011 | Legois et al. |
| 7,941,245 | B1 | 5/2011 | Popat |
| 7,950,827 | B2 | 5/2011 | Veskovic |
| 7,961,375 | B2 | 6/2011 | Phillips |
| 7,963,675 | B2 | 6/2011 | Veskovic |
| 7,972,021 | B2 | 7/2011 | Scherer |
| 7,977,904 | B2 | 7/2011 | Berman et al. |
| 7,990,603 | B2 | 8/2011 | Ash et al. |
| 8,004,739 | B2 | 8/2011 | Letocart |
| 8,018,644 | B2 | 9/2011 | Gustavsson et al. |
| 8,035,882 | B2 | 10/2011 | Fanton et al. |
| 8,102,586 | B2 | 1/2012 | Albahri |
| 8,164,818 | B2 | 4/2012 | Collins et al. |
| 8,213,074 | B1 | 7/2012 | Shrivastava et al. |
| 8,254,013 | B2 | 8/2012 | Mehtani et al. |
| 8,270,059 | B2 | 9/2012 | Friedman et al. |
| 8,288,981 | B2 | 10/2012 | Zaharchuk et al. |
| 8,292,228 | B2 | 10/2012 | Mitchell et al. |
| 8,300,298 | B2 | 10/2012 | Wang et al. |
| 8,380,393 | B1 | 2/2013 | Ohtomo |
| 8,432,603 | B2 | 4/2013 | Wang et al. |
| 8,456,729 | B2 | 6/2013 | Brown et al. |
| 8,514,476 | B2 | 8/2013 | Egerton et al. |
| 8,547,624 | B2 | 10/2013 | Ash et al. |
| 8,582,193 | B2 | 11/2013 | Wang et al. |
| 8,705,162 | B2 | 4/2014 | Brown et al. |
| 8,723,467 | B2 | 5/2014 | Berman et al. |
| 8,749,870 | B2 | 6/2014 | Egerton et al. |
| 8,764,950 | B2 | 7/2014 | Wang et al. |
| 8,764,951 | B2 | 7/2014 | Wang et al. |
| 8,780,432 | B1 | 7/2014 | Nguyen |
| 8,836,263 | B2 | 9/2014 | Berman et al. |
| 8,864,321 | B2 | 10/2014 | Mehtani et al. |
| 8,902,486 | B1 | 12/2014 | Chandrasekhar |
| 8,934,170 | B2 | 1/2015 | Takeda et al. |
| 8,976,440 | B2 | 3/2015 | Berland et al. |
| 9,016,630 | B2 | 4/2015 | Mitchell et al. |
| 9,030,725 | B2 | 5/2015 | Pradhan et al. |
| 9,078,299 | B2 | 7/2015 | Ashdown |
| 9,081,246 | B2 | 7/2015 | Rozbicki |
| 9,081,247 | B1 | 7/2015 | Pradhan et al. |
| 9,110,345 | B2 | 8/2015 | Egerton et al. |
| 9,128,346 | B2 | 9/2015 | Shrivastava et al. |
| 9,226,366 | B2 | 12/2015 | Orillard et al. |
| 9,261,751 | B2 | 2/2016 | Pradhan et al. |
| 9,298,203 | B2 | 3/2016 | Wenzel |
| 9,341,909 | B2 | 5/2016 | Egerton et al. |
| 9,341,912 | B2 | 5/2016 | Shrivastava et al. |
| 9,348,192 | B2 | 5/2016 | Brown et al. |
| 9,404,793 | B2 | 8/2016 | Yang et al. |
| 9,406,028 | B2 | 8/2016 | Humann |
| 9,423,664 | B2 | 8/2016 | Brown et al. |
| 9,454,055 | B2 | 9/2016 | Brown et al. |
| 9,523,902 | B2 | 12/2016 | Parker |
| 9,546,515 | B2 | 1/2017 | Hall et al. |
| 9,574,934 | B2 | 2/2017 | Verbeek et al. |
| 9,618,819 | B2 | 4/2017 | Egerton et al. |
| 9,638,978 | B2 | 5/2017 | Brown et al. |
| 9,645,465 | B2 | 5/2017 | Brown et al. |
| 9,664,974 | B2 | 5/2017 | Kozlowski et al. |
| 9,668,315 | B2 | 5/2017 | Shearer et al. |
| 9,674,924 | B2 | 6/2017 | Lashina et al. |
| 9,709,869 | B2 | 7/2017 | Baumann et al. |
| 9,807,857 | B2 | 10/2017 | Huang |
| 9,927,674 | B2 | 3/2018 | Brown et al. |
| 9,938,765 | B2 | 4/2018 | Berman et al. |
| 10,048,561 | B2 | 8/2018 | Brown |
| 10,234,596 | B2 | 3/2019 | Frank et al. |
| 10,254,618 | B2 | 4/2019 | Parker |
| 10,301,871 | B2 | 5/2019 | Shrivastava et al. |
| 10,316,581 | B1 | 6/2019 | Nagel et al. |
| 10,437,126 | B2 | 10/2019 | Egerton et al. |
| 10,495,939 | B2 | 12/2019 | Brown et al. |
| 10,520,784 | B2 | 12/2019 | Brown et al. |
| 10,539,854 | B2 | 1/2020 | Brown et al. |
| 10,605,970 | B2 | 3/2020 | Blair et al. |
| 10,690,540 | B2 | 6/2020 | Brown et al. |
| 10,712,627 | B2 | 7/2020 | Brown et al. |
| 10,802,372 | B2 | 10/2020 | Brown |
| 10,908,470 | B2 | 2/2021 | Brown et al. |
| 10,914,118 | B2 | 2/2021 | Shrivastava et al. |
| 10,921,675 | B2 | 2/2021 | Barnum et al. |
| 10,948,797 | B2 | 3/2021 | Pradhan |
| 10,982,487 | B2 | 4/2021 | Ramirez |
| 11,078,721 | B2 | 8/2021 | Shrivastava et al. |
| 11,126,057 | B2 | 9/2021 | Brown et al. |
| 11,255,722 | B2 | 2/2022 | Zedlitz et al. |
| 11,261,654 | B2 | 3/2022 | Brown et al. |
| 11,306,532 | B2 | 4/2022 | Shrivastava et al. |
| 11,520,207 | B2 | 12/2022 | Brown et al. |
| 11,635,666 | B2 | 4/2023 | Klawuhn et al. |
| 11,674,843 | B2 | 6/2023 | Zedlitz et al. |
| 11,719,990 | B2 | 8/2023 | Zedlitz et al. |
| 2002/0021481 | A1 | 2/2002 | Lin et al. |
| 2002/0041443 | A1 | 4/2002 | Varaprasad et al. |
| 2002/0075472 | A1 | 6/2002 | Holton |
| 2002/0075552 | A1 | 6/2002 | Poll et al. |
| 2002/0135881 | A1 | 9/2002 | Rukavina et al. |

(56) References Cited

U.S. PATENT DOCUMENTS

| | | |
|---|---|---|
| 2002/0144831 A1 | 10/2002 | Kalt |
| 2002/0149829 A1 | 10/2002 | Mochizuka et al. |
| 2002/0152298 A1 | 10/2002 | Kikta et al. |
| 2003/0142140 A1 | 7/2003 | Brown et al. |
| 2003/0191546 A1 | 10/2003 | Bechtel et al. |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0047050 A1 | 3/2004 | Bauer et al. |
| 2004/0108191 A1 | 6/2004 | Su et al. |
| 2004/0135989 A1 | 7/2004 | Klebe |
| 2004/0150866 A1 | 8/2004 | Tench et al. |
| 2004/0160322 A1 | 8/2004 | Stilp |
| 2004/0257633 A1 | 12/2004 | Agrawal et al. |
| 2005/0002081 A1 | 1/2005 | Beteille et al. |
| 2005/0046584 A1 | 3/2005 | Breed |
| 2005/0046920 A1 | 3/2005 | Freeman et al. |
| 2005/0063036 A1 | 3/2005 | Bechtel et al. |
| 2005/0168793 A1 | 8/2005 | Aizawa et al. |
| 2005/0200934 A1 | 9/2005 | Callahan et al. |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0278047 A1 | 12/2005 | Ahmed |
| 2006/0018000 A1 | 1/2006 | Greer |
| 2006/0077511 A1 | 4/2006 | Poll et al. |
| 2006/0107616 A1 | 5/2006 | Ratti et al. |
| 2006/0170376 A1 | 8/2006 | Piepgras et al. |
| 2006/0187608 A1 | 8/2006 | Stark |
| 2006/0207730 A1 | 9/2006 | Berman et al. |
| 2006/0209007 A1 | 9/2006 | Pyo et al. |
| 2006/0245024 A1 | 11/2006 | Greer |
| 2007/0002007 A1 | 1/2007 | Tam |
| 2007/0002420 A1 | 1/2007 | Rukavina |
| 2007/0002421 A1 | 1/2007 | Rukavina et al. |
| 2007/0002422 A1 | 1/2007 | O'Shaughnessy |
| 2007/0020442 A1 | 1/2007 | Giron et al. |
| 2007/0055757 A1 | 3/2007 | Mairs et al. |
| 2007/0067048 A1 | 3/2007 | Bechtel et al. |
| 2007/0103761 A1 | 5/2007 | Giron et al. |
| 2007/0133078 A1 | 6/2007 | Fanton et al. |
| 2007/0162233 A1 | 7/2007 | Schwenke |
| 2007/0268550 A1 | 11/2007 | Liu et al. |
| 2007/0285759 A1 | 12/2007 | Ash et al. |
| 2008/0012755 A1 | 1/2008 | Venkatachalam et al. |
| 2008/0018979 A1 | 1/2008 | Mahe et al. |
| 2008/0042012 A1 | 2/2008 | Callahan et al. |
| 2008/0043316 A2 | 2/2008 | Moskowitz |
| 2008/0074724 A1 | 3/2008 | Agrawal et al. |
| 2008/0092456 A1 | 4/2008 | Millett et al. |
| 2008/0115428 A1 | 5/2008 | Schlam et al. |
| 2008/0204850 A1 | 8/2008 | Agrawal et al. |
| 2008/0283621 A1 | 11/2008 | Quirino et al. |
| 2008/0304131 A1 | 12/2008 | Nguyen |
| 2009/0020233 A1 | 1/2009 | Berman et al. |
| 2009/0027759 A1 | 1/2009 | Albahri |
| 2009/0058295 A1 | 3/2009 | Auday et al. |
| 2009/0066157 A1 | 3/2009 | Tarng et al. |
| 2009/0067031 A1 | 3/2009 | Piroux et al. |
| 2009/0097098 A1 | 4/2009 | Piroux |
| 2009/0110918 A1 | 4/2009 | Jacquiod et al. |
| 2009/0114928 A1 | 5/2009 | Messere et al. |
| 2009/0127126 A1 | 5/2009 | Torvund |
| 2009/0130409 A1 | 5/2009 | Reutler et al. |
| 2009/0139669 A1 | 6/2009 | Robin |
| 2009/0143141 A1 | 6/2009 | Wells et al. |
| 2009/0148642 A1 | 6/2009 | Mauser et al. |
| 2009/0174300 A1 | 7/2009 | Jousse et al. |
| 2009/0181203 A1 | 7/2009 | Valentin et al. |
| 2009/0187287 A1 | 7/2009 | Bruhnke et al. |
| 2009/0204269 A1 | 8/2009 | Bechtel et al. |
| 2009/0222137 A1 | 9/2009 | Berman et al. |
| 2009/0231092 A1 | 9/2009 | Maegawa et al. |
| 2009/0243732 A1 | 10/2009 | Tarng et al. |
| 2009/0243802 A1 | 10/2009 | Wolf et al. |
| 2009/0251758 A1 | 10/2009 | Valentin et al. |
| 2009/0262411 A1 | 10/2009 | Karmhag et al. |
| 2009/0296188 A1 | 12/2009 | Jain et al. |
| 2009/0297806 A1 | 12/2009 | Dawson-Elli et al. |
| 2009/0323155 A1 | 12/2009 | Phillips |
| 2009/0323160 A1 | 12/2009 | Egerton et al. |
| 2010/0039410 A1 | 2/2010 | Becker et al. |
| 2010/0066484 A1 | 3/2010 | Hanwright et al. |
| 2010/0067090 A1 | 3/2010 | Egerton et al. |
| 2010/0071856 A1 | 3/2010 | Zaharchuk et al. |
| 2010/0082081 A1 | 4/2010 | Niessen et al. |
| 2010/0110523 A1 | 5/2010 | Varaprasad et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0203296 A1 | 8/2010 | Tsai et al. |
| 2010/0208326 A1 | 8/2010 | Kwak et al. |
| 2010/0225988 A1 | 9/2010 | Kalkanoglu et al. |
| 2010/0235206 A1 | 9/2010 | Miller et al. |
| 2010/0243427 A1 | 9/2010 | Kozlowski et al. |
| 2010/0245972 A1 | 9/2010 | Wright |
| 2010/0245973 A1 | 9/2010 | Wang et al. |
| 2010/0294330 A1 | 11/2010 | Huang et al. |
| 2010/0296081 A1 | 11/2010 | Granqvist |
| 2010/0311204 A1 | 12/2010 | Komin et al. |
| 2010/0313476 A1 | 12/2010 | Sethuraman et al. |
| 2010/0315693 A1 | 12/2010 | Lam et al. |
| 2010/0315717 A1 | 12/2010 | Agrawal et al. |
| 2011/0035061 A1 | 2/2011 | Altonen et al. |
| 2011/0043885 A1 | 2/2011 | Lamine et al. |
| 2011/0046810 A1 | 2/2011 | Bechtel et al. |
| 2011/0048614 A1 | 3/2011 | Veerasamy |
| 2011/0051221 A1 | 3/2011 | Veerasamy |
| 2011/0059275 A1 | 3/2011 | Stark |
| 2011/0063708 A1 | 3/2011 | Letocart |
| 2011/0066302 A1 | 3/2011 | McEwan |
| 2011/0080629 A1 | 4/2011 | Neuman et al. |
| 2011/0100709 A1 | 5/2011 | Wang et al. |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0216389 A1 | 9/2011 | Piroux et al. |
| 2011/0235152 A1 | 9/2011 | Letocart |
| 2011/0249313 A1 | 10/2011 | Letocart |
| 2011/0255141 A1 | 10/2011 | Agrawal et al. |
| 2011/0255142 A1 | 10/2011 | Ash et al. |
| 2011/0260961 A1 | 10/2011 | Burdis |
| 2011/0266137 A1 | 11/2011 | Wang et al. |
| 2011/0266138 A1 | 11/2011 | Wang et al. |
| 2011/0266419 A1 | 11/2011 | Jones et al. |
| 2011/0267672 A1 | 11/2011 | Sbar et al. |
| 2011/0267674 A1 | 11/2011 | Wang et al. |
| 2011/0267675 A1 | 11/2011 | Wang et al. |
| 2011/0292488 A1 | 12/2011 | McCarthy et al. |
| 2011/0295575 A1 | 12/2011 | Levine et al. |
| 2011/0299149 A1 | 12/2011 | Park et al. |
| 2011/0304898 A1 | 12/2011 | Letocart |
| 2011/0304899 A1 | 12/2011 | Kwak et al. |
| 2012/0007507 A1 | 1/2012 | Niemann et al. |
| 2012/0026573 A1 | 2/2012 | Collins et al. |
| 2012/0033287 A1 | 2/2012 | Friedman et al. |
| 2012/0033288 A1 | 2/2012 | Lee et al. |
| 2012/0062975 A1 | 3/2012 | Mehtani et al. |
| 2012/0069420 A1 | 3/2012 | Suzuki |
| 2012/0091315 A1 | 4/2012 | Moskowitz |
| 2012/0095601 A1 | 4/2012 | Abraham et al. |
| 2012/0133315 A1 | 5/2012 | Berman et al. |
| 2012/0147449 A1 | 6/2012 | Bhatnagar et al. |
| 2012/0188627 A1 | 7/2012 | Chen et al. |
| 2012/0190386 A1 | 7/2012 | Anderson |
| 2012/0194895 A1 | 8/2012 | Podbelski et al. |
| 2012/0200908 A1 | 8/2012 | Bergh et al. |
| 2012/0236386 A1 | 9/2012 | Mehtani et al. |
| 2012/0239209 A1 | 9/2012 | Brown et al. |
| 2012/0261078 A1 | 10/2012 | Adams et al. |
| 2012/0265350 A1 | 10/2012 | Ashdown |
| 2012/0268803 A1 | 10/2012 | Greer et al. |

(56) References Cited

U.S. PATENT DOCUMENTS

| | | |
|---|---|---|
| 2012/0275008 A1 | 11/2012 | Pradhan et al. |
| 2012/0293855 A1 | 11/2012 | Shrivastava et al. |
| 2012/0300280 A1 | 11/2012 | Murphy et al. |
| 2012/0327499 A1 | 12/2012 | Parker et al. |
| 2013/0011315 A1 | 1/2013 | Ahmed et al. |
| 2013/0021659 A1 | 1/2013 | Friedman et al. |
| 2013/0038093 A1 | 2/2013 | Snider |
| 2013/0057157 A1 | 3/2013 | Nackaerts et al. |
| 2013/0057937 A1 | 3/2013 | Berman et al. |
| 2013/0063065 A1 | 3/2013 | Berman et al. |
| 2013/0139804 A1 | 6/2013 | Goldberg |
| 2013/0158790 A1 | 6/2013 | McIntyre, Jr. et al. |
| 2013/0173926 A1 | 7/2013 | Morese et al. |
| 2013/0201545 A1 | 8/2013 | Frey et al. |
| 2013/0222877 A1 | 8/2013 | Greer et al. |
| 2013/0222878 A1 | 8/2013 | Greer et al. |
| 2013/0242370 A1 | 9/2013 | Wang |
| 2013/0258436 A1 | 10/2013 | Podbelski et al. |
| 2013/0263510 A1 | 10/2013 | Gassion |
| 2013/0264948 A1 | 10/2013 | Orillard et al. |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0301104 A1 | 11/2013 | Egerton et al. |
| 2013/0321923 A1 | 12/2013 | Thuot et al. |
| 2014/0043667 A1 | 2/2014 | Bergh et al. |
| 2014/0043668 A1 | 2/2014 | Bergh et al. |
| 2014/0055443 A1 | 2/2014 | Ozawa et al. |
| 2014/0067733 A1 | 3/2014 | Humann |
| 2014/0083413 A1 | 3/2014 | Bibi et al. |
| 2014/0090702 A1 | 4/2014 | Gupta et al. |
| 2014/0104667 A1 | 4/2014 | Greer et al. |
| 2014/0133005 A1 | 5/2014 | Sbar et al. |
| 2014/0145002 A1 | 5/2014 | Caldeira et al. |
| 2014/0160550 A1 | 6/2014 | Brown et al. |
| 2014/0177025 A1 | 6/2014 | Lee et al. |
| 2014/0177028 A1 | 6/2014 | Shrivastava et al. |
| 2014/0236323 A1 | 8/2014 | Brown et al. |
| 2014/0259931 A1 | 9/2014 | Plummer |
| 2014/0262057 A1 | 9/2014 | Chambers et al. |
| 2014/0268287 A1 | 9/2014 | Brown et al. |
| 2014/0288715 A1 | 9/2014 | Beaujeu et al. |
| 2014/0300945 A1 | 10/2014 | Parker |
| 2014/0303788 A1 | 10/2014 | Sanders et al. |
| 2014/0320947 A1 | 10/2014 | Egerton et al. |
| 2014/0330538 A1 | 11/2014 | Conklin et al. |
| 2014/0371931 A1 | 12/2014 | Lin et al. |
| 2015/0002919 A1 | 1/2015 | Jack et al. |
| 2015/0035440 A1 | 2/2015 | Spero |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0077829 A1 | 3/2015 | Greer et al. |
| 2015/0092259 A1 | 4/2015 | Greer et al. |
| 2015/0116811 A1 | 4/2015 | Shrivastava et al. |
| 2015/0122474 A1 | 5/2015 | Petersen |
| 2015/0177586 A1 | 6/2015 | Egerton et al. |
| 2015/0185581 A1 | 7/2015 | Pradhan et al. |
| 2015/0219975 A1 | 8/2015 | Phillips et al. |
| 2015/0234945 A1 | 8/2015 | Marceau et al. |
| 2015/0293422 A1 | 10/2015 | Pradhan et al. |
| 2015/0338713 A1 | 11/2015 | Brown |
| 2015/0362817 A1 | 12/2015 | Patterson et al. |
| 2015/0362818 A1 | 12/2015 | Greer |
| 2015/0362819 A1 | 12/2015 | Bjornard et al. |
| 2015/0368967 A1 | 12/2015 | Lundy et al. |
| 2016/0040478 A1 | 2/2016 | Lundy et al. |
| 2016/0054633 A1 | 2/2016 | Brown et al. |
| 2016/0054634 A1 | 2/2016 | Brown et al. |
| 2016/0062332 A1 | 3/2016 | Call et al. |
| 2016/0124283 A1 | 5/2016 | Brown et al. |
| 2016/0154290 A1 | 6/2016 | Brown et al. |
| 2016/0202589 A1 | 7/2016 | Nagel et al. |
| 2016/0203403 A1 | 7/2016 | Nagel et al. |
| 2016/0223878 A1* | 8/2016 | Tran .................. G02F 1/1533 |
| 2016/0251894 A1 | 9/2016 | Shrivastava et al. |
| 2016/0258209 A1 | 9/2016 | Berman et al. |
| 2016/0306249 A1 | 10/2016 | Egerton et al. |
| 2016/0363799 A1 | 12/2016 | West et al. |
| 2017/0053068 A1 | 2/2017 | Pillai et al. |
| 2017/0075183 A1 | 3/2017 | Brown |
| 2017/0097259 A1 | 4/2017 | Brown et al. |
| 2017/0122802 A1 | 5/2017 | Brown et al. |
| 2017/0123286 A1 | 5/2017 | Parker |
| 2017/0130523 A1 | 5/2017 | Shrivastava et al. |
| 2017/0168367 A1 | 6/2017 | Egerton et al. |
| 2017/0168368 A1 | 6/2017 | Brown et al. |
| 2017/0219907 A1 | 8/2017 | Brown et al. |
| 2017/0242315 A1 | 8/2017 | Ash et al. |
| 2017/0276542 A1 | 9/2017 | Klawuhn et al. |
| 2017/0279876 A1 | 9/2017 | Prasad et al. |
| 2017/0328121 A1 | 11/2017 | Purdy et al. |
| 2017/0365908 A1 | 12/2017 | Hughes et al. |
| 2018/0073712 A1 | 3/2018 | Baaijens et al. |
| 2018/0129172 A1 | 5/2018 | Shrivastava et al. |
| 2018/0141414 A1 | 5/2018 | Lota |
| 2018/0157141 A1 | 6/2018 | Brown et al. |
| 2018/0162203 A1 | 6/2018 | Boehm |
| 2018/0187484 A1 | 7/2018 | Hebeisen et al. |
| 2018/0231860 A1 | 8/2018 | Podbelski et al. |
| 2018/0284555 A1 | 10/2018 | Klawuhn et al. |
| 2018/0307114 A1 | 10/2018 | Brown et al. |
| 2018/0364539 A1 | 12/2018 | Rozbicki et al. |
| 2018/0373111 A1 | 12/2018 | Brown |
| 2019/0025661 A9 | 1/2019 | Brown et al. |
| 2019/0169926 A1 | 6/2019 | Shrivastava et al. |
| 2019/0171081 A1 | 6/2019 | Zedlitz et al. |
| 2019/0230776 A1 | 7/2019 | Casey et al. |
| 2019/0242184 A1 | 8/2019 | Shrivastava et al. |
| 2019/0250029 A1 | 8/2019 | Zedlitz et al. |
| 2019/0257143 A1 | 8/2019 | Nagel et al. |
| 2019/0346732 A1 | 11/2019 | Parker et al. |
| 2020/0007762 A1 | 1/2020 | Dallmeier |
| 2020/0057346 A1 | 2/2020 | Zedlitz et al. |
| 2020/0063490 A1 | 2/2020 | Hebeisen et al. |
| 2020/0072674 A1 | 3/2020 | Baker et al. |
| 2020/0096831 A1 | 3/2020 | Brown et al. |
| 2020/0260556 A1 | 8/2020 | Rozbicki et al. |
| 2020/0355977 A1 | 11/2020 | Brown et al. |
| 2020/0393733 A1 | 12/2020 | Brown |
| 2021/0003899 A1 | 1/2021 | Zedlitz et al. |
| 2021/0080319 A1 | 3/2021 | Brown et al. |
| 2021/0190991 A1 | 6/2021 | Frank et al. |
| 2021/0214274 A1 | 7/2021 | Friedman et al. |
| 2021/0325754 A1 | 10/2021 | Brown et al. |
| 2022/0034156 A1 | 2/2022 | Shrivastava et al. |
| 2022/0113184 A1 | 4/2022 | Zedlitz et al. |
| 2022/0195791 A1 | 6/2022 | Shrivastava et al. |
| 2022/0195792 A1 | 6/2022 | Shrivastava et al. |
| 2022/0214592 A1 | 7/2022 | Brown et al. |
| 2022/0326584 A1 | 10/2022 | Khanna et al. |
| 2023/0003080 A1 | 1/2023 | Shrivastava et al. |
| 2023/0003081 A1 | 1/2023 | Shrivastava et al. |
| 2023/0086335 A1 | 3/2023 | Shrivastava et al. |
| 2023/0152654 A1 | 5/2023 | Klawuhn et al. |
| 2023/0341259 A1 | 10/2023 | Zedlitz et al. |
| 2024/0103332 A1 | 3/2024 | Brown et al. |
| 2024/0160076 A1 | 5/2024 | Brown |
| 2024/0168354 A1 | 5/2024 | Brown et al. |

FOREIGN PATENT DOCUMENTS

| | | | |
|---|---|---|---|
| CN | 1380482 A | 11/2002 |
| CN | 1097760 C | 1/2003 |
| CN | 2590732 Y | 12/2003 |
| CN | 1534413 A | 10/2004 |
| CN | 1537257 A | 10/2004 |
| CN | 1659080 A | 8/2005 |
| CN | 1672189 A | 9/2005 |
| CN | 1672465 A | 9/2005 |
| CN | 1704556 A | 12/2005 |
| CN | 1822951 A | 8/2006 |
| CN | 201104273 Y | 8/2008 |

(56) References Cited

FOREIGN PATENT DOCUMENTS

| | | | |
|---|---|---|---|
| CN | 101322069 | A | 12/2008 |
| CN | 101421558 | A | 4/2009 |
| CN | 101438205 | A | 5/2009 |
| CN | 101501757 | A | 8/2009 |
| CN | 101600604 | A | 12/2009 |
| CN | 101641618 | A | 2/2010 |
| CN | 101678209 | A | 3/2010 |
| CN | 101702036 | A | 5/2010 |
| CN | 101707892 | A | 5/2010 |
| CN | 101762920 | A | 6/2010 |
| CN | 101969207 | A | 2/2011 |
| CN | 101976009 | A | 2/2011 |
| CN | 102168517 | A | 8/2011 |
| CN | 102203370 | A | 9/2011 |
| CN | 102330530 | A | 1/2012 |
| CN | 202110359 | U | 1/2012 |
| CN | 102388340 | A | 3/2012 |
| CN | 202230346 | U | 5/2012 |
| CN | 102183237 | B | 8/2012 |
| CN | 102749781 | A | 10/2012 |
| CN | 202794021 | U | 3/2013 |
| CN | 103168269 | A | 6/2013 |
| CN | 103238107 | A | 8/2013 |
| CN | 103262280 | A | 8/2013 |
| CN | 103370192 | A | 10/2013 |
| CN | 103370490 | A | 10/2013 |
| CN | 103370649 | A | 10/2013 |
| CN | 103370986 | A | 10/2013 |
| CN | 203271490 | U | 11/2013 |
| CN | 103547965 | A | 1/2014 |
| CN | 103649826 | A | 3/2014 |
| CN | 103987909 | A | 8/2014 |
| CN | 203870367 | U | 10/2014 |
| CN | 104181612 | A | 12/2014 |
| CN | 104321497 | A | 1/2015 |
| CN | 104429162 | A | 3/2015 |
| CN | 104685428 | A | 6/2015 |
| CN | 104781493 | A | 7/2015 |
| CN | 105143586 | A | 12/2015 |
| CN | 105549293 | A | 5/2016 |
| CN | 106103191 | A | 11/2016 |
| CN | 106462023 | A | 2/2017 |
| CN | 106796305 | A | 5/2017 |
| CN | 106971028 | A | 7/2017 |
| CN | 108351471 | A | 7/2018 |
| DE | 10124673 | A1 | 11/2002 |
| DE | 102006042538 | A1 | 3/2008 |
| DE | 102014220818 | A1 | 4/2016 |
| EP | 0356099 | A2 | 2/1990 |
| EP | 0445314 | A1 | 9/1991 |
| EP | 0470867 | A2 | 2/1992 |
| EP | 0851271 | A2 | 7/1998 |
| EP | 0869032 | A2 | 10/1998 |
| EP | 0920210 | A1 | 6/1999 |
| EP | 0950568 | A1 | 10/1999 |
| EP | 1012661 | A1 | 6/2000 |
| EP | 1078818 | A2 | 2/2001 |
| EP | 1420287 | A1 | 5/2004 |
| EP | 1441269 | A2 | 7/2004 |
| EP | 0835475 | B1 | 9/2004 |
| EP | 1484634 | A1 | 12/2004 |
| EP | 1510854 | A1 | 3/2005 |
| EP | 1417535 | B1 | 11/2005 |
| EP | 1619546 | A2 | 1/2006 |
| EP | 2161615 | A1 | 3/2010 |
| EP | 2348357 | A2 | 7/2011 |
| EP | 2357544 | A2 | 8/2011 |
| EP | 2590095 | A1 | 5/2013 |
| EP | 2764998 | A1 | 8/2014 |
| EP | 2815960 | A1 | 12/2014 |
| EP | 3114903 | A1 | 1/2017 |
| EP | 2517332 | B1 | 9/2018 |
| EP | 2638429 | B1 | 2/2021 |
| FR | 2957159 | A1 | 9/2011 |
| FR | 3026496 | A1 | 4/2016 |
| GB | 2190760 | A | 11/1987 |
| GB | 2462754 | A | 2/2010 |
| JP | S55153982 | A | 12/1980 |
| JP | S6122897 | U | 2/1986 |
| JP | S6182821 | U | 5/1986 |
| JP | S61176012 | A | 8/1986 |
| JP | S61190815 | A | 8/1986 |
| JP | S61171034 | U | 10/1986 |
| JP | S61229610 | A | 10/1986 |
| JP | S6219631 | U | 2/1987 |
| JP | S6282194 | A | 4/1987 |
| JP | S63208830 | A | 8/1988 |
| JP | H01270032 | A | 10/1989 |
| JP | H02132420 | A | 5/1990 |
| JP | H02176728 | A | 7/1990 |
| JP | H02308228 | A | 12/1990 |
| JP | H0431833 | A | 2/1992 |
| JP | H04363495 | A | 12/1992 |
| JP | H05173191 | A | 7/1993 |
| JP | H05178645 | A | 7/1993 |
| JP | H06282194 | A | 10/1994 |
| JP | H07139201 | A | 5/1995 |
| JP | H1063216 | A | 3/1998 |
| JP | H10159465 | A | 6/1998 |
| JP | H10249278 | A | 9/1998 |
| JP | 2000008476 | A | 1/2000 |
| JP | 2000096956 | A | 4/2000 |
| JP | 2002148573 | A | 5/2002 |
| JP | 2002249346 | A | 9/2002 |
| JP | 2003146072 | A | 5/2003 |
| JP | 2004093873 | A | 3/2004 |
| JP | 2004170350 | A | 6/2004 |
| JP | 2004245985 | A | 9/2004 |
| JP | 2004531770 | A | 10/2004 |
| JP | 2005054356 | A | 3/2005 |
| JP | 2005282106 | A | 10/2005 |
| JP | 2005314870 | A | 11/2005 |
| JP | 2006009281 | A | 1/2006 |
| JP | 2006029027 | A | 2/2006 |
| JP | 2006243485 | A | 9/2006 |
| JP | 2007120090 | A | 5/2007 |
| JP | 2007248604 | A | 9/2007 |
| JP | 2007308971 | A | 11/2007 |
| JP | 2008502949 | A | 1/2008 |
| JP | 2008507000 | A | 3/2008 |
| JP | 2008531879 | A | 8/2008 |
| JP | 2009508387 | A | 2/2009 |
| JP | 2009540376 | A | 11/2009 |
| JP | 2010101151 | A | 5/2010 |
| JP | 2010529488 | A | 8/2010 |
| JP | 4694816 | B2 | 6/2011 |
| JP | 4799113 | B2 | 10/2011 |
| JP | 2013057975 | A | 3/2013 |
| JP | 2016516921 | A | 6/2016 |
| JP | 6541003 | B2 | 7/2019 |
| JP | 6818386 | B2 | 1/2021 |
| KR | 200412640 | Y1 | 3/2006 |
| KR | 100752041 | B1 | 8/2007 |
| KR | 20080022319 | A | 3/2008 |
| KR | 20090026181 | A | 3/2009 |
| KR | 100904847 | B1 | 6/2009 |
| KR | 100931183 | B1 | 12/2009 |
| KR | 20100034361 | A | 4/2010 |
| KR | 20110003698 | A | 1/2011 |
| KR | 20110052721 | A | 5/2011 |
| KR | 20110094672 | A | 8/2011 |
| KR | 20110118783 | A | 11/2011 |
| KR | 20130018527 | A | 2/2013 |
| KR | 20140139894 | A | 12/2014 |
| KR | 101815919 | B1 | 1/2018 |
| RU | 29501 | U1 | 5/2003 |
| TW | 200532346 | A | 10/2005 |
| TW | 200920987 | A | 5/2009 |
| TW | M368189 | U | 11/2009 |
| TW | 201029838 | A | 8/2010 |
| TW | 201215981 | A | 4/2012 |
| TW | 201231789 | A | 8/2012 |
| TW | 201243470 | A | 11/2012 |
| TW | 201248286 | A | 12/2012 |

(56) References Cited

FOREIGN PATENT DOCUMENTS

| | | | |
|---|---|---|---|
| TW | I395809 | B | 5/2013 |
| TW | 201447089 | A | 12/2014 |
| WO | WO-9632560 | A1 | 10/1996 |
| WO | WO-9726661 | A1 | 7/1997 |
| WO | WO-9816870 | A1 | 4/1998 |
| WO | WO-9838547 | A1 | 9/1998 |
| WO | WO-0158213 | A1 | 8/2001 |
| WO | WO-0209338 | A2 | 1/2002 |
| WO | WO-0213052 | A2 | 2/2002 |
| WO | WO-03001290 | A1 | 1/2003 |
| WO | WO-03012541 | A2 | 2/2003 |
| WO | WO-2004003649 | A1 | 1/2004 |
| WO | WO-2005076061 | A1 | 8/2005 |
| WO | WO-2005098811 | A1 | 10/2005 |
| WO | WO-2005103807 | A2 | 11/2005 |
| WO | WO-2006052067 | A1 | 5/2006 |
| WO | WO-2007016546 | A2 | 2/2007 |
| WO | WO-2007100921 | A2 | 9/2007 |
| WO | WO-2007146862 | A2 | 12/2007 |
| WO | WO-2008030018 | A1 | 3/2008 |
| WO | WO-2008043951 | A2 | 4/2008 |
| WO | WO-2008048181 | A1 | 4/2008 |
| WO | WO-2008147322 | A1 | 12/2008 |
| WO | WO-2009044330 | A1 | 4/2009 |
| WO | WO-2009124647 | A1 | 10/2009 |
| WO | WO-2009145876 | A1 | 12/2009 |
| WO | WO-2009148861 | A2 | 12/2009 |
| WO | WO-2009158510 | A2 | 12/2009 |
| WO | WO-2010007988 | A1 | 1/2010 |
| WO | WO-2010079388 | A1 | 7/2010 |
| WO | WO-2010120771 | A1 | 10/2010 |
| WO | WO-2011010067 | A2 | 1/2011 |
| WO | WO-2011020478 | A1 | 2/2011 |
| WO | WO-2011028253 | A2 | 3/2011 |
| WO | WO-2011028254 | A2 | 3/2011 |
| WO | WO-2011050291 | A2 | 4/2011 |
| WO | WO-2011087677 | A1 | 7/2011 |
| WO | WO-2011087684 | A1 | 7/2011 |
| WO | WO-2011087687 | A1 | 7/2011 |
| WO | WO-2011109688 | A1 | 9/2011 |
| WO | WO-2011124720 | A2 | 10/2011 |
| WO | WO-2011127015 | A1 | 10/2011 |
| WO | WO-2011133294 | A1 | 10/2011 |
| WO | WO-2012079159 | A1 | 6/2012 |
| WO | WO-2012080589 | A1 | 6/2012 |
| WO | WO-2012080618 | A1 | 6/2012 |
| WO | WO-2012080656 | A1 | 6/2012 |
| WO | WO-2012080657 | A1 | 6/2012 |
| WO | WO-2012125332 | A2 | 9/2012 |
| WO | WO-2012138074 | A2 | 10/2012 |
| WO | WO-2012145155 | A1 | 10/2012 |
| WO | WO-2013059674 | A1 | 4/2013 |
| WO | WO-2013090209 | A1 | 6/2013 |
| WO | WO-2013102932 | A2 | 7/2013 |
| WO | WO-2013105244 | A2 | 7/2013 |
| WO | WO-2013109881 | A2 | 7/2013 |
| WO | WO-2013130781 | A1 | 9/2013 |
| WO | WO-2013138535 | A1 | 9/2013 |
| WO | WO-2013155467 | A1 | 10/2013 |
| WO | WO-2013163107 | A1 | 10/2013 |
| WO | WO-2014045163 | A2 | 3/2014 |
| WO | WO-2014078429 | A1 | 5/2014 |
| WO | WO-2014121863 | A1 | 8/2014 |
| WO | WO-2014130471 | A1 | 8/2014 |
| WO | WO-2014134451 | A2 | 9/2014 |
| WO | WO-2014150153 | A1 | 9/2014 |
| WO | WO-2014165692 | A1 | 10/2014 |
| WO | WO-2014209812 | A1 | 12/2014 |
| WO | WO-2015023842 | A2 | 2/2015 |
| WO | WO-2015050946 | A1 | 4/2015 |
| WO | WO-2015077097 | A1 | 5/2015 |
| WO | WO-2015095615 | A1 | 6/2015 |
| WO | WO-2015171886 | A1 | 11/2015 |
| WO | WO-2016004109 | A1 | 1/2016 |
| WO | WO-2016029156 | A1 | 2/2016 |
| WO | WO-2016029165 | A2 | 2/2016 |
| WO | WO-2016053960 | A1 | 4/2016 |
| WO | WO-2016054112 | A1 | 4/2016 |
| WO | WO-2016058695 | A1 | 4/2016 |
| WO | WO-2016085964 | A1 | 6/2016 |
| WO | WO-2016094445 | A1 | 6/2016 |
| WO | WO-2016191406 | A1 | 12/2016 |
| WO | WO-2017007942 | A1 | 1/2017 |
| WO | WO-2017059362 | A1 | 4/2017 |
| WO | WO-2017062592 | A1 | 4/2017 |
| WO | WO-2017075472 | A1 | 5/2017 |
| WO | WO-2017189437 | A1 | 11/2017 |
| WO | WO-2018034935 | A1 | 2/2018 |
| WO | WO-2018038972 | A1 | 3/2018 |
| WO | WO-2018039433 | A1 | 3/2018 |
| WO | WO-2018067996 | A1 | 4/2018 |
| WO | WO-2018098089 | A1 | 5/2018 |
| WO | WO-2018112095 | A2 | 6/2018 |
| WO | WO-2018119095 | A1 | 6/2018 |
| WO | WO-2018112095 | A3 | 7/2018 |
| WO | WO-2018140495 | A1 | 8/2018 |
| WO | WO-2018157063 | A1 | 8/2018 |
| WO | WO-2019183289 | A1 | 9/2019 |

OTHER PUBLICATIONS

American Chemical Society, "Solar smart window could offer privacy and light control on demand (video)," EurakAlert! Pub Release, Nov. 16, 2016 [https://www.eurekalert.org/pub_releases/2016-11/acs-ssw111616.php].

APC by Schneider Electric, Smart-UPS 120V Product Brochure, 2013, 8 pp.

AU Office action dated Nov. 28, 2022, in AU Application No. AU2021200070.

AU Examination Report dated Aug. 28, 2021, in the AU Application No. 2020202011.

AU Office Action dated Feb. 22, 2022, in Application No. AU2021200070.

Australian Examination Report dated Dec. 19, 2018 in AU Application No. 2017270472.

Australian Examination Report dated Feb. 21, 2019 in AU Application No. 2018201341.

Australian Examination Report dated Feb. 28, 2022, in Application No. 2017376447.

Australian Examination Report dated Mar. 31, 2017 in AU Application No. 2014219076.

Australian Examination Report dated May 20, 2021 in AU Application No. 2020202135.

Australian Examination Report dated Sep. 9, 2016 in AU Application No. 2013249621.

Australian Examination Report No. 2 dated Feb. 12, 2020 in AU Application No. 2018201341.

Australian Notice of Acceptance for Patent Application, dated Sep. 29, 2020, for Australian Patent Application No. 2015255913.

Australian Office Action dated Jul. 1, 2019 in AU Application No. 2015255913.

Benson D. K et al., "Design goals and challenges for a photovoltaic-powered electrochromic window covering", Solar Energy Materials and Solar Cells, vol. 39, No. 2/04, Dec. 1995, pp. 203-211.

Boltwood Cloud Sensor Il by Diffraction Limited, 2016, [online], [retrieved Dec. 15, 2016]. Retrieved from the internet URL http://diffractionlimited.com/product/boltwood-cloud-sensor-ii/.

CA Office Action dated Nov. 23, 2022, in Application No. CA2902106.

CA Examination Search Report dated Aug. 4, 2021, in CA Application No. 2890749.

CA Office Action dated Feb. 11, 2022, in Application No. CA2902106.

CA Office Action dated Dec. 10, 2021, in Application No. CA2934349.

CA Office Action dated Dec. 24, 2021, in Application No. CA2948668.

CA Office Action dated Oct. 4, 2022, in Application No. CA2991419.

CA Office Action dated Oct. 20, 2022, in Application No. CA2934349.

Campbell-Burns, Peter, "Building a Cloud Sensor", Farnham Astronomical Society, (Apr. 15, 2013), Retrieved from the internet: URL: https://www.farnham-as.co.uk/2813/84/building-a-cloud-sensor/ [retrieved on 2828-84-24].

(56) References Cited

OTHER PUBLICATIONS

Canadian Notice of Allowance dated Aug. 12, 2020 in Canadian Application No. 2,902,106.
Canadian Notice of Allowance dated Jan. 18, 2021 in Canadian Application No. 2,902,106.
Canadian Office Action dated Feb. 11, 2021 in CA Application No. 2,870,627.
Canadian Office Action dated Jan. 28, 2020 in Canadian Application No. 2,902,106.
Canadian Office Action dated Jul. 13, 2020 in CA Application No. 2890749.
Canadian Office Action dated Jun. 10, 2021 in CA Application No. 2,948,668.
Canadian Office Action dated Mar. 4, 2021 in CA Application No. 2,934,349.
Canadian Office Action dated Oct. 1, 2019 in CA Application No. 2890749.
Chinese Notice of Allowance & Search Report dated Sep. 12, 2019 in CN Application No. 201580035315.2.
Chinese Notice of Allowance dated Jun. 3, 2021 in CN Application No. 201680043725.6, No Translation.
Chinese Office Action dated Apr. 5, 2016 in Chinese Application No. 201280023631.4.
Chinese Office Action dated Aug. 19, 2019 in CN Application No. 201610645398.3.
Chinese Office Action dated Aug. 23, 2019 in CN Application No. 201680063892.7.
Chinese Office Action dated Dec. 1, 2016 in Chinese Application No. 201280023631.4.
Chinese Office Action dated Dec. 16, 2020 in CN Application No. 201680063892.7, with English Translation.
Chinese Office Action dated Dec. 19, 2018 in CN Application No. 201610645398.3.
Chinese Office Action dated Dec. 25, 2018 in CN Application No. 201710111979.3.
Chinese Office Action dated Feb. 2, 2021 in Chinese Application No. 201880022572.6, with English Translation.
Chinese Office Action dated Feb. 3, 2020 in Chinese Application No. 201710600395.2, with English Translation.
Chinese Office Action dated Feb. 9, 2018 in CN Application No. 201480022064.X.
Chinese Office Action dated Jan. 12, 2021 in CN Application No. 201780065447.9 with Translation.
Chinese Office Action dated Jan. 13, 2021 in Chinese Application No. 201811232377.4, with English Translation.
Chinese Office Action dated Jan. 14, 2019 in CN Application No. 201580035315.2.
Chinese Office Action dated Jan. 21, 2020 in Chinese Application No. 201811232377.4, with English Translation.
Chinese Office Action dated Jan. 9, 2020, in CN Application No. 201480068660.1, with English Translation.
Chinese Office Action dated Jul. 14, 2020 in CN Application No. 201680063892.7, with English Translation.
Chinese Office Action dated Jul. 2, 2018 in Chinese Application No. 201710111979.3.
Chinese Office Action dated Jun. 23, 2021 in Chinese Application No. 201811232377.4, with English Translation.
Chinese Office Action dated Jun. 26, 2015 in Chinese Application No. 201280023631.4.
Chinese Office Action dated Jun. 27, 2016 in Chinese Application No. 201480022064.X.
Chinese Office Action dated Jun. 28, 2020 in CN Application No. 201680043725.6.
Chinese Office Action dated Mar. 10, 2020 in CN Application No. 201610645398.3, with English Translation.
Chinese Office Action dated Mar. 26, 2015 in CN Application No. 201280060910.8.
Chinese Office Action dated May 15, 2017 in Chinese Application No. 201480022064.X.

Chinese Office Action dated May 20, 2021 in Chinese Application No. 201710600395.2, with English Translation.
Chinese Office Action dated Nov. 27, 2015 in Chinese Application No. 201280060910.8.
Chinese Office Action dated Nov. 3, 2020 in Chinese Application No. 201710600395.2, with English Translation.
Chinese Office Action dated Oct. 10, 2015 in CN Application No. 201380026428.7.
Chinese Office Action dated Sep. 29, 2019 in CN Application No. 201480068660.1.
CN Office Action dated Apr. 25, 2022, in Application No. CN201980027469.5 with English translation.
CN Office Action dated Apr. 18, 2016 in CN Application No. 201380059263.3.
CN Office Action dated Apr. 21, 2022 in Application No. CN201811232377.4 with English translation.
CN Office Action dated Apr. 27, 2022, in Application No. CN201780039437.8 with English translation.
CN Office Action dated Aug. 4, 2021, in CN Application No. 201780039437.8 with English translation.
CN Office Action dated Aug. 10, 2022, in Application No. CN201911184096.0 with English translation.
CN Office Action dated Aug. 17, 2021, in CN Application No. 201680063892.7 with English translation.
CN Office Action dated Dec. 14, 2016 in CN Application No. 201380059263.3.
CN Office Action dated Dec. 17, 2021, in Application No. CN201810555363.X.
CN Office Action dated Dec. 5, 2012 in CN200980124126.7.
CN Office Action dated Jul. 7, 2022 in Application No. CN201780084583.2 with English translation.
CN Office Action dated Jun. 26, 2017 in CN201380059263.3.
CN Office Action dated Jun. 3, 2021, in CN Application No. 201810555363.X.
CN Office Action dated Mar. 9, 2022, in Application No. CN201911184096.0.
CN Office Action dated Mar. 5, 2019 in CN Application No. 201480068660.1, with translations.
CN Office Action dated Mar. 8, 2022, in Application No. CN201680063892.7 with English translation.
CN Office Action dated May 31, 2022, in Application No. CN201880022572.6 With English Translation.
CN Office Action dated Nov. 3, 2021, in Application No. 201780065447.9 with English translation.
CN Office Action dated Nov. 8, 2021, in Application No. 201880022572.6 with English translation.
CN Office Action dated Nov. 10, 2021, in Application No. CN201811232377.4 with English Translation.
CN office action dated Nov. 24, 2021, in application No. 201780084583.2 with English Translation.
CN Office Action dated Oct. 8, 2022, in Application No. CN202010587216.8.
CN Office Action dated Oct. 14, 2022, in Application No. CN201880022572.6 With English Translation.
CN Office action dated Oct. 29, 2021 in CN Application No. CN201710600395.2 with English translation.
CN Office Action dated Sep. 5, 2022, in Application No. CN201780039437.8 with English translation.
CN Office Action dated Sep. 4, 2013 in CN200980124126.7.
Communication re Third-Party Observation dated Dec. 4, 2014 and Third-Party Observation dated Dec. 3, 14 in PCT/US2014/016974.
Decision to Grant, dated Oct. 27, 2020, for Japanese Patent Application No. JP 2019-031229, with partial translation.
Duchon, Claude E et al., "Estimating Cloud Type from Pyranometer Observations," Journal of Applied Meteorology, vol. 38, Jan. 1999, pp. 132-141.
English translation of CN201104273 description form worldwide. espacenet.com.
English translation of JP2004170350 description form worldwide. espacenet.com.
EP Extended Search Report dated Apr. 29, 2020 in EP Application No. 17881918.1.

(56) References Cited

OTHER PUBLICATIONS

EP Extended Search Report dated Dec. 4, 2020 in EP Application No. 18756696.3.
EP Extended Search Report dated Jun. 21, 2017 in EP14872953.6.
EP Extended Search Report dated Mar. 23, 2020 in EP Application No. 17807428.2.
EP Extended Search Report dated May 12, 2020 in EP Application No. 17859286.1.
EP Extended Search Report dated May 16, 2019 in EP Application No. 16852784.4.
EP First Office Action dated Jun. 8, 2021 in EP14872953.6.
EP Intention to Grant & Annex with Complementary Search dated Apr. 19, 2018 in EP09815048.5.
EP Invitation to Indicate Search dated Jun. 22, 2016 in EP Application No. 14753897.9.
EP Office Action dated Mar. 4, 2022, in Application No. EP17859286.1.
EP Office Action dated Oct. 1, 2021, in application No. EP17807428.2.
EP Partial Supplemental Search Report dated Apr. 12, 2019 in EP Application No. 16852784.4.
EP Search Report dated Mar. 20, 2012 in EP09771042.0.
EP Search Report dated Nov. 25, 2021, in Application No. EP21171305.2.
EP Search Report dated Sep. 23, 2015 in EP15160755.3.
EPO Communication dated Sep. 2, 2015 in EP Application No. 14753897.9 re Third- Party Observations.
E.S. Lee et al., Advancement of Electrochromic Windows. California Energy Commission, PIER. Publication No. CEC-500-2006-052, Apr. 2006.
European Extended Search Report dated Jan. 17, 2019 in EP Application No. 16821984.8.
European Extended Search Report dated Jan. 18, 2019 in EP Application No. 18208971.4.
European Extended Search Report dated Jun. 18, 2019 in EP Application No. 19165771.7.
European Extended Search Report dated Oct. 12, 2016 in EP Application No. 14753897.9.
European Intention to Grant, dated Jan. 18, 2021, in EP Application No. 18208971.4.
European Intention to Grant, dated Jul. 9, 2020, in EP Application No. 18208971.4.
European Intention to Grant, dated Mar. 23, 2021, in EP Application No. 18208971.4.
European Intention to Grant, dated Sep. 21, 2020, in EP Application No. 19165771.7.
European Office Action dated Dec. 12, 2017 in EP Application No. 14753897.9.
European Office Action dated Dec. 2, 2015 in EP Application No. 12841714.4.
European Office Action dated Jul. 15, 2019 in EP Application No. 13777540.9.
European Office Action dated Mar. 12, 2021 in EP Application No. 16852784.4.
European office action dated Mar. 18, 2022, in Application No. 13777540.9.
European Office Action dated Mar. 20, 2020 in EP Application No. 16852784.4.
European Office Action dated May 6, 2022 in Application No. EP14872953.6.
European Office Action dated May 15, 2017 in EP Application No. EP 12841714.4.
European Office Action dated May 3, 2021 in EP Application No. 17881918.1.
European Office Action dated Oct. 2, 2020 in EP Application No. 13777540.9.
European Office Action dated Sep. 5, 2022 in Application No. EP18756696.3.
European (Partial) Search Report dated Dec. 17, 2019 in EP Application No. 17807428.2.

European Search Report dated Aug. 11, 2014 in European Application No. 12757877.1.
European Search Report dated Jul. 23, 2014 in European Application No. 12756917.6.
European Search Report dated Jul. 29, 2014 in European Application No. 12758250.0.
European Search Report dated Mar. 5, 2015 in European Application No. 12841714.4.
European Search Report dated May 11, 2016 in EP Application No. 13777540.9.
Ex Parte Quayle Action, dated Feb. 2, 2021, in U.S. Appl. No. 16/335,222.
Extended EP Search Report dated Jul. 13, 2016 in EP13855151.0.
Extended EP Search Report dated Nov. 23, 2020 in EP20176102.0.
Extended European Search Report dated Apr. 3, 2018 in EP Application No. 15789108.6.
Extended European search report dated Oct. 10, 2022, in Application No. EP22161794.7.
Extended European Search Report dated Oct. 13, 2021, for EP Application No. EP21163294.8.
Extended European Search Report dated Oct. 15, 2020 in EP Application No. 20182982.7.
Final Office Action dated Jun. 5, 2015 in U.S. Appl. No. 13/968,258.
Graham, Steve, "Clouds & Radiation," Mar. 1, 1999. [http://earthobservatory.nasa.gov/Features/Clouds/].
Haby, Jeff, "Cloud Detection (IR v. VIS)," (known as of Sep. 3, 2014) [http://theweatherprediction.com/habyhints2/512/].
Halio Automation Brochure, halioglass.com, dated Aug. 2019, 13 pages.
"Halio Rooftop Sensor Kit (Model SR500)," Product Data Sheet, Kinestral Technologies, 2020, 4 pp.
"Halio Smart-Tinting Glass System," Product Data Sheet, Kinestral Technologies, www.kinestral.com, copyright 2017, 4 pp.
Hoosier Energy, "How do they do that? Measuring Real-Time Cloud Activity" Hoosier Energy Current Connections, (known as of Sep. 3, 2014). (http://members.questline.com/Article.aspx?articleID=18550&accountID=196000&nl=11774).
"How Cleantech wants to make a 2012 comeback" http://mountainview.patch.com/articles/how-cleantech-wants-to-make-a-2012-comeback, Jan. 23, 2012.
Humann, C., "HDR sky imaging for real time control of facades," presented Nov. 18, 2021 at Velux Build for Life conference. 21 pages of screenshots. Retrieved from internet: https://vimeo.com/647274396.
Idso, Sherwood B., "Humidity measurement by infrared thermometry," Remote Sensing of Environment, vol. 12, 1982, pp. 87-91.
IN First Examination Report dated Jul. 7, 2021 in Indian Patent Application No. 201917013204.
IN Office Action dated Dec. 17, 2021, in Application No. IN201917027304.
IN Office Action dated Dec. 18, 2019 in Application No. IN202038052140.
IN Office Action dated Feb. 25, 2022 in Application No. IN202138016166.
IN office action dated Mar. 4, 2022, in application No. 202038052140.
Indian Office Action dated Dec. 18, 2019 in IN Application No. 2371/KOLNP/2014.
Indian Office Action dated Jul. 9, 2020 in IN Application No. 201637038970.
Indian Office Action dated Jun. 10, 2021, in IN Application No. 202038025893.
Indian Office Action dated Sep. 3, 2019 in IN Application No. 3074/KOLNP/2015.
International Preliminary Report on Patentability dated Apr. 12, 2018 in PCT/US16/55005.
International Preliminary Report on Patentability dated Apr. 18, 2019 in PCT/US17/55631.
International Preliminary Report on Patentability dated Dec. 13, 2018 in PCT/US17/35290.
International Preliminary Report on Patentability dated Feb. 19, 2015 issued in PCT/US2013/053625.
International Preliminary Report on Patentability dated Jan. 13, 2011 in PCT/US2009/048679.

(56)                    References Cited

OTHER PUBLICATIONS

International Preliminary Report on Patentability dated Jan. 18, 2018 in PCT/US2016/041344.

International Preliminary Report on Patentability dated Jun. 17, 2019 in PCT/US2017/066198.

International Preliminary Report on Patentability dated Jun. 30, 2016 in PCT/US2014/071314.

International Preliminary Report on Patentability dated Mar. 31, 2011 from PCT/US2009/56928.

International Preliminary Report on Patentability dated May 1, 2014 in PCT/US2012/061137.

International Preliminary Report on Patentability dated May 28, 2015 in PCT/US2013/069913.

International Preliminary Report on Patentability dated Nov. 24, 2016 in PCT/US2015/029675.

International Preliminary Report on Patentability dated Oct. 1, 2020 issued in PCT/US2019/023268.

International Preliminary Report on Patentability dated Oct. 23, 2014 issued in PCT/US2013/036456.

International Preliminary Report on Patentability dated Oct. 30, 2014 issued in PCT/US2013/034998.

International Preliminary Report on Patentability dated Oct. 30, 2014 issued in PCT/US2013/036235.

International Preliminary Report on Patentability dated Sep. 26, 2013, issued in PCT/US2012/027742.

International Preliminary Report on Patentability dated Sep. 26, 2013, issued in PCT/US2012/027828.

International Preliminary Report on Patentability dated Sep. 26, 2013, issued in PCT/US2012/027909.

International Preliminary Report on Patentability dated Sep. 3, 2015, issued in PCT/US2014/016974.

International Preliminary Report on Patentability dated Sep. 6, 2019 issued in PCT/US2018/019737.

International Search Report and Written Opinion dated Dec. 13, 2016 in PCT/US16/55005.

International Search Report and Written Opinion dated Dec. 26, 2013, issued in PCT/US2013/053625.

International Search Report and Written Opinion dated Feb. 17, 2010 in PCT/US2009/048679.

International Search Report and Written Opinion dated Feb. 18, 2014 in PCT/US2013/069913.

International Search Report and Written Opinion dated Jan. 25, 2018 in PCT/US17/55631.

International Search Report and Written Opinion dated Jul. 11, 2013, issued in PCT/US2013/034998.

International Search Report and Written Opinion dated Jul. 23, 2013, issued in PCT/US2013/036235.

International Search Report and Written Opinion dated Jul. 23, 2015 in PCT/US2015/029675.

International Search Report and Written Opinion dated Jul. 26, 2013, issued in PCT/US2013/036456.

International Search Report and Written Opinion dated Mar. 28, 2013 in PCT/US2012/061137.

International Search Report and Written Opinion dated Mar. 30, 2018 in PCT/US2017/066198.

International Search Report and Written Opinion dated May 26, 2014 in PCT/US2014/016974.

International Search Report and Written Opinion dated May 4, 2010 from PCT/US2009/56928.

International Search Report and Written Opinion dated Nov. 25, 2020, in PCT Application No. PCT/US2020/047525.

International Search Report and Written Opinion dated Oct. 13, 2016, issued in PCT/US2016/041344.

International Search Report and Written Opinion dated Oct. 16, 2014, issued in PCT/US2014/043514.

International Search Report and Written Opinion dated Sep. 24, 2012, issued in PCT/US2012/027742.

International Search Report and Written Opinion dated Sep. 24, 2012, issued in PCT/US2012/027909.

International Search Report and Written Opinion dated Sep. 26, 2012, issued in PCT/US2012/027828.

International Search Report and Written Opinion dated Sep. 4, 2019, issued in PCT/US2019/023268.

International Search Report and Written Opinion dated Sep. 8, 2017, issued in PCT/US17/35290.

International Search Report and Written Opinion (Isa: Kipo) dated Jun. 11, 2018 issued in PCT/US2018/019737.

International Search Report dated Mar. 17, 2015 in PCT/US2014/071314.

Invitation to Pay Fees and Communication Relating to the Result of the Partial International Search, dated Jul. 12, 2019, issued in PCT/US2019/023268.

Japanese Decision of Rejection dated Oct. 24, 2018 in JP Application No. JP 2015-558909.

Japanese Office Action dated Apr. 2, 2019 in JP Application No. 2016-567021.

Japanese Office Action dated Feb. 6, 2018 in JP Application No. 2015-558909.

Japanese Office Action dated Jan. 27, 2021 in JP Application No. 2019-232669.

Japanese Office Action dated Mar. 10, 2020 in JP Application No. 2019-031229.

JP Decision to Grant a Patent dated Jul. 29, 2021, in JP Application No. 2019-232669.

JP Office Action dated Apr. 5, 2013 in JP2011-516666.

JP Office Action dated Jan. 4, 2022, in Application No. JP2020-215729.

JP Office Action dated Jul. 12, 2022, in Application No. JP2019-531271.

JP Office Action dated Oct. 12, 2021, in application No. JP2019531271 with Machine Translation.

JP Office Action dated Oct. 9, 2012 for JP2011-516666.

Kipp & Zonen, "Solar Radiation" (known as of Sep. 3, 2014) [http://www.kippzonen.com/Knowledge-Center/Theoretical-info/Solar-Radiation].

Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.

Korean Notice of Decision to Grant dated Jun. 22, 2021 in KR Application No. KR10-2015- 7026041, with English Translation.

Korean Notice of First Refusal dated Feb. 18, 2021 in KR Application No. KR10-2015- 7026041.

Korean Notification of Provisional Rejection dated Jun. 22, 2021 in KR Application No. KR10- 2016-7032512.

Korean Office Action, dated Feb. 16, 2021, for Korean Patent Application No. 10-2020- 7002032 with English Translation.

Korean Office Action, dated Jun. 15, 2020, for Korean Patent Application No. 10-2020-7002032 with English Translation.

Korean Office Action, dated Jun. 7, 2021, for Korean Patent Application No. 10-2020-7002032, with English Translation.

Korean Office Action dated Mar. 30, 2020 in KR Application No. KR 10-2015-7026041, no translation.

KR Office Action dated Apr. 27, 2022, in Application No. KR10-2016-7032512 with English Translation.

KR Office Action dated Dec. 23, 2021, in application No. 1020197011968 with English Translation.

Letter dated Dec. 1, 2014 re Prior Art re U.S. Appl. No. 13/772,969 from Ryan D. Ricks representing MechoShade Systems, Inc.

Lim, Sunnie H.N et al., "Modeling of optical and energy performance of tungsten-oxide-based electrochromic windows including their intermediate states," Solar Energy Materials & Solar Cells, vol. 108, Oct. 16, 2012, pp. 129-135.

Luo, Y., et al., "Potential Gradient-driven Fast-switching Electrochromic Device," ACS Energy Lett. 2022, 7, pp. 1880-1887, https://doi.org/10.1021/acsenergylett.2c00452.

Maghrabi, A., et al., "Design and development of a simple infrared monitor for cloud detection," Energy Conversion and Management, vol. 50, 2009, pp. 2732-2737.

Maghrabi, A., et al., "Precipitable water vapour estimation on the basis of sky temperatures measured by a single-pixel IR detector

(56) References Cited

OTHER PUBLICATIONS and screen temperatures under clear skies," Meteorological Applications, vol. 17, 2010, pp. 279-286.

"Smart Glazing: Making smart-tinting glazing even smarter", Daylighting: Design & Technology for Better Buildings, Issue 20 (Jan./Feb. 2020), 5 pages.

Melexis "MLX90614 family Datasheet" (3901090614, Rev. 004), Jul. 30, 2008, 42 pp.

Mims III, Forrest M., et al., "Measuring total col. water vapor by pointing an infrared thermometer at the sky," Bulletin of the American Meteorological Society, Oct. 2011, pp. 1311-1320.

Morris, V.R. et al., "Deployment of an infrared thermometer network at the atmospheric radiation measurement program southern great plains climate research facility," Sixteenth ARM Science Team Meeting Proceedings, Albuquerque, NM, Mar. 27-31, 2006, 11 pp.

National Aeronautics & Space Administration, "Cloud Radar System (CRS)," (known as of Sep. 3, 2014), published date of Jun. 16, 2014, [http://har.gsfc.nasa.gov/index.php?section=12].

National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134].

"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.

Notice of Allowance dated Apr. 28, 2020, in CN Application No. 201480068660.1, with search report indication no additional prior art, No Translation.

Notice of Allowance dated Aug. 16, 2021 in U.S. Appl. No. 16/695,004.

Notice of Allowance dated Aug. 24, 2021 in U.S. Appl. No. 16/695,004.

Notice of Allowance dated Dec. 9, 2021 in U.S. Appl. No. 16/388,743.

Notice of Allowance dated Feb. 25, 2021 in CA Application No. 2890749.

Notice of Allowance dated Jan. 14, 2016 for U.S. Appl. No. 14/137,644.

Notice of Allowance, dated Jun. 18, 2020 in CN Application No. 201610645398.3, No Translation.

Notice of Allowance dated Oct. 27, 2021 in U.S. Appl. No. 16/335,222.

Office Action dated Oct. 6, 2014 in U.S. Appl. No. 13/968,258.

Partial EP Search Report dated May 20, 2016 in EP13855151.0.

Partial EP Supplemental Search Report dated Nov. 29, 2017 in EP Application No. 15789108.6.

Partial European Search Report dated Jul. 6, 2021 for EP Application No. EP21163294.8.

Partial European search report dated Jun. 24, 2022, in Application No. EP21216580.7.

PCT International Preliminary Report on Patentability and Written Opinion dated Mar. 3, 2022, issued in PCT/US2020/047525.

"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).

Preliminary Amendment dated Aug. 21, 2019 for U.S. Appl. No. 16/487,802.

Preliminary Amendment dated Jul. 1, 2021, in U.S. Appl. No. 17/305,132.

Preliminary Amendment dated Jul. 10, 2020 for U.S. Appl. No. 15/929,958.

Preliminary Amendment dated Mar. 8, 2021, in U.S. Appl. No. 17/249,595.

Preliminary Amendment dated Nov. 9, 2020 for U.S. Appl. No. 17/008,342.

Preliminary Amendment for U.S. Appl. No. 15/039,370, filed Mar. 30, 2017.

Preliminary Amendment for U.S. Appl. No. 15/444,152 filed Apr. 13, 2017.

Preliminary Amendment No. 2, dated Dec. 9, 2020 for U.S. Appl. No. 16/695,004.

"Remote Sensing: Clouds," Department of Atmospheric and Ocean Science, University of Maryland, (known as of Sep. 3, 2014) [http://www.atmos.umd.edu/~pinker/remote_sensing_clouds.htm].

Reno. M, et al., "Global Horizontal Irradiance Clear Sky Models: Implementation and Analysis", Sandia Report, SAND2012-2389, 2012, pp. 1-67.

Russian Decision to Grant with Search Report dated Feb. 28, 2018 in RU Application No. 2015139884.

Russian Office Action dated Apr. 13, 2017 in RU Application No. 2014144632.

Russian Office Action dated Dec. 7, 2018 in RU Application No. 2016148196.

Russian Office Action dated Nov. 22, 2017 in RU Application No. 2014144632.

Science and Technology Facilities Council. "Cloud Radar: Predicting The Weather More Accurately." Science Daily, Oct. 1, 2008. [www.sciencedaily.com/releases/2008/09/080924085200.htm].

Selkowitz, S. et al., "Dynamic, Integrated Facade Systems for Energy Efficiency and Comfort," Journal of Buiding Enclosure Design, Summer 2006, pp. 11-17.

Singapore Search Report dated May 29, 2020 in SG Application No. 10201608572S.

Singapore Supplementary Examination Report dated Dec. 7, 2016 in SG Application No. 11201406676Q.

Smith, et al. "Measuring Cloud Cover and Brightness Temperature with a Ground Based Thermal Infrared Camera", (Feb. 2008), American Meteorological Society, vol. 47, pp. 683-693.

Subramaniam, S., "Daylighting Simulations with Radiance using Matrix-based Methods", Lawrence Berkeley National Laboratory, Oct. 3, 2017, 145 pages.

Summons to Attend Oral Proceedings and Communication dated Apr. 17, 2019 in in EP Application No. 13855151.0.

Taiwan Office Action dated May 13, 2021 in Taiwan Patent Application No. 106134521 with English Translation.

Taiwan Office Action dated Jul. 30, 2020 in ROC (Taiwan) Pat. Appln. No. 105121480, with English Translation.

Taiwanese Office Action dated Apr. 17, 2020 in TW Application No. TW 107102210, no translation.

Taiwanese Office Action dated Aug. 22, 2017 in TW Application No. 103105957.

Taiwanese Office Action dated Jan. 11, 2016 in TW Application No. 101108958.

Taiwanese Office Action dated Jan. 30, 2019 in TW Application No. 104114812.

Taiwanese Office Action dated Jun. 21, 2021 in TW Application No. TW 107106439, no translation.

Taiwanese Office Action dated May 8, 2019 in TW Application No. 107122055.

Taiwanese Office Action dated Nov. 23, 2016 in TW Application No. 105129854.

Taiwanese Office Action dated Oct. 17, 2017 in TW Application No. 106115702.

Taiwanese Office Action dated Sep. 11, 2020 in TW Application No. 109103256, with English Translation.

Taiwanese Office Action dated Sep. 16, 2020 in TW Application No. 108143706, with English Translation.

Third-Party Submission dated Feb. 2, 2015 and Feb. 18, 2015 PTO Notice re Third-Party Submission for U.S. Appl. No. 13/772,969.

Thompson, Marcus, "Boltwood cloud sensor," Cloudynights.com, Nov. 25, 2005, 6 pp. [online], [retrieved Dec. 15, 2016]. Retrieved from the internet URL http://www.cloudynights.com/page/articles/cat/user-reviews/photography/photography-accessories/boltwood-cloud-sensor-r1222.

Tseng, C-Y et al., "Improved performance mechanism of III-V compound triple-junction solar cell using hybrid electrode structure," Solar Energy, vol. 89, Jan. 19, 2013, pp. 17-22.

TW Office Action dated Sep. 15, 2022 In Application No. TW110140343 with English translation.

TW Notice of Allowance dated Sep. 9, 2021, in application No. TW110106134.

(56)          References Cited

OTHER PUBLICATIONS

TW Office Action dated Apr. 11, 2022, in Application No. TW106134521 with English Translation.
TW Office Action dated Dec. 29, 2021, in application No. TW110124070 with English Translation.
TW Office Action dated Jun. 29, 2022 In Application No. TW108109631 with English translation.
TW Office Action dated Mar. 16, 2022, in Application No. TW106143996 with English translation.
TW Office action dated Nov. 9, 2021, in TW Application No. TW110140343.
TW Office Action dated Oct. 26, 2021 in TW Application No. TW20170143996 with English translation.
TW Office Action dated Sep. 13, 2022, in Application No. TW106134521 with English Translation.
TW Reissued Office Action dated Jul. 8, 2021, in Taiwanese Application No. 107106439.
U.S. Non-Final office Action dated Aug. 31, 2022 in U.S. Appl. No. 16/469,851.
U.S. Non-Final office Action dated Jul. 14, 2022 in U.S. Appl. No. 16/487,802.
U.S Advisory Action dated Jun. 7, 2022 in U.S. Appl. No. 16/469,851.
U.S. Corrected Notice of Allowance dated Aug. 12, 2022 in U.S. Appl. No. 15/929,958.
U.S. Corrected Notice of Allowance dated Nov. 3, 2022 in U.S. Appl. No. 15/929,958.
U.S. Corrected Notice of Allowability dated Jan. 12, 2022, in U.S. Appl. No. 16/335,222.
US Corrected Notice of Allowability dated Nov. 24, 2021, in U.S. Appl. No. 16/335,222.
U.S. Corrected Notice of Allowance dated Feb. 22, 2022 in U.S. Appl. No. 15/762,077.
US Corrected Notice of Allowance dated Jan. 21, 2022 in U.S. Appl. No. 15/742,015.
U.S. Corrected Notice of Allowance dated May 18, 2022, in U.S. Appl. No. 16/303,384.
US Final Office Action dated Apr. 30, 2012 in U.S. Appl. No. 13/049,750.
US Final Office Action dated Apr. 30, 2020 in U.S. Appl. No. 15/891,866.
U.S. Final Office Action dated Aug. 19, 2013 in U.S. Appl. No. 13/049,756.
U.S. Final Office Action dated Dec. 29, 2017 for U.S. Appl. No. 15/039,370.
US Final Office Action dated Feb. 26, 2015 in U.S. Appl. No. 13/479,137.
US Final Office Action dated Jan. 11, 2019 in U.S. Appl. No. 15/891,866.
U.S. Final Office Action dated Jan. 22, 2015 for U.S. Appl. No. 14/266,576.
US Final Office Action dated Jan. 27, 2014 in U.S. Appl. No. 13/479,137.
U.S. Final Office Action dated Jul. 2, 2015 in U.S. Appl. No. 13/049,756.
US Final Office Action dated Jul. 29, 2016 in U.S. Appl. No. 13/772,969.
US Final Office Action dated Jun. 14, 2018 for U.S. Appl. No. 15/444,152.
U.S. Final Office Action dated Mar. 10, 2022, in U.S. Appl. No. 16/487,802.
US Final Office Action dated May 15, 2014 in U.S. Appl. No. 13/449,251.
US Final Office Action dated May 16, 2014 in U.S. Appl. No. 13/449,248.
US Final Office Action dated May 2, 2019 for U.S. Appl. No. 15/039,370.
U.S. Final Office Action dated May 3, 2018 for U.S. Appl. No. 15/094,897.
U.S. Non Final Office Action dated Feb. 16, 2022 in U.S. Appl. No. 15/929,958.

U.S. Non Final Office Action dated Jan. 21, 2022, in U.S. Appl. No. 16/303,384.
U.S. Non-Final office Action dated Jul. 21, 2022 in U.S. Appl. No. 17/249,595.
U.S. Non-Final Office Action dated Dec. 6, 2022 in U.S. Appl. No. 16/303,384.
U.S. Non-Final Office Action dated Oct. 13, 2022, in U.S. Appl. No. 17/304,832.
U.S. Notice of Allowance dated Aug. 24, 2022 in U.S. Appl. No. 16/303,384.
US Notice of Allowability (corrected) dated Jul. 28, 2016 in U.S. Appl. No. 14/163,026.
US Notice of Allowance (corrected) dated Jun. 9, 2020 in U.S. Appl. No. 15/442,509.
U.S. Notice of Allowance dated Feb. 25, 2013 for U.S. Appl. No. 12/145,892.
U.S. Notice of Allowance dated Apr. 14, 2014 for U.S. Appl. No. 13/903,905.
US Notice of Allowance dated Apr. 13, 2015 in U.S. Appl. No. 14/657,380.
US Notice of Allowance dated Apr. 14, 2021 in U.S. Appl. No. 16/335,222.
U.S. Notice of Allowance dated Apr. 15, 2020 for U.S. Appl. No. 15/039,370.
US Notice of Allowance dated Apr. 22, 2021 in U.S. Appl. No. 15/742,015.
U.S. Notice of Allowance dated Apr. 30, 2015 for U.S. Appl. No. 14/266,576.
US Notice of Allowance dated Apr. 4, 2016 in U.S. Appl. No. 14/535,080.
US Notice of Allowance dated Aug. 3, 2021 in U.S. Appl. No. 16/335,222.
US Notice of Allowance dated Aug. 12, 2016 in U.S. Appl. No. 14/352,973 Application No.
US Notice of Allowance dated Aug. 12, 2020 in U.S. Appl. No. 16/013,770.
US Notice of Allowance dated Aug. 12, 2021 in U.S. Appl. No. 16/335,222.
US Notice of Allowance dated Aug. 16, 2018 in U.S. Appl. No. 15/349,860.
US Notice of Allowance dated Aug. 19, 2021 in U.S. Appl. No. 15/742,015.
US Notice of Allowance dated Aug. 7, 2020 in U.S. Appl. No. 15/891,866.
U.S Notice of Allowance dated Dec. 20, 2021, in U.S. Appl. No. 15/742,015.
US Notice of Allowance dated Dec. 22, 2016 in U.S. Appl. No. 13/772,969.
U.S. Notice of Allowance dated Dec. 30, 2021, in U.S. Appl. No. 15/742,015.
U.S. Notice of Allowance dated Feb. 8, 2022 in U.S. Appl. No. 15/762,077.
US Notice of Allowance dated Jan. 10, 2014 in U.S. Appl. No. 13/449,235.
US Notice of Allowance dated Jan. 12, 2018 in U.S. Appl. No. 14/932,474.
U.S. Notice of Allowance dated Jan. 15, 2016 for U.S. Appl. No. 14/608,452.
U.S. Notice of Allowance dated Jan. 15, 2019 for U.S. Appl. No. 15/094,897.
US Notice of Allowance dated Jan. 22, 2015 in U.S. Appl. No. 13/682,618.
US Notice of Allowance dated Jan. 22, 2018 in U.S. Appl. No. 15/464,837.
US Notice of Allowance dated Jan. 27, 2017 in U.S. Appl. No. 14/931,390.
U.S. Notice of Allowance dated Jan. 8, 2016 in U.S. Appl. No. 13/049,756.
US Notice of Allowance dated Jul. 20, 2012 in U.S. Appl. No. 13/049,623.
US Notice of Allowance dated Jul. 23, 2020 in U.S. Appl. No. 16/013,770.

(56) References Cited

OTHER PUBLICATIONS

U.S. Notice of Allowance dated Jul. 26, 2022, in U.S. Appl. No. 15/929,958.
US Notice of Allowance dated Jun. 17, 2014 in U.S. Appl. No. 13/309,990.
U.S. Notice of Allowance dated Jun. 22, 2016 in U.S. Appl. No. 13/049,756.
US Notice of Allowance dated Jun. 8, 2016 in U.S. Appl. No. 14/163,026.
U.S. Notice of Allowance dated Mar. 11, 2010 for U.S. Appl. No. 12/212,482.
U.S. Notice of Allowance dated Mar. 11, 2021 for U.S. Appl. No. 16/191,138.
US Notice of Allowance dated Mar. 20, 2018 in U.S. Appl. No. 15/347,677.
U.S. Notice of Allowance dated Mar. 25, 2022 in U.S. Appl. No. 16/388,743.
US Notice of Allowance dated Mar. 31, 2021 in U.S. Appl. No. 15/742,015.
U.S. Notice of Allowance dated May 4, 2022 in U.S. Appl. No. 16/303,384.
U.S. Notice of Allowance dated May 12, 2021 for U.S. Appl. No. 15/762,077.
US Notice of Allowance dated May 13, 2021 in U.S. Appl. No. 16/695,004.
US Notice of Allowance dated May 14, 2015 in U.S. Appl. No. 13/479,137.
U.S. Notice of Allowance dated May 18, 2022, in U.S. Appl. No. 15/762,077.
US Notice of Allowance dated May 27, 2020 in U.S. Appl. No. 15/442,509.
US Notice of Allowance dated May 29, 2019 for U.S. Appl. No. 15/444,152.
US Notice of Allowance dated May 3, 2018 in U.S. Appl. No. 14/993,822.
US Notice of Allowance dated May 8, 2012 in U.S. Appl. No. 13/049,750.
US Notice of Allowance dated Nov. 16, 2018 in U.S. Appl. No. 15/349,860.
U.S. Notice of Allowance dated Nov. 30, 2016 for for U.S. Appl. No. 15/130,819.
US Notice of Allowance dated Oct. 2, 2019 in U.S. Appl. No. 15/464,837.
U.S. Notice of Allowance dated Sep. 22, 2022 in U.S. Appl. No. 15/762,077.
US Notice of Allowance dated Sep. 25, 2018 in U.S. Appl. No. 15/442,509.
US Notice of Allowance dated Sep. 3, 2019 in U.S. Appl. No. 15/442,509.
US Notice of Allowance dated Sep. 6, 2019 in U.S. Appl. No. 14/993,822.
US Notice of Allowance (supplemental) dated Jun. 12, 2015 in U.S. Appl. No. 13/479,137.
U.S. Office Action dated Oct. 3, 2013 for U.S. Appl. No. 13/903,905.
U.S. Office Action dated Nov. 8, 2012 for U.S. Appl. No. 12/145,892.
U.S. Office Action dated Feb. 3, 2011 for U.S. Appl. No. 12/145,892.
U.S. Office Action dated May 25, 2012 for U.S. Appl. No. 12/145,892.
U.S. Office Action dated Aug. 19, 2010 for U.S. Appl. No. 12/145,892.
US Office Action dated Apr. 1, 2022, in U.S. Appl. No. 16/469,851.
US Office Action dated Apr. 14, 2016 in U.S. Appl. No. 14/163,026.
U.S. Office Action dated Aug. 11, 2014 for U.S. Appl. No. 14/266,576.
U.S. Office Action dated Aug. 18, 2020 for U.S. Appl. No. 16/191,138.
US Office Action dated Aug. 28, 2017 in U.S. Appl. No. 14/932,474.
US Office Action dated Dec. 10, 2020 in U.S. Appl. No. 16/695,004.
US Office Action dated Dec. 24, 2013 in U.S. Appl. No. 13/309,990.
US Office Action dated Feb. 22, 2016 in U.S. Appl. No. 14/535,080.
US Office Action dated Feb. 24, 2015 in U.S. Appl. No. 14/163,026.
US Office Action dated Feb. 3, 2012 in U.S. Appl. No. 13/049,750.
US Office Action dated Jan. 16, 2015 in U.S. Appl. No. 14/468,778.
U.S. Office Action dated Jan. 18, 2013 in U.S. Appl. No. 13/049,756.

US Office Action dated Jan. 2, 2020 in U.S. Appl. No. 15/442,509.
US Office Action dated Jan. 23, 2020 in U.S. Appl. No. 15/762,077.
US Office Action dated Jan. 5, 2016 in U.S. Appl. No. 13/772,969.
US Office Action dated Jan. 5, 2018 in U.S. Appl. No. 15/442,509.
U.S. Office Action dated Jul. 2, 2015 for U.S. Appl. No. 14/608,452.
U.S. Office Action dated Jul. 20, 2021 for U.S. Appl. No. 16/388,743.
US Office Action dated Jul. 3, 2014 in U.S. Appl. No. 13/479,137.
U.S. Office Action dated Jul. 3, 2017 for U.S. Appl. No. 15/094,897.
US Office Action dated Jun. 11, 2020 in U.S. Appl. No. 16/303,384.
U.S. Office Action dated Jun. 16, 2017 for U.S. Appl. No. 15/039,370.
US Office Action dated Jun. 23, 2020 in U.S. Appl. No. 15/742,015.
US Office Action dated Jun. 3, 2015 in U.S. Appl. No. 13/449,251.
U.S. Office Action dated Jun. 5, 2015 for U.S. Appl. No. 14/137,644.
US Office Action dated Jun. 6, 2017 in U.S. Appl. No. 15/442,509.
US Office Action dated Mar. 12, 2019 in U.S. Appl. No. 15/464,837.
US Office Action dated Mar. 18, 2020 in U.S. Appl. No. 16/013,770.
US Office Action dated Mar. 27, 2012 in U.S. Appl. No. 13/049,623.
US Office Action dated Mar. 27, 2019 in U.S. Appl. No. 14/993,822.
US Office Action dated Mar. 3, 2021 in U.S. Appl. No. 16/303,384.
US Office Action dated Mar. 5, 2019 in U.S. Appl. No. 15/442,509.
US Office Action dated Mar. 8, 2017 in U.S. Appl. No. 14/993,822.
US Office Action dated May 18, 2018 in U.S. Appl. No. 15/891,866.
US Office Action dated May 30, 2018 in U.S. Appl. No. 15/464,837.
US Office Action dated Nov. 19, 2015 in U.S. Appl. No. 14/535,080.
US Office Action dated Nov. 2, 2017 in U.S. Appl. No. 15/349,860.
US Office Action dated Nov. 27, 2015 in U.S. Appl. No. 14/352,973 Application No.
US Office Action dated Nov. 27, 2015 in U.S. Appl. No. 14/163,026.
US Office Action dated Nov. 29, 2013 in U.S. Appl. No. 13/449,248.
US Office Action dated Nov. 29, 2013 in U.S. Appl. No. 13/449,251.
US Office Action dated Nov. 3, 2017 for U.S. Appl. No. 15/444,152.
US Office Action dated Oct. 11, 2013 in U.S. Appl. No. 13/449,235.
US Office Action dated Oct. 11, 2017 in U.S. Appl. No. 14/993,822.
U.S. Office Action dated Oct. 19, 2018 for U.S. Appl. No. 15/039,370.
US Office Action dated Oct. 21, 2019 in U.S. Appl. No. 15/742,015.
US Office Action dated Oct. 27, 2020 in U.S. Appl. No. 15/762,077.
US Office Action dated Oct. 28, 2014 in U.S. Appl. No. 13/449,251.
US Office Action dated Oct. 3, 2019 in U.S. Appl. No. 15/039,370.
U.S. Office Action dated Oct. 6, 2014 in U.S. Appl. No. 13/049,756.
US Office Action dated Sep. 14, 2018 in U.S. Appl. No. 14/993,822.
US Office Action dated Sep. 15, 2014 in U.S. Appl. No. 13/682,618.
US Office Action dated Sep. 16, 2021, in U.S. Appl. No. 16/469,851.
US Office Action dated Sep. 19, 2019 in U.S. Appl. No. 15/891,866.
US Office Action dated Sep. 21, 2021, in U.S. Appl. No. 16/487,802.
US Office Action dated Sep. 23, 2013 in U.S. Appl. No. 13/479,137.
US Office Action dated Sep. 29, 2014 in U.S. Appl. No. 13/449,248.
U.S. Appl. No. 17/931,371, inventors Shrivastava et al., filed on Sep. 12, 2022.
U.S. Appl. No. 17/931,423, inventors Shrivastava et al., filed on Sep. 12, 2022.
US Preliminary Amendment dated Oct. 30, 2019 for U.S. Appl. No. 16/013,770.
U.S. Prov. Pat. U.S. Appl. No. 63/080,899, inventor Makker et al., filed on Sep. 21, 2020.
U.S. Restriction Requirement dated Oct. 14, 2022, in U.S. Appl. No. 17/008,342.
Werner, Christian, "Automatic cloud cover indicator system," Journal of Applied Meteorology, vol. 12, Dec. 1973, pp. 1394-1400.
AU Office Action dated Feb. 15, 2023, in Application No. AU2021200070.
AU Office Action dated Feb. 21, 2023, in Application No. AU2021200070.
AU Office Action dated Jul. 3, 2023, in application No. AU20220200523.
Australian Examination Report dated Feb. 20, 2023, in Application No. AU2017376447.
CA Office Action dated Apr. 11, 2023, in Application No. CA2991419.
CA Office Action dated Jan. 10, 2023, in Application No. CA2890749.
CA Office Action dated Jun. 23, 2023, in Application No. CA3025827.
CA Office Action dated Nov. 2, 2023 in CA Application No. CA3047093.

(56)          References Cited

OTHER PUBLICATIONS

Chen, et al., "Electrochromic Properties of Tungsten-titanium Oxide Films," Journal of Nanoscience and Nanotechnology, 2012, vol. 12 (2), pp. 1296-1300.
CN Notice of Allowance dated Apr. 28, 2020 in Application No. CN 201480068660.1 with English translation.
CN Office action dated Apr. 27, 2023 in CN Application No. CN202010587216.8 with English translation.
CN Office Action dated Aug. 28, 2023, in Application No. CN202210193485.5 with English Translation.
CN Office Action dated Dec. 17, 2021, in Application No. CN201810555363.X with English translation.
CN Office Action dated Feb. 14, 2023 in Application No. CN201780084583.2 with English translation.
CN Office Action dated Jan. 5, 2023, in Application No. CN201980027469.5 with English translation.
CN Office Action dated Mar. 9, 2022, in Application No. CN201911184096.0 with EnglishTranslation.
CN Office Action dated Oct. 8, 2022, in Application No. CN202010587216.8 with English translation.
CN Office Action dated Sep. 1, 2023, in application No. CN20208072995.6 with English Translation.
CN Office Action dated Sep. 26, 2023, in Application No. CN202210751723.X with English Translation.
EP Extended European Search report dated Jun. 1, 2023, in Application No. EP23151011.6.
EP Extended European Search report dated May 4, 2023, in Application No. 21216580.7.
EP Extended European Search report dated May 15, 2023, in Application No. EP22201987.9.
EP office action dated Apr. 14, 2023, in application No. EP17859286.1.
EP office action dated Jun. 30, 2023, in application No. EP13777540.9.
EP office action dated Jun. 30, 2023, in application No. EP20768741.9.
European Office Action dated Apr. 5, 2023 in Application No. EP21163294.8.
European Office Action dated Feb. 22, 2023 for EP Application No. EP22197030.4.
European Office Action dated Feb. 23, 2023 in Application No. EP17807428.2.
International Search Report and Written Opinion dated Mar. 13, 2023 in PCT Application No. PCT/US2022/079139.
International Search Report and Written Opinion dated Sep. 8, 2023, in Application No. PCT/US2023/022140.
JP Decision to Grant a Patent dated Jul. 29, 2021, in JP Application No. 2019-232669 with English translation.
JP Office Action dated Aug. 16, 2022 in Application No. JP2021-142788 with English translation.
JP Office Action dated Jan. 4, 2022, in Application No. JP2020-215729 with EnglishTranslation.
JP Office Action dated Jan. 10, 2023 in Application No. JP2019-531271 with English translation.
JP Office Action dated Jul. 12, 2022, in Application No. JP2019-531271 with English translation.
JP Office Action dated Jun. 6, 2023 in Application No. JP2022-127648 with English translation.
JP Office Action dated Mar. 7, 2023 in Application No. JP2021-142788 with English translation.
JP Office Action dated Oct. 9, 2012 for JP2011-516666 with English translation.
JP Office Action dated Sep. 12, 2023, in application No. JP2022-180244 with English Translation.
KR Office Action dated Dec. 3, 2021, in Application No. KR1020217028534 with English translation.
KR Office Action dated Dec. 27, 2021, in Application No. KR1020217030376 with English translation.
KR Office Action dated Jul. 31, 2023, in Application No. KR10-2022-7039319 with English translation.
KR Office Action dated Mar. 6, 2023 in Application No. KR10-2022-7028868 with English translation.
KR Office Action dated Oct. 17, 2022 in Application No. KR10-2021-7030376 with English translation.
Taiwanese Office Action dated Jun. 21, 2021 in TW Application No. TW107106439 with English translation.
TW Notice of Allowance and Search Report dated Sep. 9, 2021, in application No. TW110106134 with English Translation.
TW Office Action dated Dec. 19, 2022, in Application No. TW111117328 with English translation.
TW Office Action dated Mar. 23, 2023 in Application No. TW20210146592 with English translation.
TW Office Action dated Oct. 17, 2022, in Application No. TW111114527 with English Translation.
TW Office Action dated Oct. 24, 2023 in TW Application No. 111136120, with English Translation.
U.S. Corrected Notice of Allowance dated Feb. 16, 2023 in U.S. Appl. No. 17/304,832.
U.S. Corrected Notice of Allowance dated Jun. 23, 2023, in U.S. Appl. No. 16/469,851.
U.S. Corrected Notice of Allowance dated Nov. 1, 2023, in U.S. Appl. No. 16/487,802.
U.S. Final office Action dated Aug. 17, 2023 in U.S. Appl. No. 17/303,944.
U.S. Final office Action dated Jan. 3, 2023 in U.S. Appl. No. 16/487,802.
U.S. Final office Action dated Jan. 4, 2023 in U.S. Appl. No. 17/249,595.
U.S. Final office Action dated Jul. 27, 2023 in U.S. Appl. No. 16/303,384.
U.S. Final Office Action dated Jun. 1, 2023 in U.S. Appl. No. 17/993,518.
U.S. Non-Final Office Action dated Aug. 17, 2023, in U.S. Appl. No. 17/931,423.
U.S. Non-Final office Action dated Dec. 22, 2022 in U.S. Appl. No. 17/305,132.
U.S. Non-Final Office Action dated Feb. 16, 2023 in U.S. Appl. No. 17/303,944.
U.S. Non-Final Office Action dated Feb. 16, 2023 in U.S. Appl. No. 17/993,518.
U.S. Non-Final Office Action dated Jul. 20, 2023, in U.S. Appl. No. 17/305,132.
U.S. Non-Final Office Action dated Jul. 20, 2023, in U.S. Appl. No. 17/931,371.
U.S. Non-Final Office Action dated Jun. 5, 2023, in U.S. Appl. No. 17/654,682.
U.S. Non-Final Office Action dated Mar. 14, 2023 in U.S. Appl. No. 17/008,342.
U.S. Non-Final Office Action dated May 9, 2023 in U.S. Appl. No. 17/753,098.
U.S. Non-Final Office Action dated May 11, 2023, in U.S. Appl. No. 16/982,535.
U.S. Non-Final Office Action dated May 15, 2023 in U.S. Appl. No. 16/487,802.
U.S. Non-Final Office Action dated May 24, 2023 in U.S. Appl. No. 17/654,563.
U.S. Notice of Allowance dated Apr. 3, 2023 in U.S. Appl. No. 16/469,851.
U.S. Notice of Allowance dated Feb. 1, 2023 in U.S. Appl. No. 17/304,832.
U.S. Notice of Allowance dated Jun. 22, 2023, in U.S. Appl. No. 17/008,342.
U.S. Notice of Allowance dated Mar. 1, 2023 in U.S. Appl. No. 15/762,077.
U.S. Notice of Allowance dated Mar. 13, 2023 in U.S. Appl. No. 16/469,851.
U.S. Notice of Allowance dated Mar. 16, 2023 in U.S. Appl. No. 17/305,132.
U.S. Notice of Allowance dated Mar. 24, 2023 in U.S. Appl. No. 16/469,851.
U.S. Notice of Allowance dated May 4, 2023 in U.S. Appl. No. 17/304,832.

(56) References Cited

OTHER PUBLICATIONS

U.S. Notice of Allowance dated Oct. 12, 2023, in U.S. Appl. No. 17/654,563.
U.S. Notice of Allowance dated Oct. 18, 2023 in U.S. Appl. No. 16/487,802.
U.S. Notice of Allowance dated Sep. 5, 2023, in U.S. Appl. No. 17/249,595.
U.S. Notice of Allowance dated Sep. 29, 2023 in U.S. Appl. No. 17/008,342.
U.S. Appl. No. 18/150,146, Inventors Klawuhn et al., filed Jan. 4, 2023.
U.S. Appl. No. 18/338,296, inventors Zedlitz, et al., filed Jun. 20, 2023.
U.S. Appl. No. 18/486,197, inventors Brown et al., filed Oct. 13, 2023.
Yuqiang L., et al., Preparation and Properties of WO3 Electrochromic Thin Films on the Plastic Substrate and Study on Its Characteristics, Optoelectronic Technology, 2004, vol. 24(2): 96, 3 Pages.
Zhu, H et al., Understanding Radiance (Brightness), Irradiance and Radiant Flux, Energetiq Technology, Inc., Technical Note #004-3-25-2011,2018, 4 Pages.
CA Office Action dated Feb. 23, 2024 in CA Application No. 3155214.
EP Extended European Search Report dated Apr. 12, 2024 in EP Application No. 23215819.6.
EP Extended European Search report dated Apr. 25, 2024 in EP Application No. 24152822.3.
International Preliminary Report on Patentability and Written Opinion dated May 16, 2024 in PCT Application No. PCT/US2022/079139.
JP Office Action dated Apr. 2, 2024 in JP Application No. 2022-180244 with English translation.
Kastner W., et al., "Communication Systems for Building Automation and Control," Proceedings of the IEEE, 2005, vol. 93 (6), pp. 1178-1203.
U.S. Final Office Action dated Mar. 14, 2024 in U.S. Appl. No. 17/931,423.
U.S. Appl. No. 18/592,365, inventors Zedlitz J.D, et al., filed Feb. 29, 2024.

U.S. Appl. No. 18/608,299, inventors Khanna N, et al., filed Mar. 18, 2024.
U.S. Appl. No. 18/706,177, inventor Nagle T, filed Apr. 30, 2024.
CA Office Action dated Feb. 7, 2024 in CA Application No. 3039606.
CN Office Action dated Jan. 15, 2024 in CN Application No. 202080075246.9 with EnglishTranslation.
EP Extended European Search report dated Jan. 2, 2024 in EP Application No. 23172663.9.
EP Office Action dated Feb. 2, 2024 in EP Application No. 18756696.3.
JP Office Action dated Dec. 26, 2023 in JP Application No. 2022-127648 with English Translation.
U.S. Corrected Notice of Allowance dated Feb. 14, 2024 in U.S. Appl. No. 16/487,802.
U.S. Corrected Notice of Allowance dated Feb. 23, 2024 in U.S. Appl. No. 17/305,132.
U.S. Corrected Notice of Allowance dated Jan. 29, 2024 in U.S. Appl. No. 17/305,132.
U.S. Final Office Action dated Feb. 7, 2024 in U.S. Appl. No. 17/931,371.
U.S. Final Office Action dated Jan. 23, 2024 in U.S. Appl. No. 17/654,682.
U.S. Non-Final Office Action dated Dec. 21, 2023 in U.S. Appl. No. 17/993,518.
U.S. Non-Final Office Action dated Jan. 19, 2024 in U.S. Appl. No. 17/303,944.
U.S. Notice of Allowance dated Dec. 15, 2023 in U.S. Appl. No. 16/982,535.
U.S. Notice of Allowance dated Dec. 21, 2023 in U.S. Appl. No. 16/487,802.
U.S. Notice of Allowance dated Dec. 22, 2023 in U.S. Appl. No. 17/753,098.
U.S. Notice of Allowance dated Jan. 16, 2024 in U.S. Appl. No. 17/753,098.
U.S. Notice of Allowance dated Jan. 17, 2024 in U.S. Appl. No. 17/305,132.
U.S. Notice of Allowance dated Jan. 18, 2024 in U.S. Appl. No. 17/008,342.
U.S. Appl. No. 18/404,661 inventor Brown S, filed on Jan. 4, 2024.
U.S. Appl. No. 18/429,181, inventor Brown S, filed Jan. 31, 2024.

* cited by examiner

TCO 2

EC STACK

TCO 1

Substrate

1200

1200

*1200*

*1200*

DGP: Daylight Glare Probability. Guideline is <35%

Two zone solution reduced amount of time Full Tint 4 is required

- 30 Foot-Candle (FC) considered minimum for lighting
- Daylight zone provides ~10x the light of all Tint 4 case

| Date | Time | Illuminance Levels (FC) | | Daylight Glare Probability (DGP) | |
|---|---|---|---|---|---|
| | | All Clear | Vision Tinted | All Clear | Vision Tinted |
| 21-Jun | 8 AM | 91 | | 26% | |
| | 10 AM | | 106 | | 25% |
| | 12 PM | | 57 | | 26% |
| | 2 PM | | 109 | | 24% |
| | 4 PM | 92 | | 27% | |
| | 6 PM | 36 | | 22% | |
| 21-Sep | 8 AM | | 61 | | 27% |
| | 10 AM | | 290 | | 48% |
| | 12 PM | | 387 | | 55% |
| | 2 PM | | 273 | | 45% |
| | 4 PM | | 48 | | 21% |
| | 6 PM | 17 | | 19% | |
| 21-Dec | 8 AM | 116 | | 29% | |
| | 10 AM | | 172 | | 43% |
| | 12 PM | | 432 | | 44% |
| | 2 PM | | 165 | | 42% |
| | 4 PM | | 23 | 23% | |
| | 6 PM | 1 | | 1% | |

☐ Electric lighting needed

■ All Tint 4 needed

FIG. 15

Figure 16:
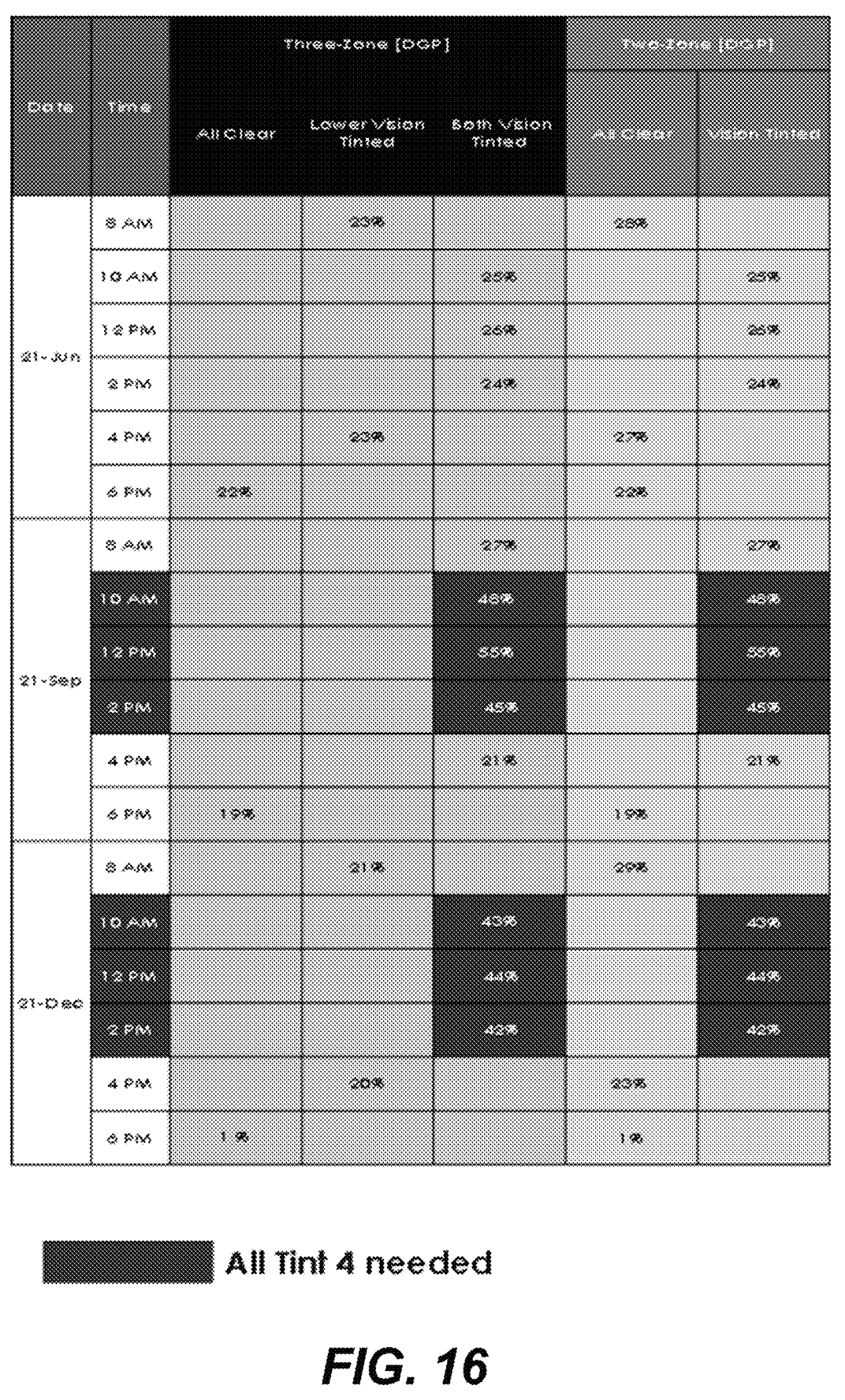

| Date | Time | Three-Zone [DGP] | | | Two-Zone [DGP] | |
|---|---|---|---|---|---|---|
| | | All Clear | Lower Vision Tinted | Both Vision Tinted | All Clear | Vision Tinted |
| 21-Jun | 8 AM | | 23% | | 25% | |
| | 10 AM | | | 25% | | 25% |
| | 12 PM | | | 26% | | 26% |
| | 2 PM | | | 24% | | 24% |
| | 4 PM | | 23% | | 27% | |
| | 6 PM | 22% | | | 22% | |
| 21-Sep | 8 AM | | | 27% | | 27% |
| | 10 AM | | | 48% | | 48% |
| | 12 PM | | | 55% | | 55% |
| | 2 PM | | | 45% | | 45% |
| | 4 PM | | | 21% | | 21% |
| | 6 PM | 19% | | | 19% | |
| 21-Dec | 8 AM | | 21% | | 29% | |
| | 10 AM | | | 43% | | 43% |
| | 12 PM | | | 44% | | 44% |
| | 2 PM | | | 43% | | 43% |
| | 4 PM | | 20% | | 23% | |
| | 6 PM | 1% | | | 1% | |

All Tint 4 needed

METHODS OF CONTROLLING MULTI-ZONE TINTABLE WINDOWS

INCORPORATION BY REFERENCE

An Application Data Sheet is filed concurrently with this specification as part of the present application. Each application that the present application claims benefit or priority to as identified in the concurrently filed Application Data Sheet is incorporated by reference herein in their entireties and for all purposes.

FIELD

Certain embodiments disclosed herein relate to window controllers and methods for controlling smart windows, particularly tinting windows grouped in a zone of windows and/or tinting multi-zoned smart windows such as multi-zone electrochromic windows.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken and reversing the voltage causes them to lighten. This capability allows control of the amount of light that passes through the windows, and presents an opportunity for electrochromic windows to be used as energy-saving devices.

While electrochromism was discovered in the 1960s, electrochromic devices, and particularly electrochromic windows, still unfortunately suffer various problems and have not begun to realize their full commercial potential despite many recent advances in electrochromic technology, apparatus and related methods of making and/or using electrochromic devices.

SUMMARY

Thin-film optical devices, for example, electrochromic devices for windows, and methods and window controllers for controlling transitions and other functions of multi-zone tintable windows using such devices are described herein. Certain embodiments comprise an electrochromic window having two or more tinting (or coloration) zones, e.g. formed from a monolithic electrochromic device coating as physically separate zones or where tinting zones are established in the monolithic device coating. Tinting zones may be defined by virtue of the means for applying electrical potential to the electrochromic device and/or by a resistive zone between adjacent tinting zones and/or by physical bifurcation of the device into tinting zones. For example, a set of bus bars may be configured to apply potential across each of the separate tinting zones of the monolithic electrochromic device to tinting zones selectively. Methods may also apply to a group of tintable windows, where individual windows of the group are tinted independently of others in order to maximize occupant experience, i.e. glare control, thermal comfort, etc.

Certain aspects pertain to an insulated glass unit (IGU) comprising a first lite comprising a first electrochromic device disposed on a first transparent substrate and comprising a plurality of independently-controllable tinting zones and a resistive zone between adjacent independently-controllable tinting zones. The IGU further comprising a second lite and a spacer between the first and second lites. In one case, the second lite comprises a second electrochromic device disposed on a second transparent substrate. In one case, the IGU further comprises a daylighting zone located, e.g., in a top portion of the IGU, wherein the daylighting zone comprises one or more tinting zones held in the bleached state to allow sunlight to pass through the first and second lites.

One aspect pertains to a control system for independently controlling tinting zones of a multi-zone tintable window. The control system comprises a window controller and multiple voltage regulators connected in parallel to the window controller, each voltage regulator connected to one bus bar of a tinting zone of multi-zone tintable window.

One aspect pertains to a control system for independently controlling tinting zones of a multi-zone tintable window. The control system comprises a plurality of subcontrollers, each subcontroller is connected to a pair of bus bars of one of the tinting zones of the multi-zone tintable window and a window controller connected in series to the plurality of sub controllers.

Certain aspects pertain to methods of controlling tint in a plurality of tinting zones of a multi-zone window or a group (zone) of tintable windows. The method determines a projection of direct sunlight through each of the plurality of tinting zones of the multi-zone window or the group of tintable windows. The method also determines an intersection between an occupancy region and the projections. The method then determines a tint level for each of the tinting zones (or tintable windows) based on the intersection. In addition, the method provides instructions to transition tint of one of the tinting zones (or tintable windows) to the tint level determined for the tinting zone.

Certain aspects pertain to methods of controlling a multi-zone tintable window, or one or more tintable windows in a group of windows, in a room of a building. The methods comprise determining whether the room is likely to be occupied. If the room is determined likely not to be occupied, the methods determine a tint level for each tinting zone of the multi-zone tintable window, or a tint level for each window of a group of tintable windows, based on energy control in the building. If the room is determined likely to be occupied, the methods determine the tint level for each tinting zone of the multi-zone tintable window, or window of the group of tintable windows, based on one or more factors including avoiding glare on an occupancy region in the room. The methods also provide instructions to transition each of the tinting zones or windows to the determined tint level. In one case, if the room is determined likely to be occupied, determining the tint level for each tinting zone is based on one or more factors including, in order of priority, avoiding glare on an occupancy region in the room, energy control, and daylighting. Methods include control of a group of multi-zoned tintable windows and monolithic tintable windows together.

These and other features and embodiments will be described in more detail below with reference to the drawings.

BRIEF DESCRIPTION OF THE DRAWINGS

FIG. 15 is a chart of a tinting schedule for the multi-zone window including illuminance levels and DGP values, according to an embodiment.

FIG. 16 is a chart of a tinting schedule for a multi-zone window having two zones and for a multi-zone window having three zones, according to an embodiment.

DETAILED DESCRIPTION

Figure 1:
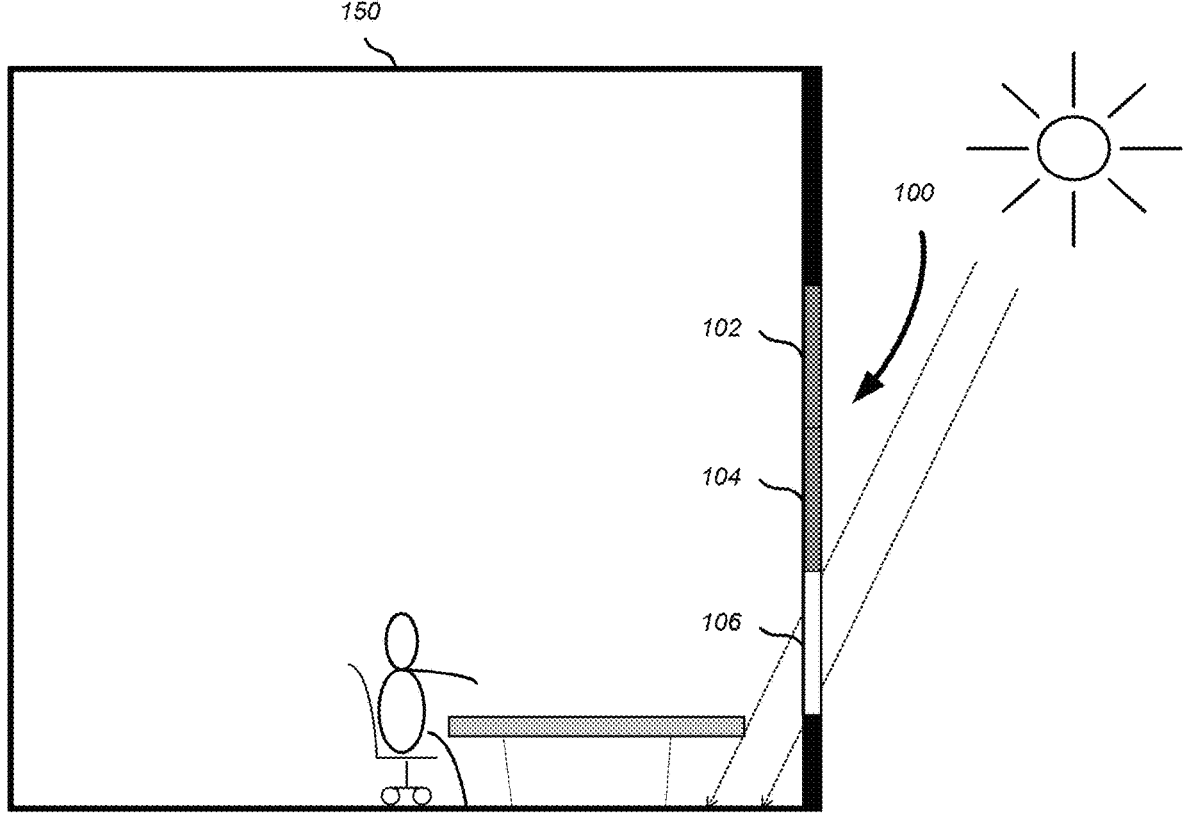
FIG. 1 is a schematic illustration of a multi-zone tintable window with three tinting zones having a bottom tinting zone in a lighter tint state, according to an embodiment.

In the following description, numerous specific details are set forth in order to provide a thorough understanding of the presented embodiments. The disclosed embodiments may be practiced without some or all of these specific details. In other instances, well-known control operations have not been described in detail to not unnecessarily obscure the disclosed embodiments. While the disclosed embodiments will be described in conjunction with the specific embodiments, it will be understood that it is not intended to limit the disclosed embodiments. Certain embodiments described herein, although not limited as such, work particularly well with electrochromic devices. Certain embodiments are described in relation to controlling a tintable window having multiple tinting zones; the methods may also be used to tint individual windows in a group (or zone) of tintable windows, or combinations of such windows.

I. Introduction to Multi-Zone Tintable Windows

Certain implementations described herein are related to controlling tinting and other functions of multi-zone tintable windows, and more specifically, to independently controlling each of the tinting (or coloration) zones in a multi-zone tintable window. In some implementations, the multi-zone tintable window is in the form of an insulated glass unit comprised of two or more lites and a spacer sealed between the lites. Each multi-zone tintable window has at least one tintable lite with an optically switchable device. Some examples are described herein with respect to a multi-zone tintable window having an electrochromic lite with an electrochromic device disposed on the transparent substrate. In these examples, the electrochromic lite generally has one or more monolithic electrochromic (EC) devices, each monolithic EC device having multiple tinting (or coloration) zones. In one implementation, the electrochromic lite has a monolithic electrochromic (EC) device disposed over at least a portion of the substrate that is in the viewable area of the tintable window.

Detailed examples of methods of fabricating electrochromic lites with multiple tinting zones can be found in U.S. patent application Ser. No. 14/137,644, titled "Multi-Zone EC Windows" and filed on Mar. 13, 2013, which is hereby incorporated by reference in its entirety. In one implementation, tinting zones of an electrochromic lite are defined by virtue of a resistive region (also called a resistive zone) between adjacent tinting zones and/or by the different techniques used to apply a potential to the electrochromic device to independently control tinting in the tinting zones. For example, a single set of bus bars or different sets of bus bars can be configured to be able to apply potential independently to each tinting zone independently to thereby tint them selectively. With respect to the above mentioned resistive zone, this region allows independently controllable tinting of adjacent tinting zones of a single electrochromic device without destroying the tinting functionality in the resistive zone itself. That is, the resistive zone can be tinted. One advantage of these techniques is that scribe lines cutting through the electrochromic device between tinting zones are not used. These scribe lines can create non-functioning areas of the electrochromic device that can create a visually perceptible bright line in the viewable area of the window when tinted. Moreover, a resistive zone can have gentle tinting gradient between adjacent tinting zones held in different tint states. This tinting gradient blends the transition in tint between adjacent tinting zones to soften the appearance of the transition area between the tinting zones.

II. Multi-Zone Tinting Configurations

Certain implementations described herein are related to different tinting configurations of one or more multi-zone tintable windows, each multi-zone tintable window having multiple independently-controllable tinting zones. In each multi-zone tinting configuration, various tint states can be selected across the tinting zones to provide a particular benefit(s) to an occupant of a building and/or for the building itself. As such, certain embodiments provide tinting methods that are based, at least in part on occupancy of the space, whether actual or anticipated occupancy.

A. Goals of Occupant and/or Building

There are motivations to control tint states of a tintable window for occupant benefit and/or considering the building alone, e.g. energy savings, power requirements and the like. Here, an "occupant" generally refers to an individual or individuals of a particular room having one or more tintable windows being controlled and a "building" refers to the building management system (BMS) together with lighting, HVAC systems, and other building systems. Motivations related to occupancy may include their general wellness that can be affected by lighting in the room and the aesthetics of a tinted window or group of windows. Motivations include, for example, controlling glare from direct sunlight onto an occupant's workspace, visibility through the window to outside the building (their "view"), color of the tintable window and associated color of light in the room, and thermal comfort adjusted tint states to either block or transmit direct sunlight into the room. Although an occupant may want to generally avoid glare onto their workspace, they may also want to allow some sunlight through the window for natural lighting. This may be the case where an occupant prefers sunlight over artificial lighting from, for example, incandescent, light-emitting diode (LED), or fluorescent lighting. Also, it has been found that certain tintable windows may impart too much of a blue color to the room in their darker tint states. This blue color is offset by allowing a portion of unfiltered daylight to enter the room. User motivations related to the building include lowering energy use through reduction of heating, air-conditioning, and lighting. For example, one might want to tint the windows to transmit a certain amount of sunlight through the window so that less energy is needed for artificial lighting and/or heating. One may also want to harvest the sunlight to collect the solar energy and offset heating demand.

Another consideration, perhaps shared by both the building manager and the occupant is related to security concerns. In this regard, it may be desirable for a window to be darkly tinted so that those outside a room cannot see the occupant. Alternatively, it may be desirable that a window be in a clear state so that, for example, neighbors or police outside the building can see inside the building to identify any nefarious activity. For example, a user or a building operator may set a window in an "emergency mode" which in one case may clear the windows.

B. Glare Reduction Using Multi-Zone Designs and Tinting Configurations

In many cases, glare avoidance can be responsible for as much as 95% of tinting decisions made for tintable windows. Methods of making tinting decisions in tintable windows that account for glare avoidance are described in detail in PCT Application No. PCT/US15/29676, filed on May 7, 2015 and titled "CONTROL METHOD FOR TINTABLE WINDOWS," which is hereby incorporated by reference in its entirety. In these methods, using proprietary algorithms trademarked under the name Intelligence® (by View, Inc. of Milpitas, California), glare is addressed in operations of a Module A. In Module A, decisions are made to determine whether to adjust the tint state of a tintable window based on the penetration depth or glare region caused by solar radiation transmitted through the window into the room. If the penetration depth or glare region where the solar radiation impacts the room overlaps with the position or likely position of an occupant (occupancy region), the tintable windows in the façade are held in or transitioned to a darker tint state in order to reduce glare on this occupancy region. Existing algorithms tint e.g. a whole group of windows associated with a building space based on glare, at the expense of other user comfort considerations.

Methods herein provide granularity and flexibility to tinting decisions by independently tinting one or more windows of a group of windows and/or individual zones of one or more multi-zone windows, e.g. to address glare while also allowing natural daylight into the space and thus address multiple user comfort issues and/or building systems requirements simultaneously. For example, reducing glare is an objective that is often inconsistent with reducing the heating load of a building, increasing natural lighting, etc. In the winter, for example, the energy used to heat a room by the heating system can be reduced by clearing a tintable window to allow more solar radiation to enter the room, which can also generate a glare scenario in an occupancy region. In certain configurations described herein, a multi-zone tintable window (or individual windows of a group of windows) can be controlled to address this concern by limiting the area of the window (or subset of group of windows) placed in a darkened tint to those tinting zones that reduce glare on the location or likely location of the occupant in the room. Although many examples are described herein with respect to controlling tinting zones in a multi-zone tintable window, it would be understood that similar techniques would apply to an assembly of multiple tintable windows, each tintable window having one or more tinting zones. For example, an assembly of tintable windows can be controlled to limit the area of the assembly of windows placed in a darkened tint to those tintable windows and/or tinting zones within tintable windows that reduces glare on the occupancy region.

Glare Reduction Tinting Configuration A

In one particular glare reduction configuration, a multi-zone tintable window is controlled to place (hold or transition) tinting zones in a darkened state that are in an area of the tintable window that can reduce glare on the location or likely location of an occupant while placing the other tinting zones of the multi-zone tintable window in lighter tint states to allow ambient light to enter, for example, to reduce heating/lighting. This configuration may be used for "daylighting." As used herein, "daylighting" generally refers to an architectural strategy that uses natural light to satisfy illumination requirements and potential color offset while mitigating potential visual discomfort to occupants such as, for example, from glare. Glare can be from direct sunlight shining onto the occupant's workspace or in the eyes of the occupants. This configuration and other daylighting examples described herein can provide benefits including the reduction of the blue color from light in the tinted zones due to visual perception change with added natural light in the room.

Examples of tinting zones that are controlled based on this glare reduction configuration are described below in certain cases with reference to a multi-zone tintable window having multiple independently controllable tinting zones. It would be understood that these examples can also apply in a similar way to an assembly of independently controllable tintable windows or a combination of multi-zone windows and monolithic tintable windows.

Lighter Tinted Lower Zone(s)

In one example of this glare control configuration, the lower tinting zone(s) of a multiple zone window in vertical wall are controlled to be tinted lighter than one or more higher tinting zones in the multi-zone window. The control configuration may be used, for example, in a scenario where the sun is at a mid to high position in the sky and the lower tinting zone or zones may be in a low location that receives sunlight at such an angle that direct sunlight does not penetrate deep into the room and therefore does not create a glare in an occupancy region located near the window. In this case, the lower tinting zone(s) can be cleared or controlled in a manner that allows maximum light into the room and to minimize heat load needed to heat the room, while the middle and/or top tinting zone(s) of the window can be darkened to reduce glare on the occupancy region.

FIG. 1 is a schematic illustration of an example of a multi-zone tintable window 100 with three vertically arranged tinting zones: a first (top) tinting zone, a second (middle) tinting zone, and a third (lower) tinting zone, according to an embodiment. The multi-zone tintable window 100 is located in room 150 in an external vertical wall between the inside and outside of the building. The multi-zone tintable window 100 comprises a first tinting zone 102, a second tinting zone 104, and third tinting zone 106. In this example, the second tinting zone 104 is between the first tinting zone 102 and the third tinting zone 106. Although three zones are used in this illustrated example, other numbers and arrangements of tinting zones can be used.

In the illustrated scenario shown in FIG. 1, the sun is at a mid to high position in the sky. In this scenario, the tintable window is controlled such that the first tinting zone 102 and the second tinting zone 104 are in a darkened tint state and the third tinting zone 106 is in is lighter tint state (e.g., a bleached state). The third tinting zone 106 at the bottom of the window 100 is in a lighter tint state to allow natural light from the sun to enter the room from a high solar position while the first and second tinting zones 102 and 104 are in a darkened tint state to avoid glare from sunlight projected onto the region of the occupied desk. Without this tinting control configuration, sunlight through the first (top) tinting zone 102 and the second (middle) tinting zone 104 would shine onto the occupied region. With this configuration, sunlight through the third (lower) tinting zone 106 enters the room projecting onto an unoccupied region of the room (depicted by arrows) which can help provide ambient light to the room and heat the room while avoiding glare for the occupant.

Lighter Tinted Top Zone(s)

In this example, a multi-zone tintable window is controlled such that has a top area is lighter than the lower area. For example, the tinting zone (or multiple zones at the top) may be tinted lighter than one or more tinting zones of the multi-zone tintable window or the top area of the window. In another example, the top area of the window may have a transparent substrate only (no optically switchable device). In these examples, the lighter top zone(s) can act in a similar fashion to a "transom window" by allowing natural ambient light to enter the room at a high level while controlling glare near the window. This example and others daylighting examples described herein can provide benefits including the reduction of the blue color from light in the tinted zones due to visual perception change with added natural light in the room.

Figure 2:
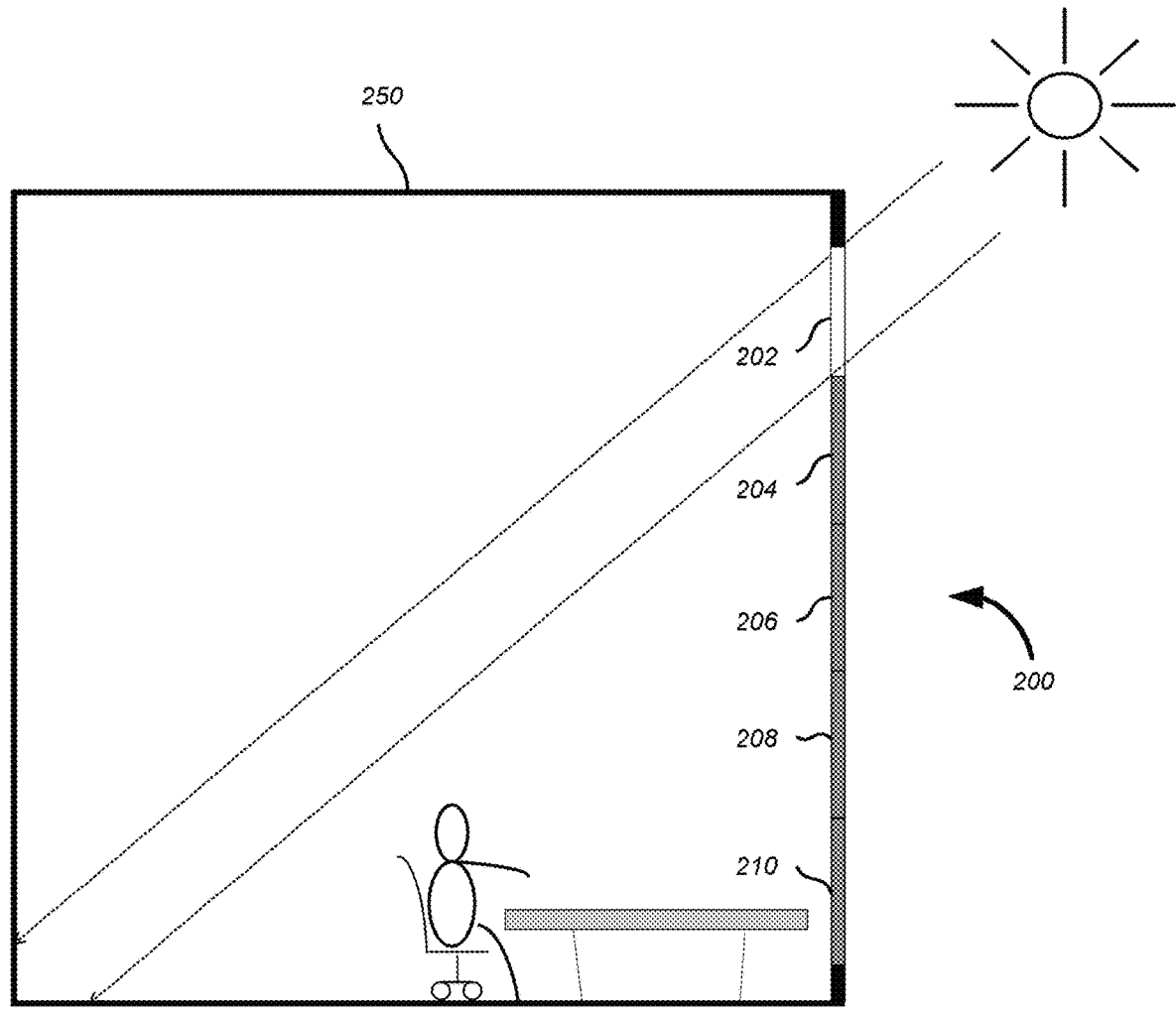
FIG. 2 is a schematic illustration of a multi-zone tintable window with five tinting zones having a top tinting zone in a lighter tint state in a transom window configuration, according to an embodiment.

FIG. 2 is a schematic illustration of this example with a multi-zone tintable window 200 with five tinting zones, according to an embodiment. The multi-zone tintable window 200 is located in the external vertical wall of a room 250, between the inside and outside of a building. The multi-zone tintable window 200 comprises a first tinting zone 202 at the top of the window 200 and four other tinting zones 204, 206, 208, and 210 below the first tinting zone 202.

In the illustrated scenario shown in FIG. 2, the sun is at a high position in the sky. In this scenario, the tinting zones are controlled such that the first tinting zone 202 is in a first tint state, the lightest tint state (e.g., bleached or clear state), and the other tinting zones 204, 206, 208, and 210 are in a second tint state that is darker than the first tint state. With the illustrated tinting control configuration, the first tinting zone 202 allows natural light from the sun at a high altitude to enter the room while preventing glare from direct sunlight projecting onto the occupancy region with the desk and the occupant. Instead, the direct sunlight through the first tinting zone 202 projects (depicted by arrows) glare onto an unoccupied region of the room. Although five zones are used in this illustrated example, other numbers and arrangements of tinting zones can be used.

In another example this glare configuration, a multi-zone tintable window may include a top transparent substrate only portion with no optical device and a bottom portion with an optically switchable device having one or more tinting zones. For example, the multi-zone tintable window may have a monolithic electrochromic device with one or more tinting zones at a bottom portion of the window and a daylighting transparent substrate strip or zone at the top.

In another example of this glare configuration and possibly other configurations for other purposes, a multi-zone tintable window comprises one or more tinting zones that can be controlled to have a tinting gradient from one side to an opposing side, according to an embodiment. In one case, the top tinting zone has a tinting gradient that starts at a bleached tint state at one side and increases in tint toward the opposing side. That is, there is no abrupt change in tint as in physically separate zones, where high contrast between zones can be distracting and unattractive to the end user.

Figure 3:
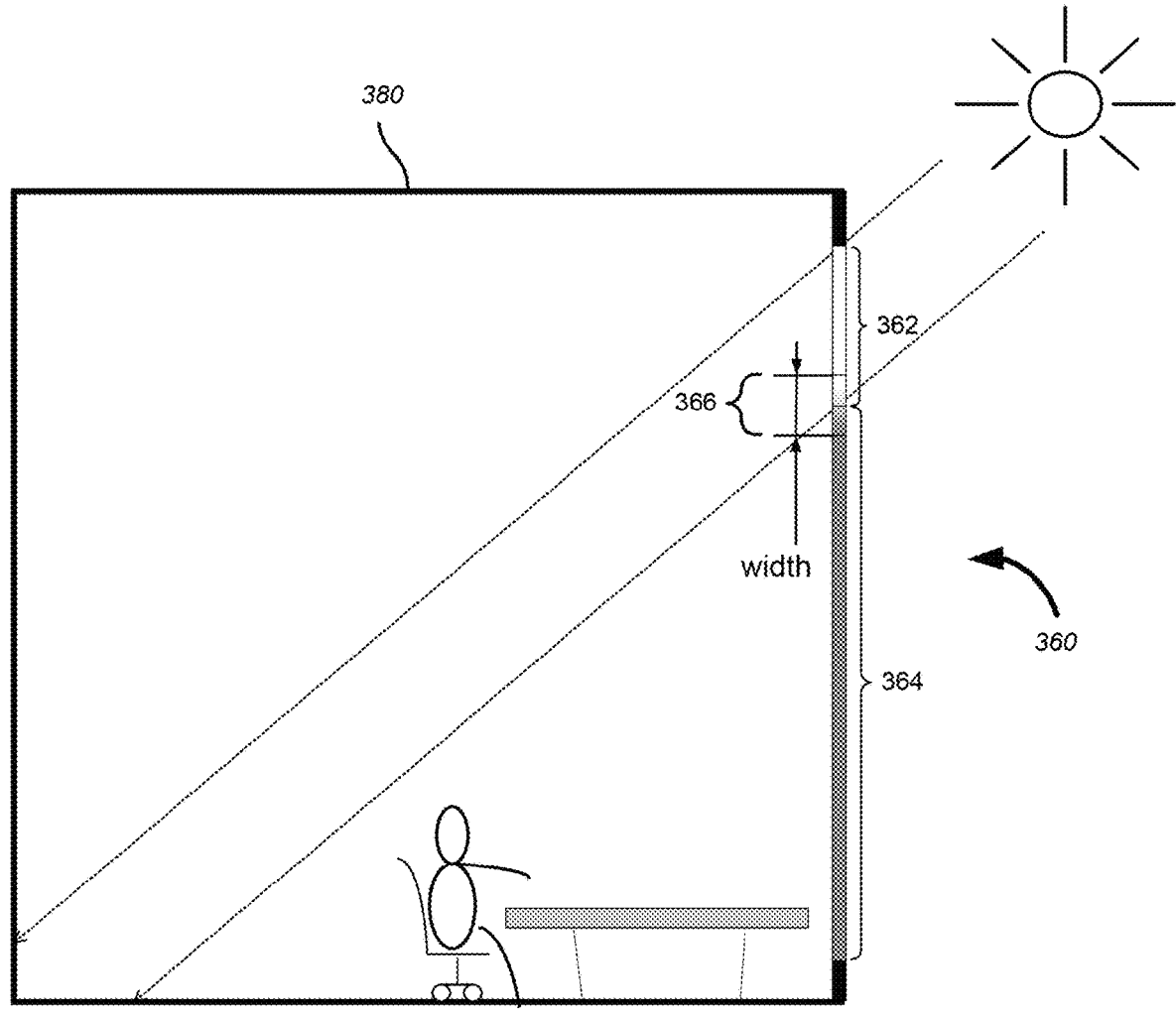
FIG. 3 is a schematic illustration of a multi-zone tintable window with two tinting zones having a top tinting zone in a lighter tint state than the bottom tinting zone, and with a resistive zone with a tinting gradient between the tinting zone, according to an embodiment.

FIG. 3 is a schematic illustration of this example with a multi-zone tintable window 360 having a tinting gradient, according to an embodiment. The multi-zone tintable window 360 is located in the external vertical wall of a room 380, between the inside and outside of a building. The multi-zone tintable window 360 comprises a first tinting zone 362 at the top of the window 360 and a second tinting zone 364 below the first tinting zone 362. In the depicted illustration, the first tinting zone 362 is in a first tint state, which is the lightest tint state (e.g., bleached state), and the second tinting zone 364 is in a second tint state that is darker than the first tint state. With the illustrated tinting, the first tinting zone 362 allows natural light from the sun at a high altitude to enter the room while preventing glare from direct sunlight projecting onto the illustrated occupancy region having a desk and a seated occupant. The direct sunlight through the first tinting zone 362 projects (depicted by arrows) glare onto an unoccupied region at the back of the room. In this particular example, the multi-zone tintable window 360 also has a tinting gradient region 366 comprising a resistive zone with a width. The tinting gradient region 366 has a tinting gradient between the tint states of the adjacent first and second tinting zones 362 and 364. That is, the tinting gradient distance (or width) may be measured, e.g., from the beginning of one zone where the % T begins to vary, through and including the change in % T into the adjacent zone, ending where the % T of that second zone becomes constant. In one aspect, the width of the gradient portion is about 10". In another aspect, the width of the gradient portion is in the range of 2" to 15." In another aspect, the width of the gradient portion is in the range of 10" to 15". In one aspect, the width of the gradient portion is about 5". In one aspect, the width of the gradient portion is about 2". In one aspect, the width of the gradient portion is about 15". In one aspect, the width of the gradient portion is about 20". In one aspect, the width of the gradient portion is about 20". In one aspect, the width of the gradient portion is at least about 10". In one aspect, the width of the gradient portion is at least about 16". In one aspect, the width of the gradient portion covers the entire width or about the entire width of the multi-zone tintable window. In this case, the window can have a continuous gradient from light to dark across the entire window. In another aspect, the width of the gradient portion less than 5 inches.

Lighter Tinted Middle Zone(s)

Although certain examples of multi-zone tintable windows in a glare reduction configuration have placed either the top zone(s) or lower zone(s) in a lighter tint state, other examples may darken top or lower zones to control glare while clearing or placing in a lighter tint state one or more middle zones between the top and bottom zones. For example, a multi-zone tintable window located very low or high in a room may have having a tinting configuration that clears or placing in a lighter tint state a middle zone or multiple middle zones. As another example, a single multi-zone tintable window spanning multiple floors e.g., an open mezzanine or loft in a single room may have a tinting configuration that clears a middle zone or multiple middle zones.

Figure 4:
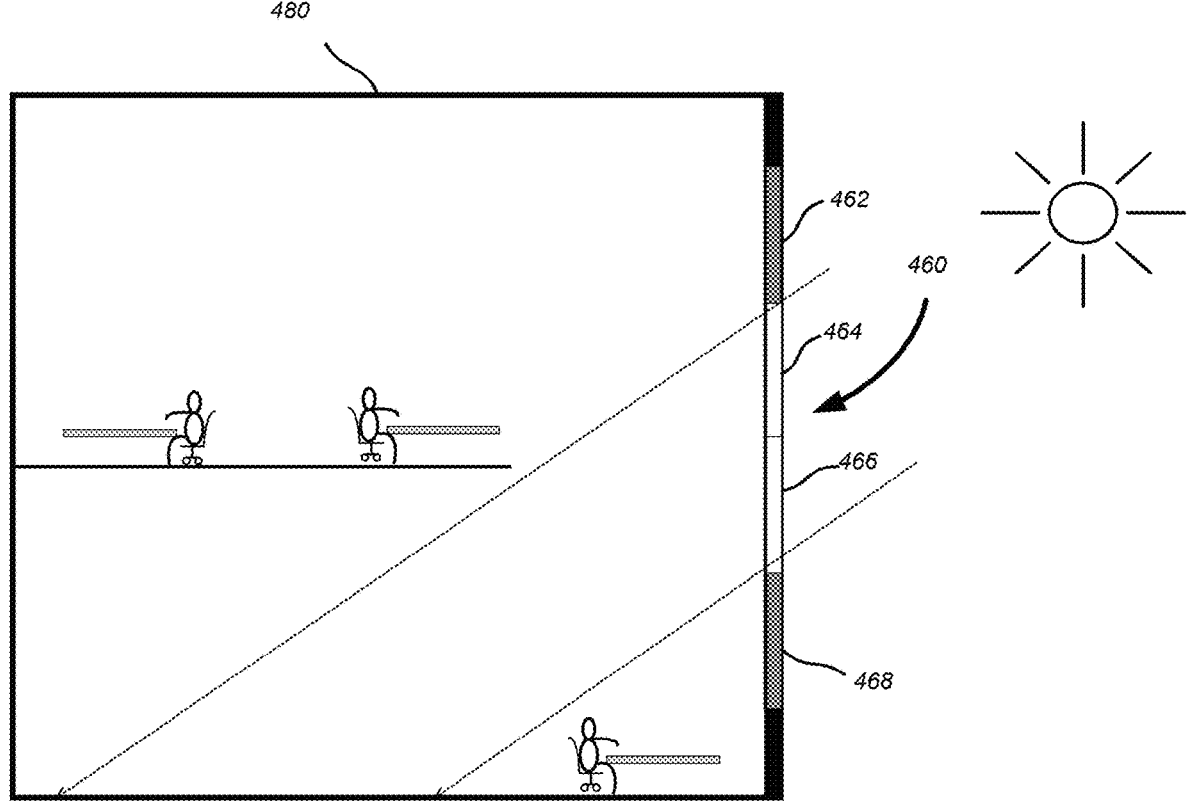
FIG. 4 is a schematic illustration of a multi-zone tintable window with five tinting zones with a middle tinting zone in a lighter tint state, according to an embodiment.

FIG. 4 is a schematic illustration a multi-zone tintable window 460 with four tinting zones 462, 464, 466, and 468 in a room 480, according to an aspect. The room has a second mezzanine floor with two desks and a lower floor with a single desk. The multi-zone tintable window 460 is located in the external wall of a room 480, between the inside and outside of a building. The multi-zone tintable window 460 comprises a first tinting zone 462, a second tinting zone 468, and two middle zones 464 and 466 between the first tinting zone 462 and the second tinting zone 468. In this illustration, the two middle tinting zones 464 and 466 are in a first tint state (e.g., bleached state) and the other tinting zones 462 and 468 are in a second tint state that is darker than the first tint state. With the illustrated tinting, the middle tinting zones 464 and 466 allow natural light from the sun to enter the room 480 between the occupancy regions to reduce lighting/heating loads. This tinting also prevents glare from the direct sunlight projecting onto the occupancy regions on the mezzanine floor and the lower floor.

Although many examples of multi-zone tintable windows in a glare reduction configuration are described herein with multiple full width tinting zones arranged along the length of the window, other examples may include full length tinting zones arranged along the width of the window. Alternatively, it is contemplated that a multi-zone tintable window may comprise rectangular tinting zones (digitized design) corresponding to a two-dimensional array of locations along the length and width of the window.

Skylight Example

In another example of this glare reduction configuration, a skylight comprises a plurality of multi-zone tintable windows at different facets facing different angles. Each window has multiple tinting zones, and the multi-zone windows are controlled as a group to allow ambient light to enter while controlling glare in occupied or likely occupied regions.

Figure 5A:
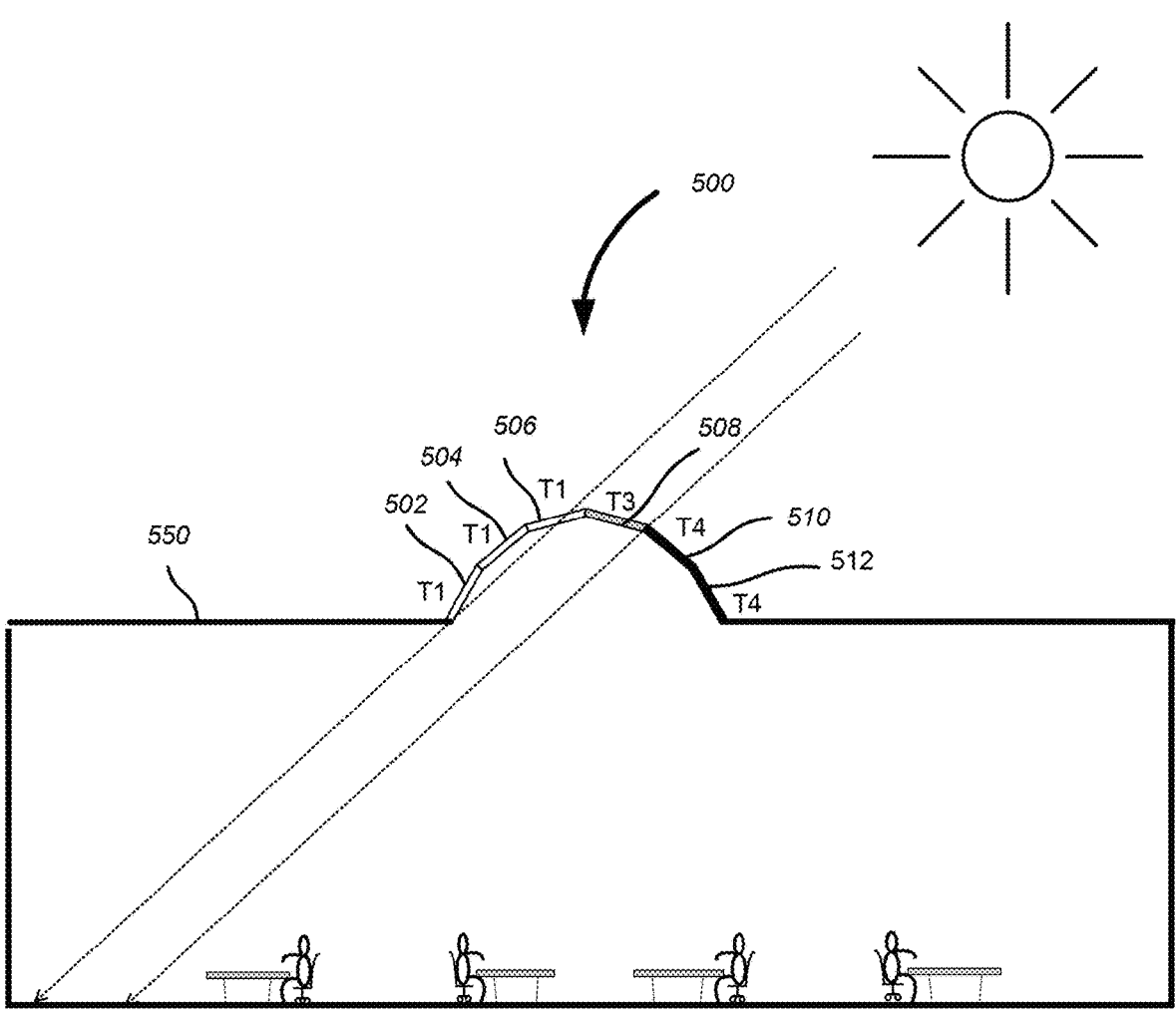
FIGS. 5A and 5B are schematic illustrations of a multi-faceted skylight, each facet having a multi-zone tintable window, according to an embodiment.
Figure 5B:
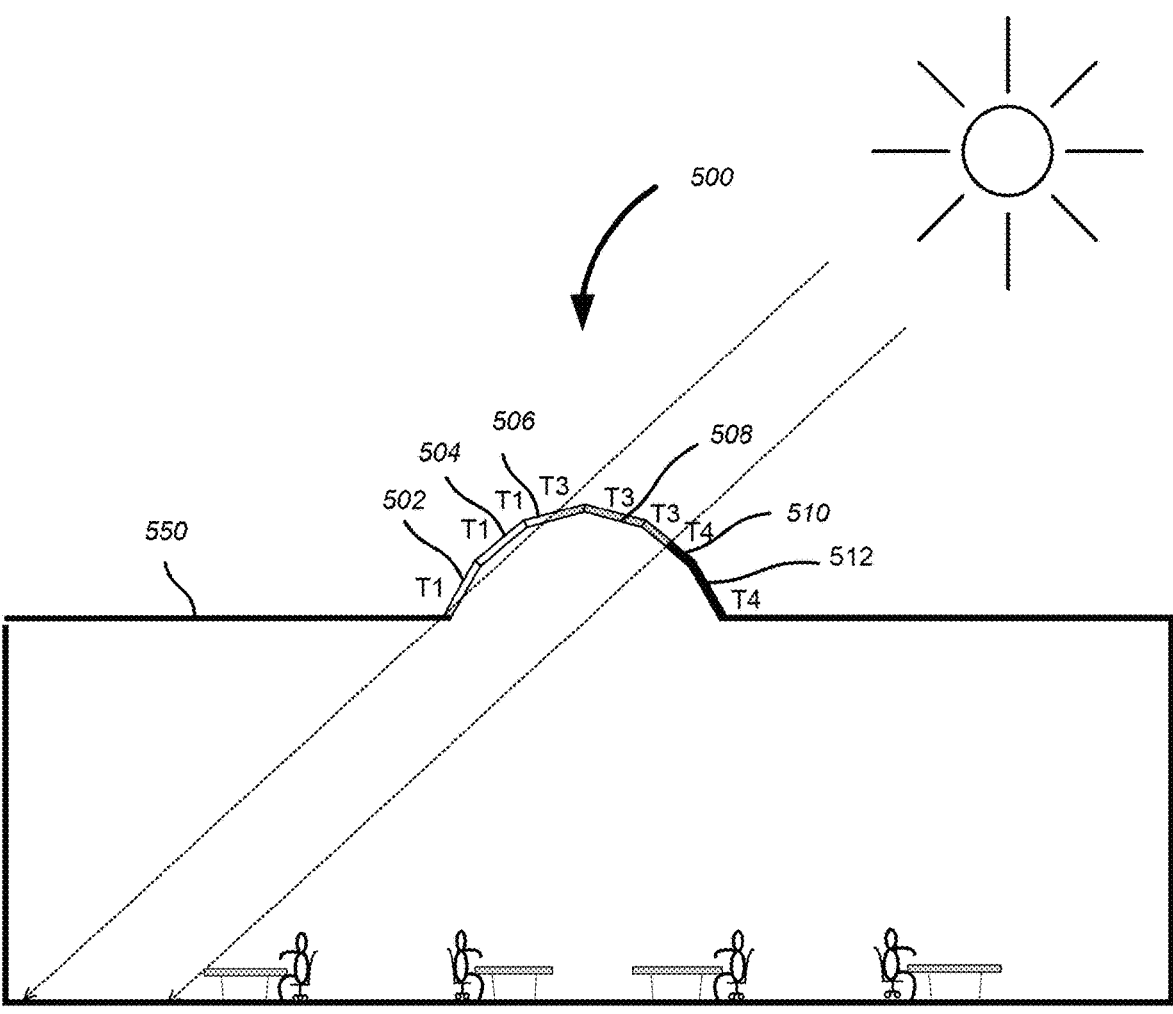

FIGS. 5A and 5B depict a schematic illustration of a skylight 500 with six tintable multi-zone windows 502, 504, 506, 508, 510, and 512 in a room 550 of a building, according to an embodiment. Although each of the six tintable multi-zone windows 502, 504, 506, 508, 510, and 512 have two independently controllable tinting zones, other numbers of zones can be used. In this example, each tinting zone of these multi-zone windows is independently controllable and can be transitioned to four different tint states including T1 (lightest), T2, T3, and T4. The illustrations are of a cross-sectional view of the room 550 at the center of the skylight. In both illustrations, the sun is at the same position in the sky.

In FIG. 5A, both zones of each of the tintable windows 502, 504, 506, 508, 510, and 512 are held at single tint state. That is, both zones of tintable multi-zone windows 502, 504, and 506 are at the lightest tint state T1 (e.g., bleached tint state), both zones of tintable multi-zone window 508 is in tint state T3, and both zones of multi-zone tintable windows 510 and 512 are in the darkest tint state T4. In this tinting configuration, natural light is allowed to enter through the three tintable multi-zone windows 502, 504, and 506 in the lightest tint state T1, light is somewhat allowed to enter through the tintable window 508 in tint state T3, and light is restricted from entering through the three tintable windows 510 and 512 in the darkest tint state T4. In this illustration, the tintable multi-zone windows 502, 504, and 506 in the lightest tint state T1 allow natural light from the sun to enter the room while preventing glare from the sunlight projecting (depicted as parallel arrows) onto the occupied area with tables.

In FIG. 5B, different zones of multi-zone tintable windows 506 and 510 of the skylight 550 are controlled to be at different tint states. In this example, both zones of windows 502 and 504 and the first zone of window 506 are at the lightest tint state T1 (e.g., bleached tint state). These zones are at the lightest tint state since direct sunlight does not impinge upon them so that tinting these windows is not effective in preventing glare into the room 550. In the illustration, the second zone of window 506, both zones of multi-zone tintable window 506, and the first zone of window 508 are at tint state T3. These zones are at the second to darkest tint state to allow some direct sunlight to enter room in unoccupied areas in order to reduce lighting/ heating loads. Also, the second zone of window 508, and both zones of window 512 are in the darkest tint state T4. These zones are at the darkest tint state to restrict direct sunlight from entering room and projecting glare onto the occupied area of the room 550. In this tinting configuration, natural light is allowed to enter through the tintable multi-zone windows 502 and 504, and the first zone of window 506 in the lightest tint state T1, light is somewhat allowed to enter through the second zone of window 705, both zones of window 508 and the first zone of window 510 in tint state T3, and light is restricted from entering through the second zone of window 510 and both zones of 512 in the darkest tint state T4. In comparison with the tinting shown in FIG. 5A, the tinting of different zones illustrated in FIG. 5B allows more light to enter the room 550 while still preventing sunlight projecting glare onto the occupied region with the tables.

In certain implementations, a multi-zone tintable window comprises multiple lites in, for example, the form of an insulated glass unit (IGU) having a spacer sealed between lites. Another example is a laminate construction. Any of the tinting configurations shown and described with respect to FIGS. 1, 2, 3, 4, 5A and 5B can be used for a single lite or for one or more lites of an IGU or a laminate construction. Glare Reduction Tinting Configuration B.

In one glare reduction tinting configuration, a multi-zone tintable window comprises a first multi-zone tintable lite in combination with a second mate lite that has either multiple tint zones or a single tint zone. In this tinting configuration, the combined transmissivity of light through multiple lites can be used to provide lower transmissivity than a single lite. For example, the reduced level of transmissivity through two tintable lites in an area where both lites are tinted to a darkest tint state may be below 1% T. This reduced transmissivity through the area of combined multiple tinted lites can be used to provide increased glare control in a multi-zone tintable window. That is, transmissivity of lower than 1% may be desired by some end users, for example, to further reduce glare. In these cases, a multi-zone tintable window with multiple lites can be used to reduce transmissivity of lower than 1% as needed.

In one implementation of this tinting configuration, a multi-zone tintable window is in the form of an IGU with multiple lites, each lite having one or more tinting zones that can be tinted to reduce glare. At certain times of the year/day, tinting of the upper region of the window is appropriate because the sun is at an altitude such that sunlight through the upper region is a primary cause of glare across all portions of the window that receives sunlight. In other cases, other regions of the multi-zone tintable window may also benefit from this tinting. For example, a lower portion might as well.

According to one aspect, the regions of a multi-zone window that are determined by a control method to be the most appropriate for tinting to reduce glare are those that do not have a good view potential for the occupant. In other words, when an occupant is in their typical location in the room, it would be desirable if they can see out the window, for example, to view weather patterns. In one example, the control method determines to hold or transition the tint states of certain tinting zones to darker tint states to control glare on an occupancy region only if the region of the tinted zones does not block the view for an occupant.

In certain implementations, a multi-zone tintable window in the form of an IGU is controlled to have tint states that balance glare control with reduced energy consumption. In one case, the mate lite of the IGU may have one or more tinting zones that are designed to always or nearly always reduce glare. Although a mate lite generally refers to any substrate of the IGU, in one case, a mate lite is a substrate of the IGU on which the optically switchable device (e.g., electrochromic device) does not reside.

In one aspect, the mate lite or possibly some other structure in the IGU can be designed to direct sunlight in a horizontal direction regardless of the relative altitude of the sun with respect to the window position. The mechanism for directing light in a horizontal direction may include a very granular group of slats or window blinds structure in the interior of the IGU or the exterior of the IGU or associated with a mate lite. In one example, small mechanical blinds may be built into an electrically controllable region of the mate lite to redirect light. As another example, a series of light tubes may reside external or internal (region between lites) to the IGU to direct sunlight in a substantially horizontal direction.

Figure 6:
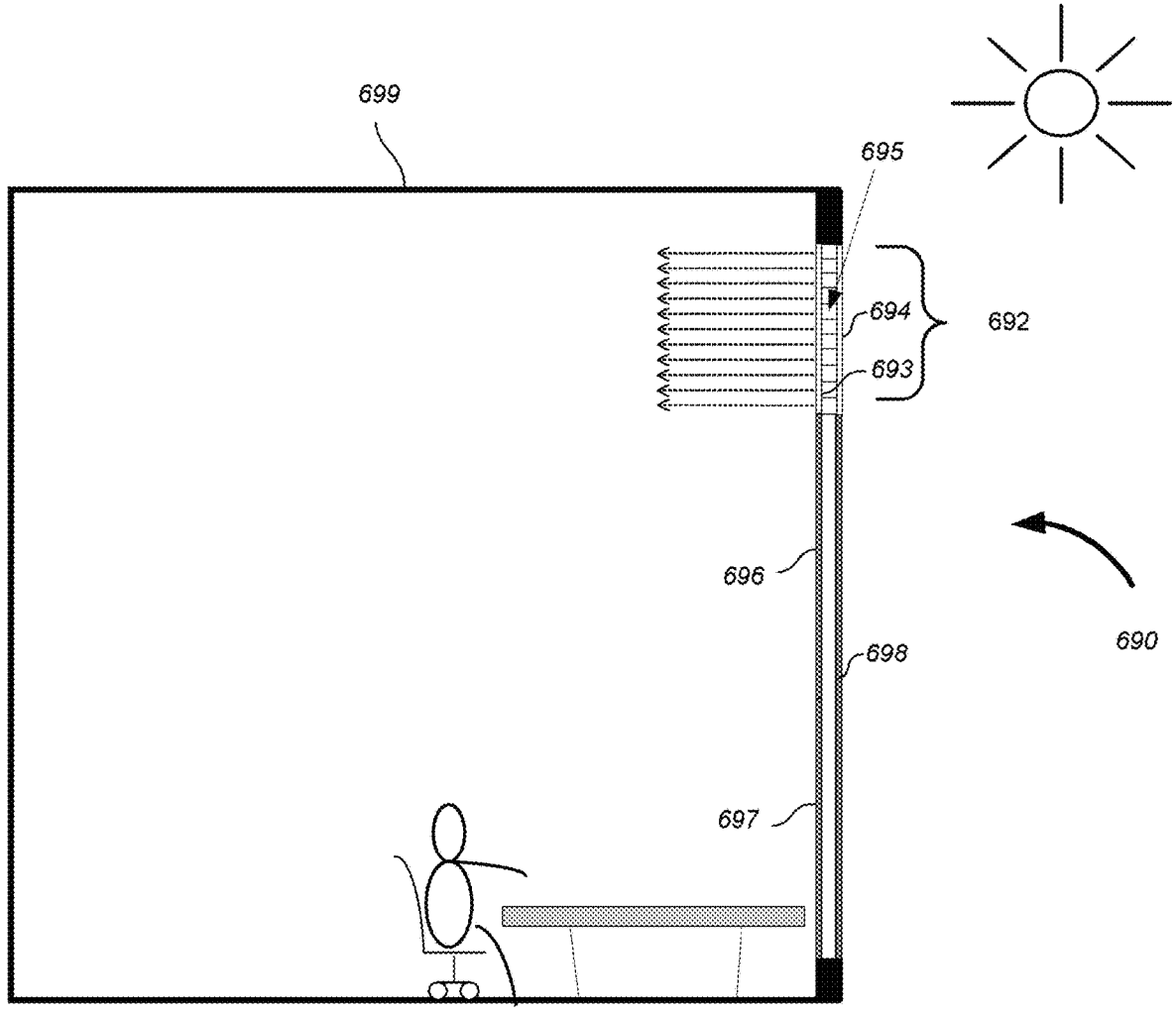
FIG. 6 is a schematic illustration of an example of a multi-zone tintable window in the form of an IGU wherein the top region has a series of light tubes directing light to the back of the room, according to an embodiment.

FIG. 6 is a schematic illustration of an example of a multi-zone tintable window 690 in the form of an IGU in vertical wall of a room 699, according to an embodiment. The IGU comprises an inner EC lite and an outer EC lite and a spacer (not shown) between the lites. The inner EC lite comprises a first tinting zone 693, a second tinting zone 696, and a third tinting zone 697. The outer EC lite comprises a first tinting zone 694 and a second tinting zone 698. In a top portion 692 of the window 690, the region 695 between the lites has a series of light tubes comprising reflective inner surfaces for channeling light. In other embodiments, region 695 may include light scattering elements, reflectors, diffusers, microshades (or similar MEMS devices) or the like. In this tinting configuration, the tinting zones 693 and 694 are cleared to allow sunlight to be transmitted, while directing or preventing the light from impinging on the occupant and thus avoiding a glare situation, while still allowing natural light into the space. In this configuration, sunlight passes through the tinting zone 694 at the outer surface of the outer EC lite at the top portion 692, is channeled through the light tubes, and is transmitted through the tinting zone 693 of the inner EC lite in the clear state. In some cases, the light may be directed somewhat to the back of the room as depicted. With the illustrated tinting configuration, the top portion 692 of the window 690 allows natural light from the sun at a position of high altitude to enter the room while preventing glare from the direct sunlight on the occupancy region with the desk and the occupant.

In another implementation, one or more of the lites of an IGU may have a region with a diffusing light source such that light impinging on this region is diffused or scattered so as to eliminate potential glare on the occupancy region. The diffusion or scattering may be achieved by applying a diffusing film or light directing film to the region. These films contain many scattering centers or other ways to allow light in but at the same time reduce the direct rays upon an occupancy region.

C. Adjusting Color Perception

Other implementations for controlling tintable windows in a particular way can reduce color perception of the tinted or bleached state window and/or of the color of light passing through the tinted or bleached state window. These implementations make use of optical properties that minimize perception of an undesirable color associated with a particular tint state.

As one example, a darkened tint state of an optically switchable device, e.g., electrochromic device, may have a blue color which may be perceivable to an occupant. However, if a tinted zone in the room is juxtaposed with a clear zone through which much daylight shines, the blue color of the tinted zone may be less noticeable to the occupant. For example, a particular tinting zone of a multi-zone window may be in a darker tint state and might appear blue to the occupant. In one implementation of a glare reduction tinting configuration, adjacent or nearby windows and/or tinting zones can be placed in a clear state as long as they do not create glare for the occupant due to their relative position. The light coming through the clear zones can reduce the perception of blue color that the occupant might otherwise perceive.

In another implementation, a diffusing light source such as a diffusing or scattering film adhered to tintable window may reduce the perception of blue color in the tinted zone. For example, a diffusing or scattering film may be disposed on a mate lite to an electrochromic lite of an IGU. In another example, a diffusing or scattering film may be disposed on a surface of the lite without the optically switchable device such as an electrochromic device.

D. Light Harvesting Tinting Configurations

Other multi-zone tinting configurations may involve maximizing light harvesting. Light harvesting is a concept by which solar radiation from outside the window is converted into electrical energy for use by the window, by the building, or for another purpose. Light harvesting can be accomplished using a photovoltaic film, other photovoltaic structure, or other light harvesting structure on an appropriate portion of a window such as on the mate lite of an IGU. In one example, light harvesting is accomplished with a photovoltaic cell provided in or on the window containing the multi-zone electrochromic device.

One consideration is that photovoltaic cells or other light harvesting structures may be most efficient when incident light being collected comes at a normal or nearly normal direction. This can be facilitated by having a structure in the window that redirects incident light on the window to strike the photovoltaic cell at a normal or nearly normal direction to maximize energy generation. In some cases, a light diffuser or a horizontally directing structure such as described above with reference to FIG. 6, can be used on a portion of a tintable window to direct light onto the photovoltaic film, other photovoltaic structure, or other light harvesting structure on an appropriate portion of a window such as on the mate lite.

Another consideration is that it may be desired in normal situations for photovoltaic films on a mate lite to be as transparent as possible. However, photovoltaic films made to be transparent are often relatively inefficient at converting sunlight to electrical energy in comparison to more opaque films or not just opaque films but rather films that perhaps scatter light more. Recognizing that there may be certain zones in a region of a window that are normally responsible for preventing a glare scenario in the room, and therefore normally must be tinted and/or that there may be certain zones outside this region where an occupant would normally be able to view the outside environment. In one implementation, the tinting zones in this region are provided with more efficient for light harvesting, but more scattering or opaque photovoltaic films, than the zones outside this region. In another implementation, the tinting zones in this region are provided with photovoltaic films and the zones outside this region do not have photovoltaic films.

As with the scenario described with respect to FIG. 6, e.g., where incoming light is horizontally directed, reflected, scattered or diffused in an upper region of a window because that region produces most of the glare, similarly, an upper region of a tintable window can be outfitted with a more efficient, yet less optically pleasing type of photovoltaics films, according to another implementation.

Locations of Photovoltaic Cell on IGU Lite Faces

In certain implementations, a tintable window includes a photovoltaic (PV) cell/panel. The PV panel may be positioned anywhere on the window as long as it is able to absorb solar energy. For instance, the PV panel may be positioned wholly or partially in the viewable area of a window, and/or wholly or partially in/on the frame of a window. Details of examples of electrochromic windows with a PV cell/panel can be found in U.S. Provisional Patent Application 62/247,719, titled "PHOTOVOLTAIC-ELECTROCHROMIC WINDOWS" and filed on Mar. 25, 2016, which is hereby incorporated by reference in its entirety.

The PV cell/panel may be implemented as a thin film that coats one or more surfaces of a lite of a tintable widow. In certain implementations, the tintable window is in the form of an IGU with two individual lites (panes), each having two surfaces (not counting the edges). Counting from the outside of the building inwards, the first surface (i.e., the outside-facing surface of the outer pane) may be referred to as surface 1 (S1), the next surface (i.e., the inside-facing surface of the outer pane) may be referred to as surface 2 (S2), the next surface (i.e., the outside-facing surface of the inner pane) may be referred to as surface 3 (S3), and the remaining surface (i.e., the inside-facing surface of the inner pane) may be referred to as surface 4 (S4). The PV thin film may be implemented on any one or more of surfaces 1-4.

In certain examples, a PV film is applied to at least one of the lite surfaces in an IGU or other multi-lite window assembly. Examples of suitable PV films are available from Next Energy Technologies Inc. of Santa Barbara, CA. PV films may be organic semiconducting inks, and may be printed/coated onto a surface in some cases.

Conventionally, where a PV cell is contemplated for use in combination with a multi-zone electrochromic window, the EC device is positioned toward the building interior relative to the PV cell/panel such that the EC device does not reduce the energy gathered by the PV cell/panel when the EC device is in a tinted state. As such, the PV cell/panel may implemented on the outside-facing surface of the outer pane (lite) e.g., on surface 1 of an IGU. However, certain sensitive PV cells cannot be exposed to external environmental conditions and therefore cannot reliably be implemented outside-facing surface. For example, the PV cell may be sensitive to oxygen and humidity.

To address air and water sensitivity of such PV films, a film may be positioned on surface 2 or 3, which helps protect the film from exposure to oxygen and humidity. In some cases, the stack of electrochromic materials is positioned on surface 3 and the PV thin film is positioned on surface 2. In another example, the stack of electrochromic materials is positioned on surface 2 and the PV film is positioned on surface 3.

In one aspect, a PV film is positioned on S3 and the multi-zone window has the EC device with multiple tinting zones on S2. In this case, one or more zones may be held in a bleached tint state such as in a daylighting tinting zone (e.g., in a transom window configuration) that allows natural light into the room at a high level. In this case, the sunlight is fed to the PV film on S3 while the other zones (e.g., lower zones in transom window configuration) can remain tinted, for example, for glare control. In this case, the PV film receives sunlight and is not starved for light.

E. Resistive Zones

In certain implementations, resistive zones are configured along an area at the between adjacent tinting zones of the monolithic EC device of a multi-zone window. These resistive zones may allow for more uniform tinting fronts, e.g., when used in combination with bus bar powering mechanisms. In certain embodiments, the resistive zones may be narrow, e.g. between about 1 $\square$m and 1000 $\square$m wide, or may be wider, e.g. between about 1 mm and about 10 mm wide. The EC materials in resistive zones tint, they do not leave a bright line contrast effect typical of conventional laser isolation scribes. Thus, in other embodiments, a resistive zone may be, for example, wider than 1 mm, wider than 10 mm, wider than 15 mm, etc.

The reason a resistive zone tints is because it is not a physical bifurcation of the EC device into two devices, but rather a physical modification of the single EC device and/or its associated transparent conductors within a resistive zone. The resistive zone is an area of the EC device where the activity of the device, specifically the electrical resistivity and/or resistance to ion movement is greater than for the remainder of the EC device. Thus one or both of the transparent conductors may be modified to have increased electrical resistivity in the resistive zone, and/or the EC device stack may be modified so that ion movement is slower in the resistive zone relative to the EC device stack in the adjacent tinting zones. The EC device still functions, tints and bleaches, in this resistive zone, but at a slower rate and/or with less intensity of tint than the remaining portions of the EC device. For example, the resistive zone may tint as fully as the remainder of EC device in the adjacent tinting zones, but the resistive zone tints more slowly than the adjacent tinting zones. In another example, the resistive zone may tint less fully than the adjacent tinting zones or at a tint gradient.

As used herein, a "resistive zone" is an area in the EC device where one or more layers of the EC device have their function impaired, either partially or completely, but device function is not cut off across the tinting zone. For example, one or both of the TCOs shown in FIG. 7 may have a higher resistance to electrical flow in the resistive zone than in rest of the adjacent tinting zones. Thus, e.g., if a tinting zone 1 is activated, electrons flow across the TCOs at a given rate, but that flow is restricted along resistive zone. This allows the electrons to be sufficiently retained in tinting zone 1 and thus leak more slowly across resistive zone than otherwise would be the case if TCO function had not been impaired there. Resistive zone could be thought of as a "dam" for electrical flow, impairing rate of electrical flow across it, the flow can be partially or fully impaired in one or both TCOs, for example. Due to the restricted or slowed rate of electrical flow across resistive zone, ion intercalation in the EC stack between the TCOs at resistive zone is also impaired. Because the EC device is not physically cut into two devices, this is unlike conventional devices having zones created by physical bifurcation of a single device. Resistive zone may also have physical impairment of ion flow in one or more of the EC material layers as well. In one example, both the top and bottom TCO's electrical conductivity is impaired, either partially or fully, in resistive zone, but the function of the EC device stack layers is substantially unchanged. Thus, when one tinting zone is tinted and the adjacent zone is not-tinted, the device will tint in the resistive zone. When adjacent tinting zones are both tinted, there is no bright line discernible to the end user, because the device tints in resistive zone and in fact, may have a tinting gradient. Details of resistive zones and other features of multi-zone electrochromic windows are described in U.S. patent application Ser. No. 15/039,370, titled "MULTI-ZONE EC WINDOWS and filed on May 25, 2016 and PCT application PCT/US14/71314, titled "MULTI-ZONE EC WINDOWS and filed on Dec. 18, 2014, both of which are hereby incorporated by reference in their entireties.

In one aspect, a resistive zone may be fabricated, for example, by exposure of the area at the resistive zone to irradiation, e.g. laser or heat source, in order to modify but not destroy the function at resistive zone. For example, one or both of the TCO layers may be heated sufficiently to change the morphology while retaining the function, albeit impaired relative to the remainder of the TCO layers in the tinting zones. In certain embodiments, it is advantageous to impair the function of only one TCO in a resistive zone. Resistive zones may also be created by impairing the function of one or more layers of the EC device (or one or both TCOs) by chemical doping. For example, in one embodiment the lower TCO is treated along a line (at resistive zone, e.g.) with heat and oxygen to create a more resistive TCO at the resistive zone. In another embodiment, one or both TCOs are fabricated thinner along the resistive zone than the rest of the TCOs, e.g. TCO material may be removed, but not cut through, along the resistive zone.

F. Glare Reduction Using Multi-Zone Window with Many Tinting Zones

Recognizing that it might be desirable to tint the smallest amount of area possible to reduce glare, a multi-zone window may be designed with many tinting zones. In some aspects, individual tinting zones might have a width/length as small as a millimeter or even a few micrometers. In one aspect, one or more tinting zones of a window have a width/length of about a millimeter. In one aspect, one or more tinting zones of a window have a width/length in the range of about 2-5 micrometers. In one aspect, one or more tinting zones of a window have a width/length in the range of about 3-5 micrometers. Bus bars or other contacts to the tinting zones can be made very thin to be almost imperceptible.

Figure 7:
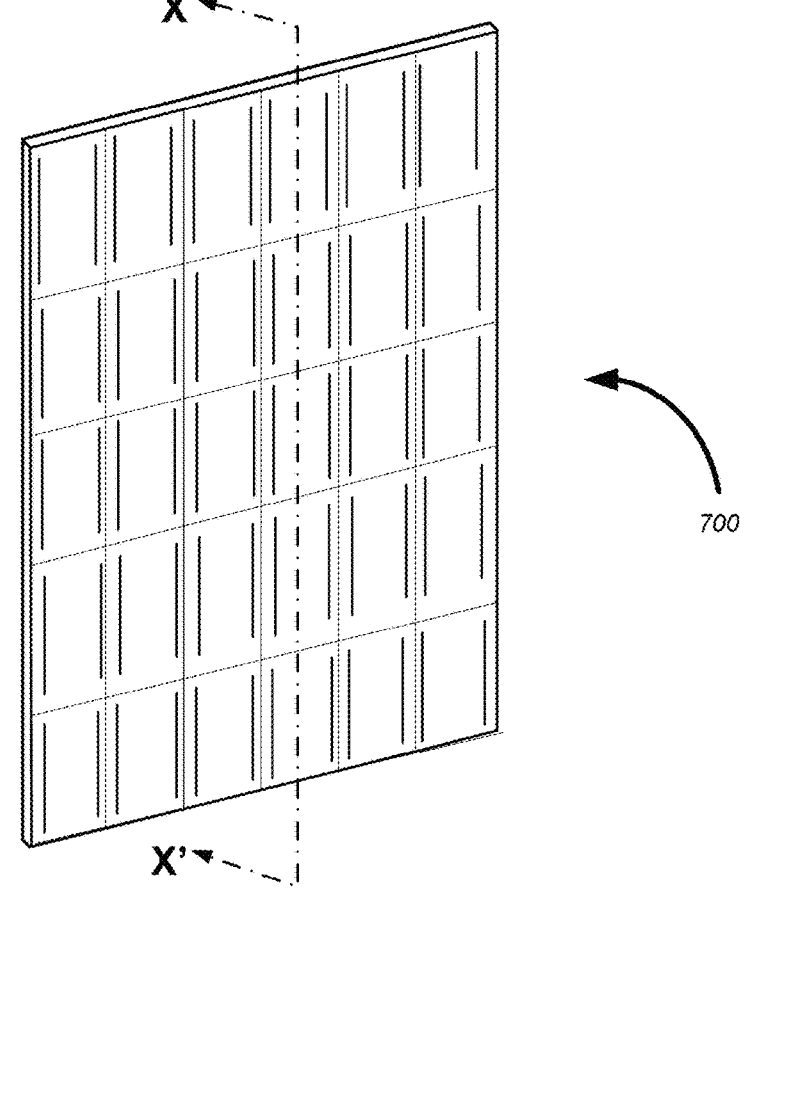
FIG. 7 is a perspective and a cross section, X-X', of a multi-zone electrochromic window having a grid of 25 tinting zones in both the horizontal and vertical direction, according to an embodiment.

FIG. 7 depicts a perspective view (top) of a multi-zone electrochromic window 700 having twenty five (25) tinting zones 715 and a cross sectional view, X-X', of the multi-zone electrochromic window 700, according to an embodiment. Each tinting zone 715 is configured with a pair of bus bars 712, for example, transparent bus bars. Thus tinting zones 715 can be colored independently by virtue of operation or the respective bus bar pairs 712 at each tinting zone 715. In other embodiments, multiple tinting zones may be configured between a single set of bus bars (e.g., two or more bus bars located on opposing edges). The illustrated multi-zone electrochromic window 700 may be incorporated into an IGU with a spacer and a mate lite. Between adjacent tinting zones, there is a resistive zone 710.

The cross section, X-X, spans the tinting zones 715 of the multi-zone electrochromic window 700 as well as the resistive zones 710 (only the bus bars on the top TCO are depicted in cross section X-X, they are orthogonal to resistive zones in this example). Cross section X-X (lower portion) is not to scale, but rather a schematic representation of the structure of the multi-zone electrochromic window 700. Although the resistive zones 710 are depicted as located through the entire EC device, these resistive zones 710 may be located through a portion of the EC device such as through one or both of the TCO layers according to other aspects. On the glass substrate is an EC device including a first transparent conducting oxide layer, TCO 1, a second transparent conductive oxide layer, TCO 2, and sandwiched in between the TCOs is an EC device stack which contains one or more electrochromic materials, e.g., the transitions of which are driven by intercalation/de-intercalation of ions, such as lithium ions.

Many Horizontally-Oriented or Vertically-Oriented Tinting Zones

In one aspect, a multi-zone window comprises many horizontally-oriented tinting zones where each zone has a pair of bus bars. This configuration allows for a large number of tinting options. This configuration provides for "tunable" zoning in the window since a much greater variety of zones are available to tint and these many zones can provide an improved curtaining effect when tinting. In one example, the hardware needed to control tinting of such a multi-zone window is essentially a series of voltage regulators, one for each zone, and collectively all the VRs being controlled by a single window controller via a communication bus. Thus, a window controller includes these multiple VRs for multi-zone use. A good application of such a window is, e.g., where there is an overhang over the window. As the sun's angle changes, the shadow on the window will grow or shrink. Having more granular zone "strips" can be used to automatically track where the shadow is, and/or where the glare is too high, tinting corresponding to where the sun is actually hitting the glass in real time. In some cases, input from sensors (e.g., illuminance sensors) can be used to determine where the sunlight is striking the window.

Figure 8:
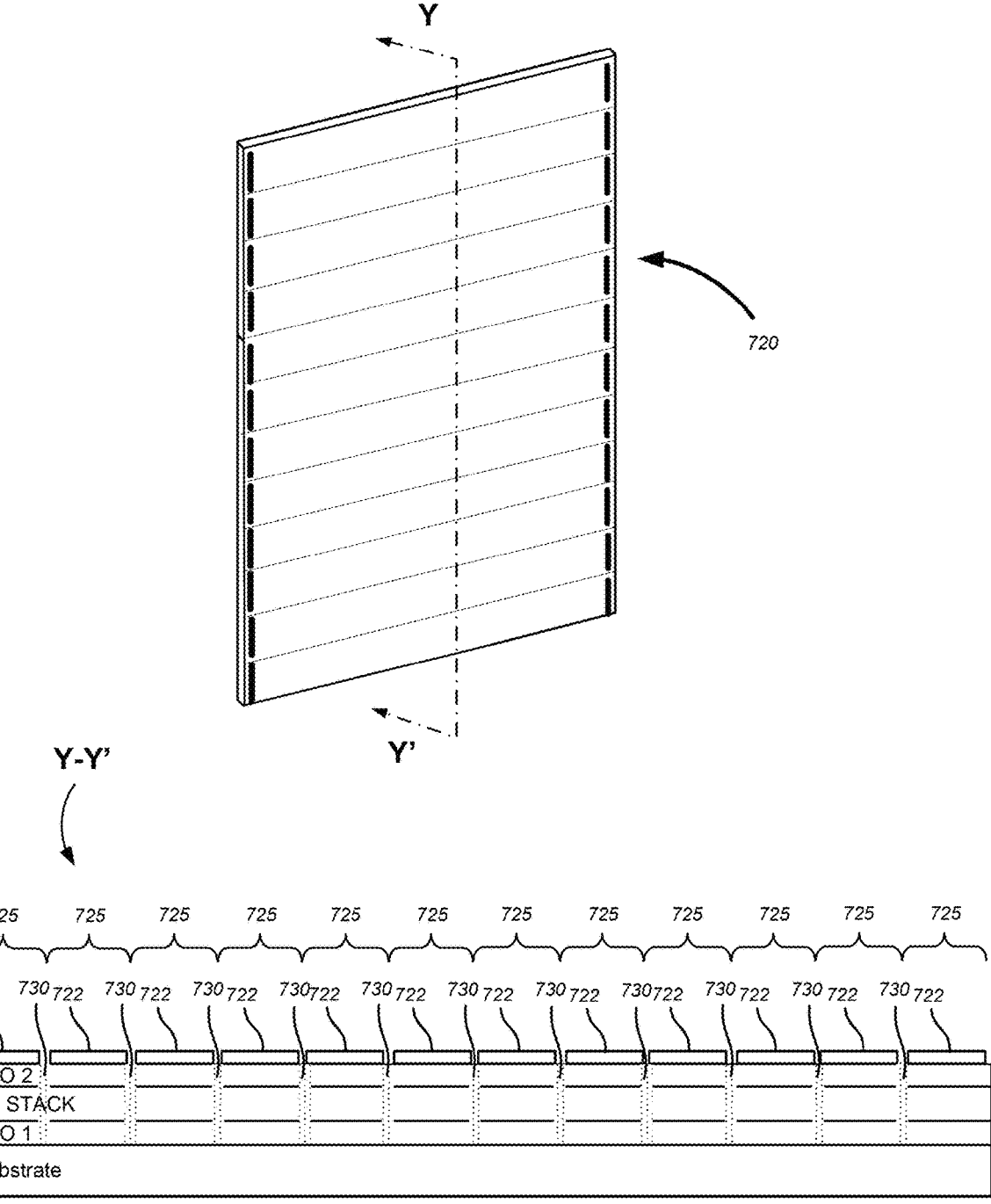
FIG. 8 is a perspective and a cross section, Y-Y', of a multi-zone electrochromic window having many horizontally oriented tinting zones, according to an embodiment.

FIG. 8 is a perspective and a cross section, Y-Y', of a multi-zone electrochromic window 720 having twelve (12) horizontally-oriented tinting zones 725, according to an embodiment. Each tinting zone 725 is configured with a pair of bus bars 722. Thus the tinting zones 725 can be colored independently by virtue of operation or the respective bus bar pairs 722 at each tinting zone. In other embodiments, multiple tinting zones may be configured between a single set of bus bars (e.g., two or more bus bars located on opposing edges). The multi-zone electrochromic window 720 may be incorporated into an IGU with a spacer and a mate lite. Between adjacent tinting zones 725, there is a resistive zone 730. The cross section, Y-Y', spans the tinting zones 725 of the multi-zone electrochromic window 720 as well as the resistive zones 730 (only the bus bars on the top TCO are depicted in cross section Y-Y', they are orthogonal to resistive zones in this example). Cross section Y-Y' (lower portion) is not to scale, but rather a schematic representation of the structure of the multi-zone electrochromic window 720. On the transparent substrate (e.g., glass) is an EC device including a first transparent conducting oxide layer, TCO 1, a second transparent conductive oxide layer, TCO 2, and sandwiched in between the TCOs is an EC stack which contains one or more electrochromic materials, e.g., the transitions of which are driven by intercalation/de-intercalation of ions, such as lithium ions. Although the resistive zones 730 are depicted as located through the entire EC device, these resistive zones may be located through a portion of the EC device such as through one or both of the TCO layers according to other aspects.

F. Other Examples of Window Configurations

Room with Multi-Zone Windows Having Different Configurations

In another implementation, multiple horizontally and/or vertically separated multi-zone windows may be located in a room. In one example, one or more of the center or interior windows in the room have horizontally oriented tinting zones, while the left and right windows and perhaps some other adjacent peripheral windows have vertically oriented zones.

Vertically Oriented Tinting Zones

Keeping with the concept of minimizing the window area used to reduce glare, one implementation includes an assembly of vertically-arranged tintable windows and/or window(s) with vertically-oriented tinting zones. In this implementation, the tinting of the windows/zones can be controlled to adjust for glare at different azimuthal variations in solar angle.

Both Vertically-Oriented and Horizontally-Oriented Tinting Zones of a Multi-Zone Window In one tinting configuration, a single large window includes both vertically-oriented and horizontally-oriented zones. For example, the horizontally-oriented tinting zones may be in a center region of the window and the vertically-oriented tinting zones may be in the left and right outer peripheral regions of the window. In this example, the electrical leads may be routed into the interior regions of the window to control the interior horizontally oriented zones. In some cases, transparent leads may be used.

Multi-Zone Windows with Non-EC Films

In certain implementations, a multi-zone window includes an electrochromic device or other optically switchable device. In other implementations, a multi-zone window includes an optically switchable device and/or a PV film. In another implementation, a multi-zone window includes an optically switchable device and/or a thermochromic or photochromic material layer. Some description of windows having a tinting zone with thermochromic or photochromic material can be found in U.S. patent application Ser. No. 12/145,892, titled "MULTI-PANE DYNAMIC WINDOW AND METHOD FOR MAKING SAME" and filed on Jun. 25, 2008, which is hereby incorporated by reference in its entirety.

III. Controller Designs and Hardware for Implementing Multi-Zone Configurations

A. Window Controller for Independent Control of Multiple Tinting Zones

In certain aspects, a single window controller or multiple window controllers are used to independently control multiple zones of a single electrochromic device of a multi-zone tintable window. In a first design, a single window controller is electrically communicating with multiple voltage regulators. In a second design, a main window controller is electrically communicating with multiple subcontrollers. In some cases, each multi-zone tintable window includes a memory, chip or card that stores information about the window, including physical characteristics, production information (date, location, fabrication parameters, lot number, etc.), and the like. The memory, chip or card may be part of an onboard window controller or not, e.g. in a wiring harness, pigtail and/or connector to which the window controller connects. Window controllers, whether on or part of the window or not, that control multi-zone tintable windows are described herein. Other information that may be included in the memory are described in U.S. patent application Ser. No. 13/049,756, titled "MULTIPURPOSE CONTROLLER FOR MULTISTATE WINDOWS" and filed on Mar. 16, 2011 and in U.S. patent application Ser. No. 14/951,410, titled "SELF-CONTAINED EC IGU" and filed on Nov. 24, 2015, both of which are incorporated by reference herein for all purposes.

Controller Design 1

As mentioned above, a window controller according to the first design is connected to multiple voltage regulators, which it controls. Each voltage regulator is in electrical communication with one of the tinting zones. In one embodiment, the voltage regulators are onboard, i.e. part of the window assembly, e.g. in the secondary seal of an insulated glass unit. They maybe be physically separate from the controller, or part of the controller, whether the controller is onboard or separate from the window. The window controller is in electrically communication with each voltage regulator to be able to independently instruct each voltage regulator to deliver voltage to its own tinting zone. Each voltage regulator delivers current to only one of two bus bars in a particular tinting zone. This design involves multiple voltage regulators, one for each tinting zone, and collectively all the voltage regulators being controlled by a single window controller via a communication bus (not depicted).

Figure 9:
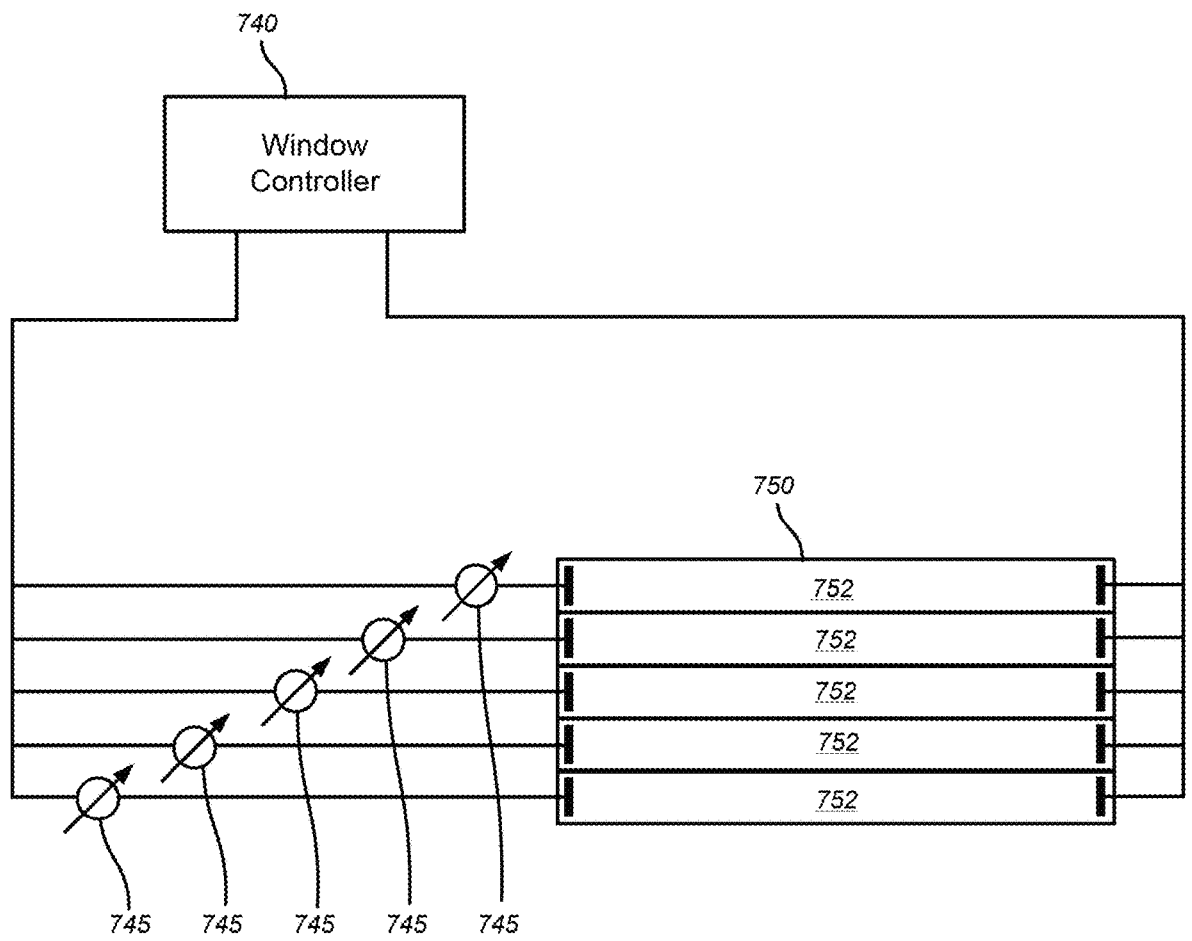
FIG. 9 is a schematic illustration of a window controller connected to multiple voltage regulators in parallel, according to an embodiment.

FIG. 9 is a schematic diagram a window controller 740 connected to five (5) voltage regulators 745, according to this first design. Each voltage regulator 745 is electrically connected to one of the bus bars of a corresponding tinting zone 752 and to the window controller 740. In this example, the window controller 740 instructs each voltage regulator 745 to independently deliver voltage to its own tinting zone 752. Each voltage regulator 745 delivers current to only one of two bus bars on its tinting zone 752. In this way, each zone 752 may be independently tinted relative to the other zones 752.

Another structural feature of this first design is that each of the voltage regulators is directed or connected to only one of the bus bars in the respective zone of the multi-zone electrochromic device. The bus bars of the zones that oppose the voltage-regulated bus bars all receive the same voltage from the window controller. This presents a challenge if one of the tinting zones needs to be driven in an opposite direction from that of the other zones because the polarity on the two bus bars cannot be reversed if the voltage applied to the other zones is inconsistent with such reversed polarity.

In this design, each voltage regulator is a simple design that has logic (e.g., instructions stored on memory and retrieved for execution by a processor) for applying a voltage as instructed by the window controller. A local window controller includes logic with instructions for implementing roles comprising: 1) communicating with higher level window controllers, 2) to step down power if necessary, 3) and determining the actual voltage that should be applied to each of the individual tinting zones. As an example of communication with higher level window controllers, the local window controller may receive instructions to place each of the individual zones in respective tint states. The window controller may then interpret this information and decide how to best accomplish this result by driving transitions by applying appropriate drive voltages, hold times, ramp profiles, hold voltages, etc. Details of control instructions for driving transitions in optically switchable windows are described in U.S. patent application Ser. No. 13/449,248, filed on Apr. 17, 2012 and titled "CONTROLLER FOR OPTICALLY-SWITCHABLE WINDOWS," and in in U.S. patent application Ser. No. 13/449,251, filed on Apr. 17, 2012 and titled "CONTROLLER FOR OPTICALLY-SWITCHABLE WINDOWS," both of which are hereby incorporated by reference in their entireties.

Controller Design 2

In a second design, a separate subcontroller is used to control each of the tinting zones. In this design, the subcontrollers receive general tint instructions from a main window controller. For example, the main (upper-level) window controller may send a signal to the subcontroller with tint instructions to drive a transition of a particular tinting zone to a new tint state. The subcontroller comprises memory that includes control instructions for driving transitions including instructions that determine the appropriate drive voltage, hold time, ramp profile, etc. necessary to drive transitions. The main window controller for the multi-zone window is in communication with higher level control entities on the control network main window controller also functions to step the power from the power source to an appropriate level for the subcontrollers to perform their functions.

In this design, each subcontroller has leads going to each bus bar of the respective tinting zone for which it is responsible. In this way, the polarity across the pair of bus bars for each zone can be independently controlled. If one of the tinting zones needs to be driven in an opposite polarity from that of the other zones, the polarity on the two bus bars can be reversed with this design. This is an advantage over the first design, because each zone can be independently tinted or cleared.

Figure 10:
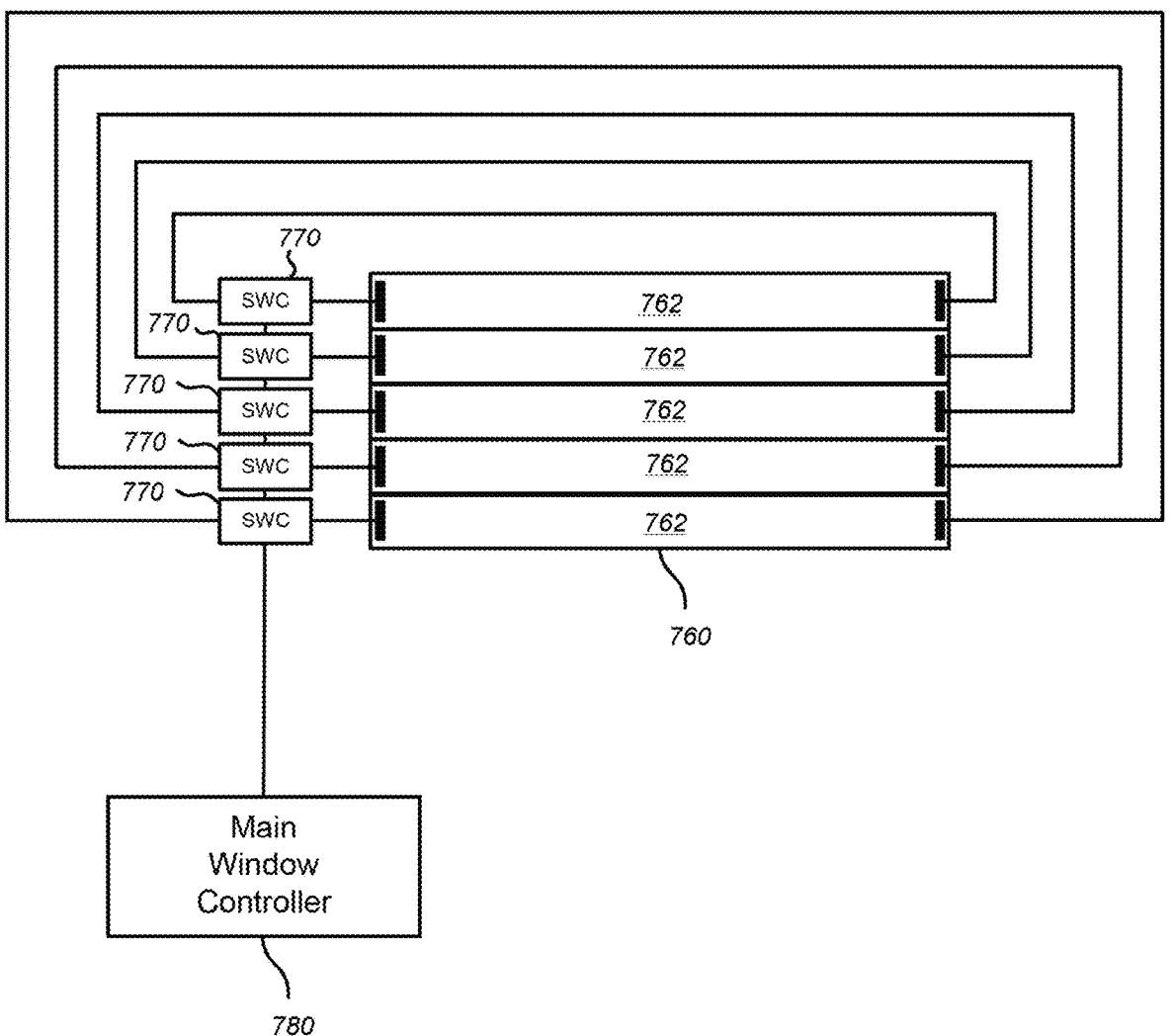
FIG. 10 is a schematic illustration of a window controller connected to multiple subcontrollers in series, according to an embodiment.

FIG. 10 is a schematic diagram of a single window controller connected to five subcontrollers (SWCs) 770, according to this second design. Each subcontroller 770 has two leads going to the bus bars of a corresponding tinting zone 762. In this example, the SWCs 770 are electrically connected in series with the one SWC 770 at the end of the series connected to main window controller 780. In this example, the window controller 780 sends a signal to a subcontroller 770 with tint instructions to drive a transition of its associated tinting zone 762.

B. Photovoltaic Power

In certain implementations, a multi-zone window comprises a PV film or other light harvesting device, which can harvest energy converting the solar energy to provide electrical power to the window controller and other window devices. Some examples of multi-zone tintable windows with a PV film are described above.

C. Onboard Window Controller

In some aspects, a multi-zone window may have a window controller that is an onboard controller. Details of examples of onboard controllers are described in U.S. Provisional Application No. 61/085,179, filed on Nov. 26, 2014, which is hereby incorporated by reference in its entirety.

D. Wireless Powering

According to one aspect, a multi-zone window may be powered wirelessly, for example through RF, magnetic induction, or lasers or microwave energy, etc. Details regarding the components of a wireless powered window can be found in U.S. patent application Ser. No. 12/971,576 titled "WIRELESS POWERED ELECTROCHROMIC DEVICES," filed on Jun. 23, 2011, which is hereby incorporated by reference in its entirety.

In one aspect, a multi-zone tintable window comprises an RF antenna that converts RF power into an electrical potential used to power the transition of one or more tinting zones in the multi-zone tintable window. The RF antenna may be located in the frame of the multi-zone window or in another structure (e.g., spacer of an IGU). For example, the RF antenna may be located in the spacer of an IGU having multiple lites with at least one lite comprising a multi-zone electrochromic device. The RF antenna receives RF signals from a RF transmitter. In one case, the RF transmitter provides RF signals to multiple RF antennas. Details regarding examples of antennas are described in PCT application PCT/US15/62387, titled "WINDOW ANTENNAS" and filed on Nov. 24, 2015, which is hereby incorporated by reference in its entirety.

IV. Control Logic for Controlling Functions of Multi-Zone Windows

In certain implementations, control logic used to determine tint decisions for groups of windows can operate similarly to control logic used to determine tint decisions for multiple tinting zones in a window or individual windows of a group of windows. That is, the control logic for multiple windows determines a tint state for each window according the location and direction of the window. The control logic for multiple zones of a window would determine a tint state for each zone of the window according to the location and direction of the zone. An example of control logic for determining tint decisions for multiple windows and transitioning the windows to the determined tint states can be found in PCT application PCT/US15/29675, filed on May 5, 2015 and titled "CONTROL METHOD FOR TINTABLE WINDOWS," which is hereby incorporated by reference in its entirety. In certain aspects, certain operations of this control logic may be adapted to determine tinting decisions for multiple tinting zones and powering transitions according to the tinting decisions as described herein.

In some aspects, control logic may be adapted to address the visual transition in tinting within a particular tinting zone and/or between adjacent tinting zones. For example, the control logic may include logic that determines tint states that create a sharp contrast between different tint states in different zones or to create diffuse blending of color from zone to zone, e.g. using resistive zone technology. As discussed above, a resistive zone (rather than a physical bifurcation) between adjacent tinting zones can be used to generate a tinting gradient between adjacent zones. The tinting gradient is generally present across the width of the resistive zone and thus, the visual transition is more gradual, the greater the width of the resistive zone. The control logic may be adapted to account for the tinting gradient in the resistive zone and/or may be adapted to apply a gradient voltage along the length of the bus bars of a tinting zone to generate a tinting gradient within the tinting zone (or a monolithic EC device film). In one example, a bus bar may be tapered to apply a gradient voltage along the length and generate a length-wise tinting gradient. In another aspect, control logic may be adapted to control windows with many tinting zones to determine tint states that will blend the color through the many zones. In one aspect, control logic may be adapted to control the tint state of a series of adjacent zones such that there is not too abrupt of a transition from a zone that needs to be particularly dark to the zone that needs to be particularly clear.

Another modification to control logic may involve a separate routine (e.g., a module beyond Modules A-D of the PCT application PCT/US15/29675 which describes aspects of Intelligence® as described above) for applying considerations associated with the additional features of a multi-zone window beyond the usual considerations of glare control, view, natural lighting, occupant thermal comfort, building energy management, etc. For example, where light harvesting is a motivation, then an additional module may have to be built on the control logic to address the additional consideration. The order in which the functionality for addressing that additional feature or function of the tinting zone sits in a processing pipeline for the usual considerations may be irrelevant in some cases. For example, the Intelligence® modules do not necessarily need to operate in the following order: A→B→C→D in one case. It would be understood that it is possible that the order of execution of the modules does matter in other cases.

The control logic may also be adjusted to account for highly localized glare control across multiple zones. For example, this can be addressed with a modification to module A of the control logic described in detail in PCT application PCT/US15/29675.

Different designs of window controllers that can power tinting transitions of multiple tinting zones of one or more multi-zone tintable windows are described above. In some aspects, a tinting zone may have two tint states: a first bleached tint state and a second darkened tint state. In other aspects, a tinting zone may have four tint states. In other aspects, a tinting zone may have more than four tint states.

Figure 29:
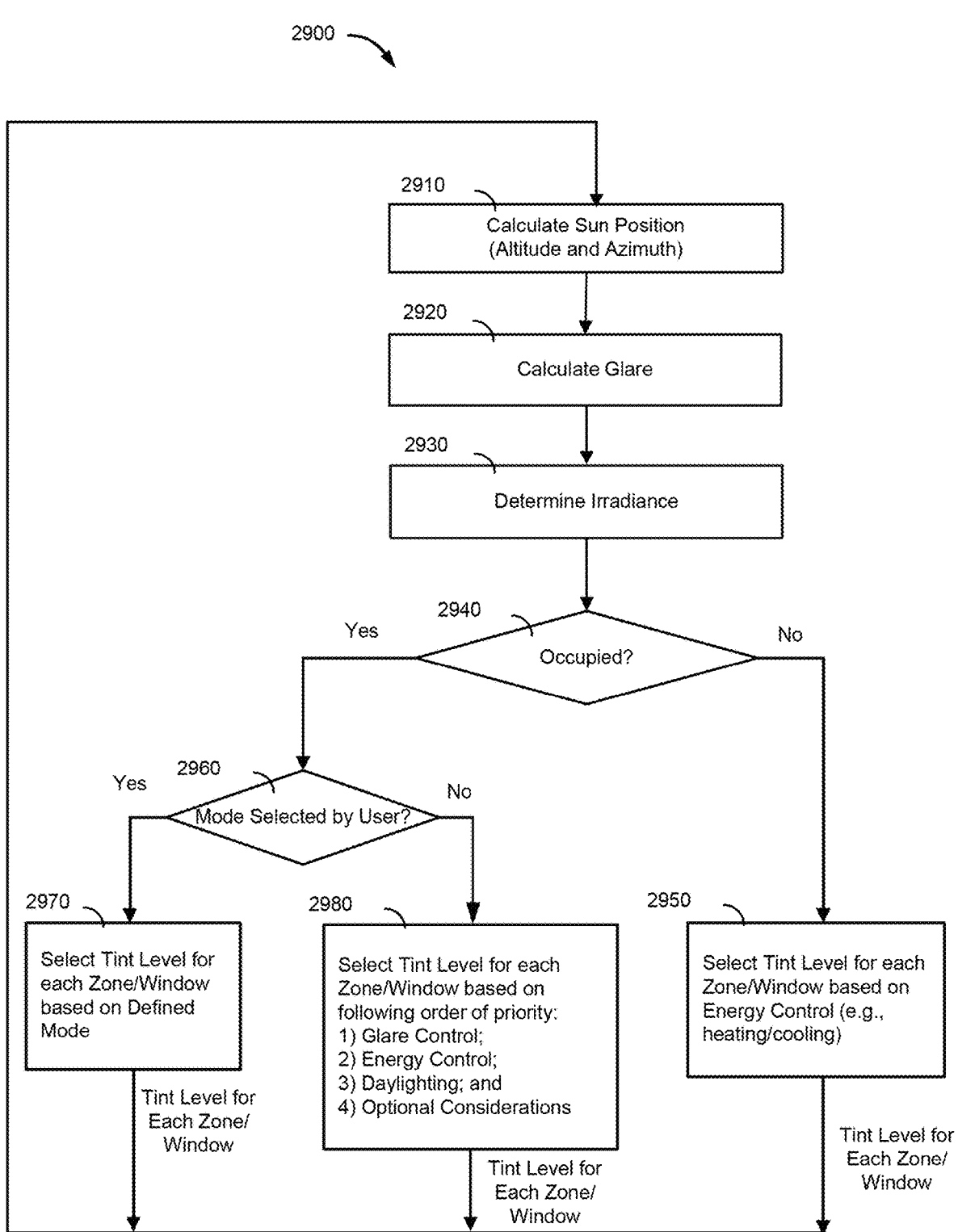
FIG. 29 is a flowchart of a control method for making tint decisions used to control multiple tinting zones, for example, of a multi-zone tintable window, according to embodiments.

FIG. 29 includes a flowchart depicting a method, 2900, illustrating operations used to make tinting decisions for multiple tinting zones/windows, according to embodiments. This control logic can be used to determine tinting decisions for multiple windows and/or for multiple tinting zones in one or more tintable windows, or combinations thereof. The instructions for this control logic are stored in memory and can be retrieved and executed by, e.g., a window controller such as the window controllers shown and described herein, particularly in relation to FIGS. 9 and 10. The control logic includes both instructions for making the illustrated tinting decisions to determine tint levels for the multiple tinting zones/windows as illustrated in the flowchart. The control logic also includes instructions for independently controlling the tinting zones/windows to transition them to the determined tint levels. In certain aspects, operations of this control logic may be adapted to determine tinting decisions to implement tinting configurations described herein.

At operation 2910, the position of the sun is calculated at the latitude and longitude coordinates of the window(s) and the date and time of day of a particular instant in time, ti. The latitude and longitude coordinates may be input from a configuration file. The date and time of day may be based on the current time provided by a timer.

At operation 2920, the amount of direct sunlight transmitted into the room through each of the zones/windows is calculated at the particular instant in time used in operation 2910. The amount of sunlight (e.g., penetration depth) is calculated based on the position of the sun calculated in operation 2910 and the configuration of each zone/window. The zone/window configuration includes information such as the position of the window, dimensions of the window, orientation of the window (i.e. direction facing), and the details of any exterior shading. The zone/window configuration information is input from the configuration file associated with the zone/window.

At operation 2930, the level of irradiance in the room is determined. In some cases, the level of irradiance is calculated based on clear sky conditions to determine clear sky irradiance. A level of clear sky irradiance is determined based on window orientation from the configuration file and based on latitude and longitude of the building. These calculations may also be based on a time of day and date at the particular instant in time used in operation 2910. Publicly available software such as the RADIANCE program, which is an open-source program, can provide the calculations for determining clear sky irradiance. In addition, the level of irradiance may be based on one or more sensor readings. For example, a photosensor in the room may take periodic readings that determine the actual irradiance in the room.

Figure 27:
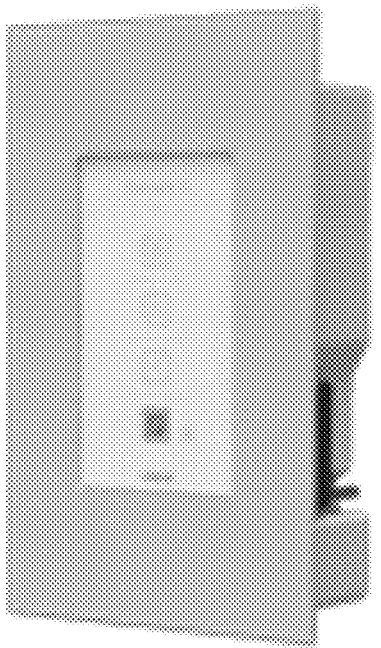
FIG. 27 is a photograph of a manual control panel, according to an embodiment.

At operation 2940, the control logic determines whether the room is occupied. The control logic may make its determination based on one or more types of information including, for example, scheduling information, occupancy sensor data, asset tracking information, activation data from a user via a remote control or a wall unit such as shown in FIG. 27, etc. For example, the control logic may determine that the room is occupied if scheduling information indicates that the occupant is likely to be in the room such as during typical working hours. As another example, the control logic may determine that the room is unoccupied if scheduling information indicates that it is a holiday/weekend. As another example, the control logic may determine that the room is occupied based on readings from an occupancy sensor. In yet another example, the control logic may determine that the room is occupied if the occupant has entered information at a manual control panel of a wall unit or remote control that indicates occupancy. In yet another example, the control logic may determine that the room is occupied (occupancy) based on information received from an asset tracking device such as a RFID tag. In this example, the occupants themselves are not being tracked. Including an occupancy sensor in the room either through a system like Bluetooth low energy (BLE) working with a device on an asset of the occupant or with an occupancy sensor, the control logic can determine whether the room is occupied.

If it is determined at operation 2940 that the room is unoccupied, the control logic selects a tint level for each zone/window prioritizing energy control to heat/cool the building (operation 2950). In some cases, other factors may be weighed in the selection of the tint level such as security or other safety concerns. The tint level determined at operation 2940 is used to transition the zone/window. The control logic then returns to operations 2910, 2920, and 2930, which are typically conducted on a periodic basis.

If it is determined at operation 2940 that the room is in occupied, the control logic determines whether a mode has been selected by a user (operation 2960) or for a particular occupant based on an occupancy profile. For example, a user (e.g. occupant or building operator) may select a mode at a user interface on a remote control or a wall unit such as shown in FIG. 27. In some cases, the GUI may have a button (e.g. icon) designated for selecting the mode, for example, a daylighting icon. Some examples of modes include: "daylighting mode," "uniform mode," "wellbeing mode," "emergency mode" as a user defined modes. For example, the user may define a "user 1-mode 1" with a particular tinting configuration.

If it is determined at operation 2960 that a mode has been selected by the user, then the control logic selects a tint level for each zone/window based on the mode (operation 2970). For example, if a "daylighting mode" has been turned on, then the tint level may determine the tint level based on the following factors in order of priority: avoiding glare and allowing natural light into the room through daylighting regions. The tint level selected at operation 2960 is used to transition the zone/window. The control logic then returns to operations 2910, 2920, and 2930, which are typically conducted on a periodic basis.

In some cases, three-dimensional projections of sunlight through each zone/window are calculated to the amount of direct sunlight transmitted into the room and to determine whether a glare condition exists in the room with the zone/window. A discussion of light projections and determining a glare condition based on light projections is discussed below with respect to FIGS. 28A, 28B, and 28C.

If it is determined at operation 2960 that a mode has not been selected by the user, then the control logic selects a tint level for each zone/window based on factors in the following order of priority: 1) glare control, 2) energy control, and 3) daylighting (operation 2980). In some cases, other secondary factors may also be weighted into the selection of the tint level including one or more of: a time delay to prevent rapid transitioning, color rendering, tinting gradient, feedback based on historical data, occupant's view of the external environment, and light harvesting. For example, when an occupant is in their typical location in the room, it may be desirable for them to see out the window, for example, to view weather patterns. If occupant's view of the external environment is taken under consideration in making the tinting decision, the control logic may determine that although a darkened tint state of a particular tinting zone/window would avoid glare, a lower tint level will be used to provide a more clear view of the external environment.

In one embodiment, three-dimensional projections of sunlight through each zone/window are calculated to the amount of direct sunlight transmitted into the room and to determine whether a glare condition exists in the room with the zone/window. A discussion of light projections and determining a glare condition based on light projections is discussed below with respect to FIGS. 28A, 28B, and 28C.

At operation 2980, to determine a tint level appropriate for the amount of glare determined in operation 2920, the control logic may use an occupancy lookup table to select an appropriate tint level for the zone/window based on the space type associated with the zone/window, glare amount calculated at operation 2920, and the acceptance angle of the zone/window. The space type and occupancy lookup table are provided as input from the configuration file for the particular window. Examples of an occupancy lookup table have different tint levels for different combinations of amount of glare and space type. For example, an occupancy lookup table may have eight (8) tint levels including 0 (lightest), 5, 10, 15, 20, 25, 30, and 35 (lightest). The lightest tint level of 0 corresponds to an SHGC value of 0.80, the tint level of 5 corresponds to an SHGC value of 0.70, the tint level of 10 corresponds to an SHGC value of 0.60, the tint level of 15 corresponds to an SHGC value of 0.50, the tint level of 20 corresponds to an SHGC value of 0.40, the tint level of 25 corresponds to an SHGC value of 0.30, the tint level of 30 corresponds to an SHGC value of 0.20, and the tint level of 35 (darkest) corresponds to an SHGC value of 0.10. In this example, the occupancy lookup table has three space types: Desk 1, Desk 2, and Lobby and six amounts of glare (e.g., penetration depths of sunlight into the room through the zone/window). The tint levels for Desk 1 close to the window are higher than the tint levels for Desk 2 far from window to prevent glare when the desk is closer to the window. An illustrated example of such an occupancy lookup table can be found in PCT/US15/29675, filed on May 5, 2015 and titled "CONTROL METHOD FOR TINTABLE WINDOWS."

In one embodiment, the control logic may decrease the tint level determined based on the amount of glare determined in operation 2920 based on irradiance levels determined at operation 2930. For example, the control logic may receive sensor readings of irradiance which indicates that a cloudy condition exists. In this case, the control logic may decrease the tint level of the zone/window that was determined to be associated with a glare condition.

At operation 2980, the control logic then determines whether to change, based on the second priority of energy control in the building, the tint level selected as appropriate for the amount of glare. For example, if the outside temperature is extremely high such that the cooling load is high, the control logic may increase the tint level in one or more zones/windows to reduce the cooling load. As another example, if the outside temperature is extremely cold, the control logic may decrease the tint level in one or more zones/windows while maintaining a darkened tint state in a zone/window that would otherwise cause glare on the occupancy region. The control logic then determines whether to change the tint level based on the third level of priority daylighting while accounting for energy control in the building and maintaining a darkened tint state in a zone/window that would otherwise cause glare on the occupancy region. The tint level determined at operation 2980 is used to transition the zone/window. The control logic then returns to operations 2910, 2920, and 2930, which are typically conducted on a periodic basis.

A. Tinting Configurations with Factors Designed to Improve Occupant Wellness

According to some aspects, control logic is designed to use tinting configurations that improve occupant wellness. For example, certain tinting configurations discussed herein address factors such as avoiding glare on the occupant's position or likely position, increasing natural lighting in the room, and/or the color of the windows and associated color of light in the room. In addition, control logic may control the rate of transition between tint states. Also, certain tinting configurations may control the tinting gradient between adjacent tinting zones in different tint states and/or the tinting gradient within a particular tinting. Some configurations for controlling the tinting gradient between adjacent zones and within a particular zone are discussed above. Some configurations that address avoiding glare on the occupant's position or likely position, increasing natural lighting in the room, and/or the color of the windows and associated color of light in the room are also discussed above.

1. Passive or Active Manipulation of Light

In certain implementations, a multi-zone window includes one or more techniques for passive or active manipulation of light passing through the window to ensure there is no glare on the occupancy region and controls heat load while allowing for continuous daylighting into the room. These techniques can function along with controlling the tinting of the multi-zone window.

In one aspect, the window may have active or passive control over the direction of the light going into the room. Some examples of such techniques include micro shades, hexcells, light tubes, IR mirrors or IR reflectors, a film that absorbs IR or reflects IR. In one example, a window is designed to ensure that light is directed to be parallel when coming into a room by using micro shades, or hexcells, or thin film coatings. These techniques can be used to allow natural light into the building while avoiding glare, controls heat and allow for manipulation of the light, provides beneficial color rendering using natural daylight. In an illustrated example, FIG. 6 shows a multi-zone window in the form of an IGU with light tubes in the region between the two lites. The light tubes are in a region proximal the tinting zones 693 and 694 of the lites. Both tinting zones 693 and 694 are in the clear state for continuous daylighting to pass sunlight incident the outer surface of tinting zone 694.

In another aspect, a multi-zone window in the form of an IGU includes one or more IR mirrors or IR reflectors in the region between the two lites of the IGU. In one example, the mirrors/reflectors are located in region aligned with one or more tinting zones that can be held in the clear state to allow continuous daylighting into the room when sunlight is incident the outer surface at that region.

In yet another aspect, a multi-zone window with an electrochromic device that comprises a film that absorbs IR or reflects IR to control the heat that is coming into a building and has active or passive control over the direction of the light going into the room.

Microshades

In implementations with microshades, the micro shades or the window could be articulated to adjust the direction of the light that is going into the room. For example, the microshades can be articulated to orient them to direct light to bounce off the ceiling and/or to be kept parallel. In one example, a multi-zone window is round and can be (at least) rotated in the plane of the wall in which it is installed in order to harvest the light as the sun position and azimuth changes, for example, to direct light in the same direction as the position of the sun changes. The round window could additionally have controllably articulating microshades to change their orientation to ensure proper non-glare daylighting throughout the day. Some details of microshades and MEMS devices are described in U.S. patent application Ser. No. 14/443,353, titled "MULTI-PANE WINDOWS INCLUDING ELECTROCHROMIC DEVICES AND ELECTROMECHANICAL SYSTEMS DEVICES" and filed on May 15, 2015, which is hereby incorporated by reference in its entirety.

A multi-zone window with microshades would typically be installed above a tintable window/zone without microshades, and above the height of the occupant to help ensure that there will never be any glare on the occupant. If the window has active or passive aiming of the incoming light, the angle of the microshades can be adjusted to modify the angle to ensure there is no glare even if they were placed below the height of the occupant.

In some cases, multi-zone window with techniques for passive or active manipulation of light can be controlled based on input from a camera in the room or a sensor such as an occupancy sensor. When coupled with a camera in the room or a sensor, this configuration can use active aiming to optimally heat up the room when that is desired. In addition, coupling with interior active or passive reflective surfaces, the system could harvest the light and direct it to other areas of the building. For example, the light can be channeled to other areas using light tubes or directed to other areas by simply cutting holes in walls to allow the light to penetrate deeper into a building.

2. Color Rendering and Modified Color Temperature

The tint of a window can change the amount of light transmitted through a tintable window and the wavelength spectrum and associated color of the interior light transmitted into the room. Some tinting configurations described herein have techniques that provide preferential spectral selection of the incoming light. These techniques can augment lighting to balance both the interior rendered color and the amount of natural light in the appropriate wavelength to improve visual comfort, circadian rhythm regulation, and associated psychological effect. For example, a tintable window may include a filter layer that controls the transmission of natural daylight through the window. These techniques can improve the color and spectrum of the incoming daylight into the room and the comfort, visual perception, mood and wellbeing of the occupant. Some techniques can change the CCT (correlated color temperature) and CRI (color rendering index) of the light in a room to have incoming light-color closer to natural light.

One tinting configuration provides both natural lighting as well as filtered light. These configurations may also use artificial lighting to augment and/or adjust CCT and/or CRI. Other methods provide only filtered light and artificial lighting to augment and/or adjust CCT and/or CRI.

Creating Preferred Lighting for Occupant Using Color Balancing

As outlined above, described methods call for tinting in certain areas while not tinting in other areas, e.g. certain zones of a multi-zone tintable window or certain windows in a group of tintable windows, to reduce glare for the occupant while allowing ambient light to enter, so called "daylighting," that uses natural light to satisfy illumination requirements and color offset (color balance) e.g. from a tintable window's unwanted blue hue imparted to the occupant's space. Generally speaking, an occupant prefers natural sunlight over artificial lighting from, for example, incandescent, light-emitting diode (LED), or fluorescent lighting. However, with advancements in LED lighting technology, a much greater range of lighting possibilities, wavelengths, frequencies, colors, intensity ranges, and the like are possible. Specific embodiments use LED lighting technology to offset the blueness or other unwanted hue in the occupant's space due to the transmitted light from tintable windows. In certain embodiments, control of tintable windows includes control over LED lighting to correct this perceived and rendered color to produce an ambient lighting condition that the occupant would prefer. These methods can improve the color and spectrum of the incoming daylight into the room and the comfort, visual perception, mood and wellbeing of the occupant. Some methods change the CCT (correlated color temperature) and CRI (color rendering index) of the light in a room to have incoming light-color closer to natural light.

In some embodiments, LED lighting is used to augment daylighting from natural light sources, e.g. when the amount, angle of natural light entering the room or other factors make the natural lighting insufficient to offset coloration from the light filtered through tintable windows. For example, electrochromic windows may change the spectrum bandwidth, color and the amount of natural light that enters the room. By providing a preferred spectral selection to the incoming light one can provide augmented lighting to balance both the interior rendered color and the amount of natural light required in the appropriate frequency to ensure visual comfort, and, e.g., circadian regulation and improved psychological effect In certain embodiments, LED lighting is used as an alternative to natural light in order to achieve daylighting; that is, when only light filtered through tinted windows is available, LED lighting is adjusted to compensate for the unwanted color imparted by the tintable windows. For example, it may be the case that certain occupants desire a uniform window façade in terms of tinting, i.e. multi-zone windows or tinting some windows while not tinting others is undesirable from an aesthetics standpoint. In one embodiment, filtered light from a uniformly tinted window or group of windows, i.e. not using certain windows or zones to allow daylighting in to offset color, is measured for its color and light characteristics or calculated based on known filtering characteristics of the tintable windows. Based on the value obtained, LED lighting is used to offset unwanted color hue or other light characteristics in order to improve occupant comfort. Some methods change the CCT (correlated color temperature) and CRI (color rendering index) of the light in a room to have ambient light-color closer to that of natural light.

In these embodiments, the incoming light, with or without natural light, is either modeled through a predictive algorithm or directly measured with an in-room sensor, e.g. on the wall, e.g. in a wall unit such as described in relation to FIG. 27, or in one or more of the tintable windows allowing light into the space. In one example, a higher color temperature is maintained using LED lighting when tintable windows are in a less tinted (less absorptive) state, and a lower color temperature (e.g. more yellow) is imparted by the LED lighting when tintable windows are in a more tinted (more absorptive) state in order to maintain a CRI closer to natural lighting in the space. Further aspects of these embodiments are described below in the "Circadian rhythm regulation" and "Wellbeing Mode" sections of this description.

Circadian Rhythm Regulation

In certain tinting configurations, the tinting is controlled, e.g., with filter(s), to change the wavelength spectrum of the incoming light to the appropriate light-wavelength to regulate the circadian rhythm and hence benefit the occupant.

In one technique, the tinting is controlled, e.g., with filter(s), to change the wavelength spectrum of the incoming light to a rendered color that the occupant would prefer. This technique allows for control over LED lighting or other lighting to correct this perceived and rendered color to a preferred lighting condition for the occupant. By controlling the transmission of a certain amount of natural daylighting at the appropriate wavelength/wavelengths, the circadian rhythm can be regulated which can be of benefit to the health and wellbeing of the occupant.

In these configurations, control logic can have operations that predict the amount and direction of the solar radiation or a sensor or sensors in the room can measure the amount and direction of the solar radiation. For example, an irradiance sensor in the room located on the wall or the window can send signals to the window controller with periodic measurements. In one case, this sensor may be certified, as in a health care setting, to be properly sensitive/tested and calibrated to guarantee the correct outcome. Alternatively we can get this information from the lighting system.

To provide circadian smart lighting, the window can have a specific sensor with a band gap filter and a time tracker to guarantee the window has provided the correct spectrum of natural light required for a specific time of day. This may be provided by the daylight coming through the window and/or by the augmented interior lighting that has been requested to provide the correct amount of appropriate wavelength of lighting.

3. "Wellbeing Mode"

Moreover, the color of the interior light could have influence on the occupant's behavior in different spaces based on the function of the space. The control logic may have a separate logic module for control of the filtered natural light or augmented interior lighting to benefit the occupant's mood and behavior. The operations of this module may function differently depending on the function of the occupant's space in the room. In some cases, the user may be able to select a "wellbeing mode" on a user control panel to have the light in the room controlled according to this module designed to improve the occupant's mood and behavior.

In some cases, the control logic can be adapted to predict the wavelength and intensity of the exterior lighting and then combine it with the current tint-level spectral characteristics and predict the spectral distribution of incoming daylight into the room. The wavelength and intensity of the exterior lighting could be predicted, for example, using a weather service and a calculated sun angle based on a solar calculator.

Including an occupancy sensor in the room either through a system like BLE working with a device on the occupant or with an occupancy sensor, the control logic can choose whether to control the daylighting and the windows with respect to the occupancy profile.

Alternatively if the room has a camera capable to record luminance and light-spectrum in the room, the camera images can be used to determine both whether there is an occupant, where the occupant is located, and what offset or change in the interior light would be needed to correct the EC filtered light. This camera could also be calibrated to ensure the occupant with respect to time-of-day and specific location is getting the appropriate amount of appropriate light spectrum to benefit their circadian rhythm. Alternatively by using a plethora of sensors in the ceiling or in each light, the sensor data can be used to verify an occupant, whether there is occupancy in a particular location and the color rendering of the lighting needed as well as the appropriate amount of light spectrum to benefit occupant's circadian rhythm.

Tinting decisions based on wellbeing considerations are based on one or more factors including: (1) lighting in the room with the appropriate wavelength spectrum to regulate occupant's circadian rhythm; (2) determining of occupancy location to verify the lighting and exposure time for that occupant is met; (3) providing appropriate color rendering index of the interior light in the room to correct the EC IGU's filtered light color based on a predefined color rendering; (4) Correlated color temperature of the interior light in the room to correct the EC IGU's filtered light color based on a predefined CCT amount, which can be applied to improve psychological effect of light in specified interior spaces; (5) account for unique sensors that are certified to support the appropriate spectral distribution of lighting to benefit occupant's circadian rhythm; and (6) lighting objectives that change based on if there is an occupant being effected by the lighting that is being controlled by either the interior lighting or the EC IGU's filtered light.

4. Daylighting Tinting Configurations

Certain aspects are related to tinting configurations with a multi-zone window that has at least one tinting zone (or window) that is held in the bleached tint state (daylighting tinting zone(s)). A daylighting tinting zone allows natural light to pass into the room while controlling glare/temperature in the room by tinting other tinting zones of the multi-zone window. These aspects are directed to motivations from the occupant/building. First, a daylight tinting zone (or window) can increase room illumination. That is, darker tint states can make a room look too dark to the occupant. The occupant may want to let in more light into the room while still controlling glare when the sun shines on a façade. Second, a daylight tinting zone can improve room light color. That is, darker tint states can make light in the room look colored (e.g., blue). Occupant may want to maintain a more natural room color while tinting to control glare. Third, a daylight tinting zone can improve the view through the window and the occupant's connection to outdoors. Occupant may want to identify current weather or other outdoor conditions when the window is in darker tint states. Fourth, a daylight tinting zone can maintain glare/heat control. That is, other tinting zones will be tinted to protect occupants from glare and prevent heat from solar radiation.

In certain aspects, the daylighting tinting zone has a width that is sufficient to allow enough natural light into the room to reduce the color of light (e.g., blue hue) in the room while still providing glare/heating control. In one aspect, the width of the daylighting tinting zone is about 5". In another aspect, the width of the daylighting tinting zone is less than 22". In another aspect, the width of the daylighting tinting zone is between about 10" and 21". In one aspect, the width of the daylighting tinting zone is about 15".

Some examples of daylighting tinting configurations are shown in FIGS. 1-5B. Other examples of tinting configurations are shown in FIGS. 12A, 12B, 13, 14, 15, 16, 17, 18, 19, and 20.

Figure 11:
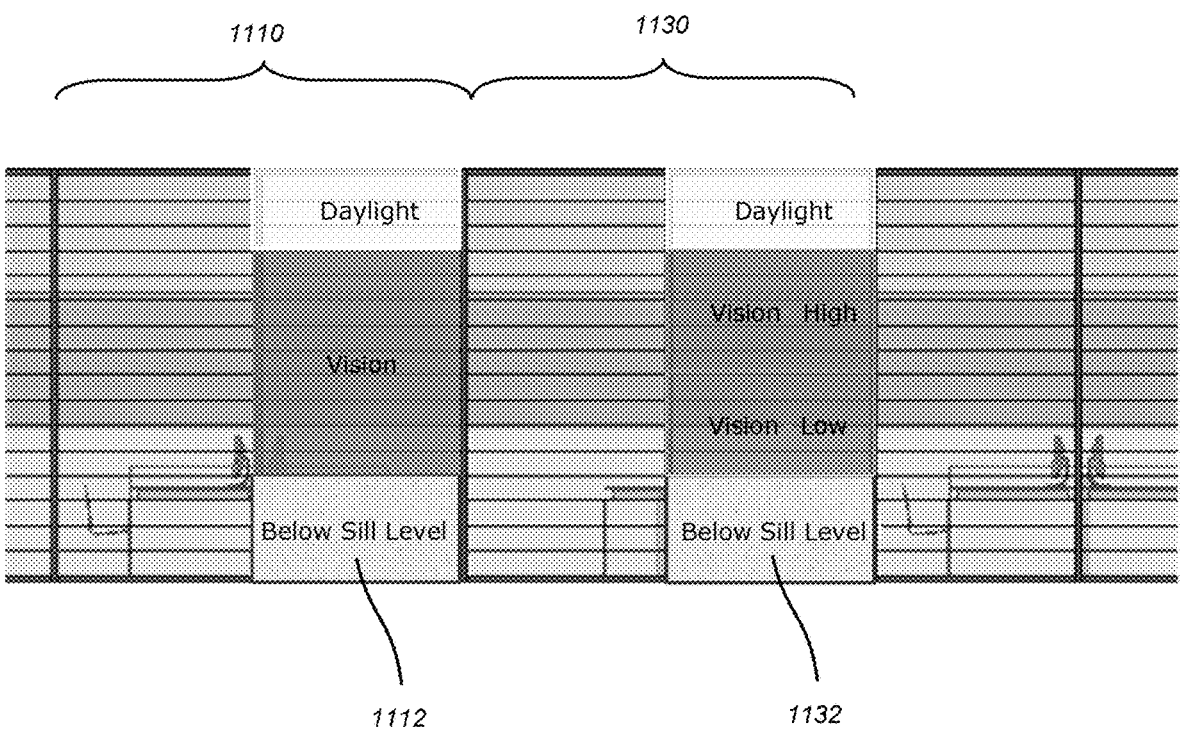
FIG. 11 shows a left room and a right room, each with a tintable multi-zone window, according to aspects of a daylighting configuration, according to embodiments.

FIG. 11 shows a left room, 1110, with a first multi-zone tintable window 1112 and a right room, 1130, with a second multi-zone tintable window 1132, according to aspects of a daylighting tinting configuration. The first multi-zone tintable window 1112 in room 1110 at the left has two tinting zones above the sill level. The second multi-zone tintable window 1132 in room 1130 at the right has three tinting zones above the sill level. In both the first and second multi-zone tintable windows 1130, 1132, a lower portion below the sill level is non-tintable. In one case, the lower portion may be a transparent substrate without an optically switchable device. In both rooms 1110, 1130, the top tinting zone is shown in a clear state to allow daylight to pass through the tinting zone into the room, which is similar to the transom window example shown in FIG. 2. The first multi-zone tintable window 1112 with two tinting zones may have lower manufacturing and design complexity than the three-zone window.

Figure 12A:
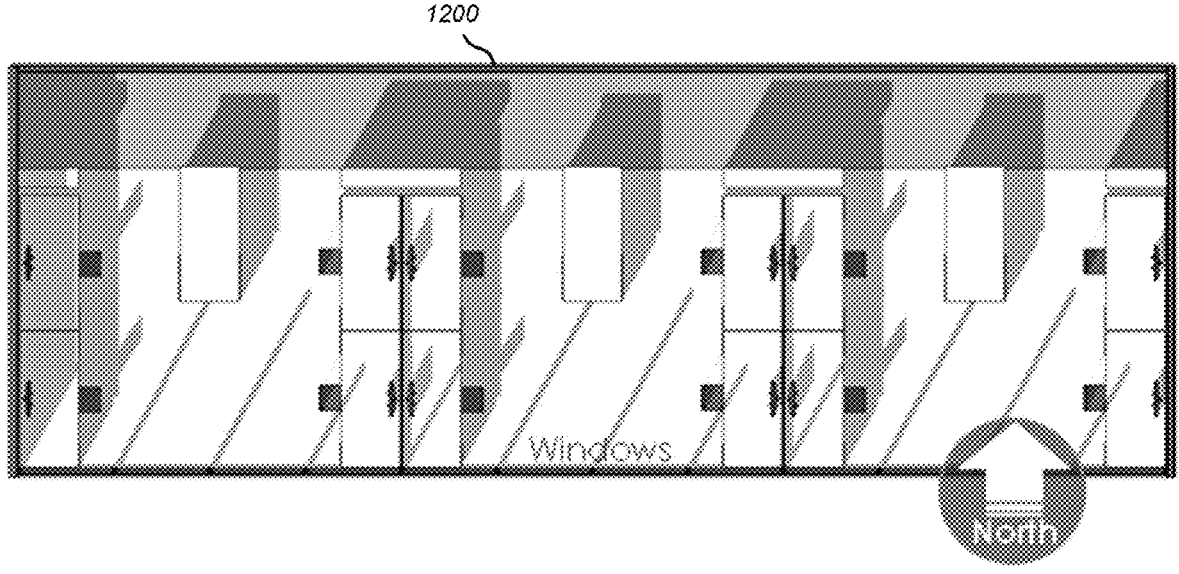
FIGS. 12A and 12B are different views of a modeled building with several tintable multi-zone windows, according to an embodiment.
Figure 12A:
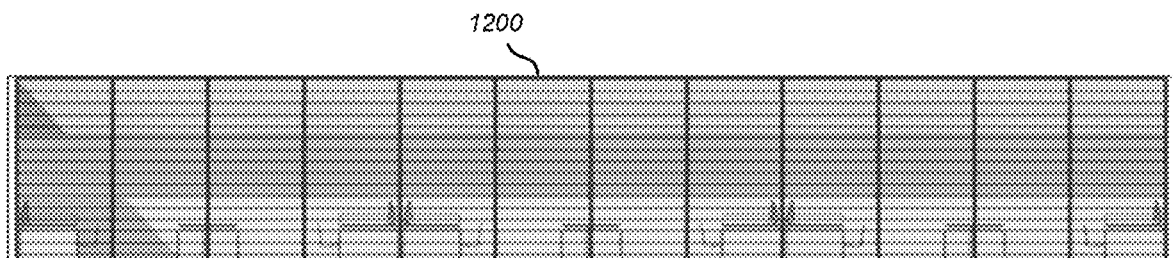
Figure 12B:
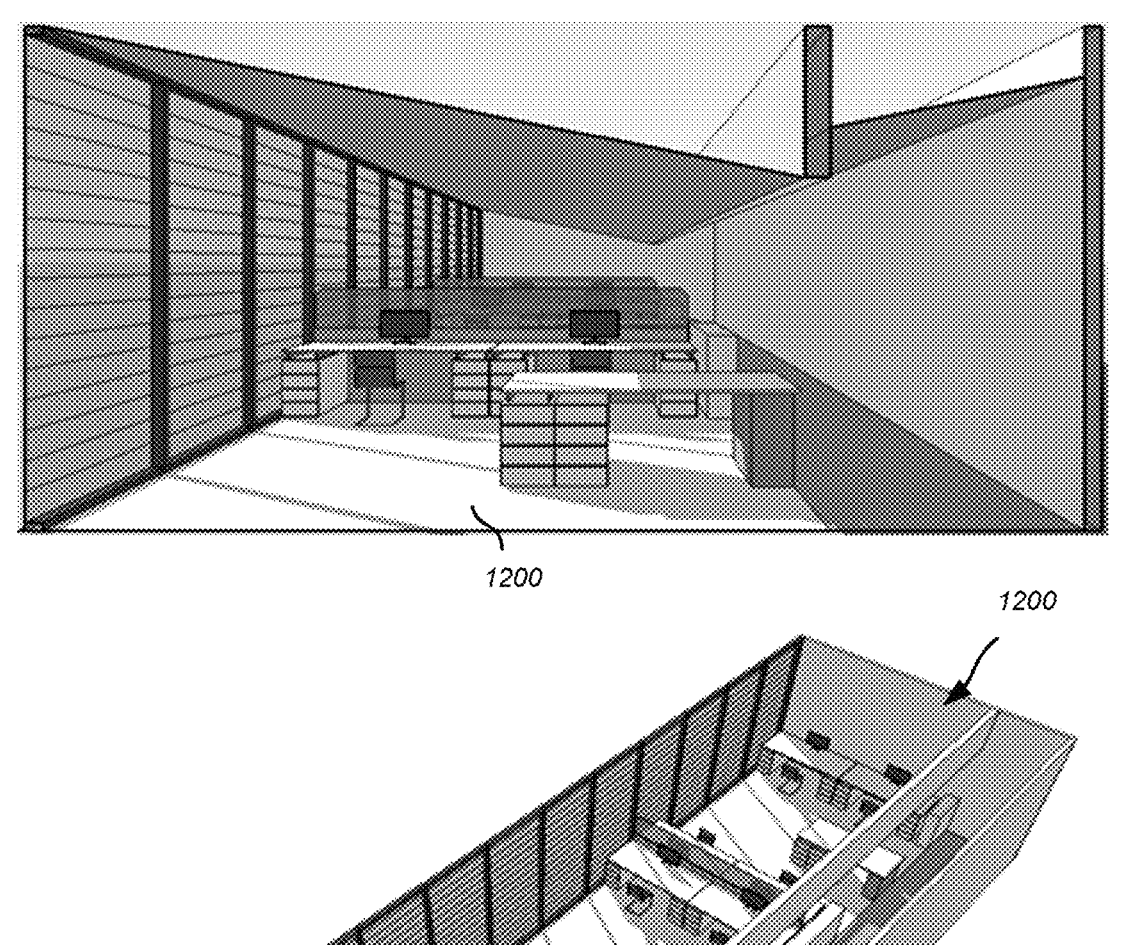

FIG. 12A includes plan and side (south elevation) views of a modeled building with several tintable multi-zone windows in a room 1200, according to an embodiment illustrating a daylighting tinting configuration. FIG. 12B includes perspective views of the room 1200 modeled building shown in FIG. 12A. Each multi-zone window having two tinting zones, a first top tinting zone and a second middle tinting zone. The lower area is a transparent substrate without an optically switchable device. In the illustrated example, the upper tinting zone is in a lighter state than the middle tinting zone to allow daylight to pass through the upper tinting zone into the room.

Figure 13:
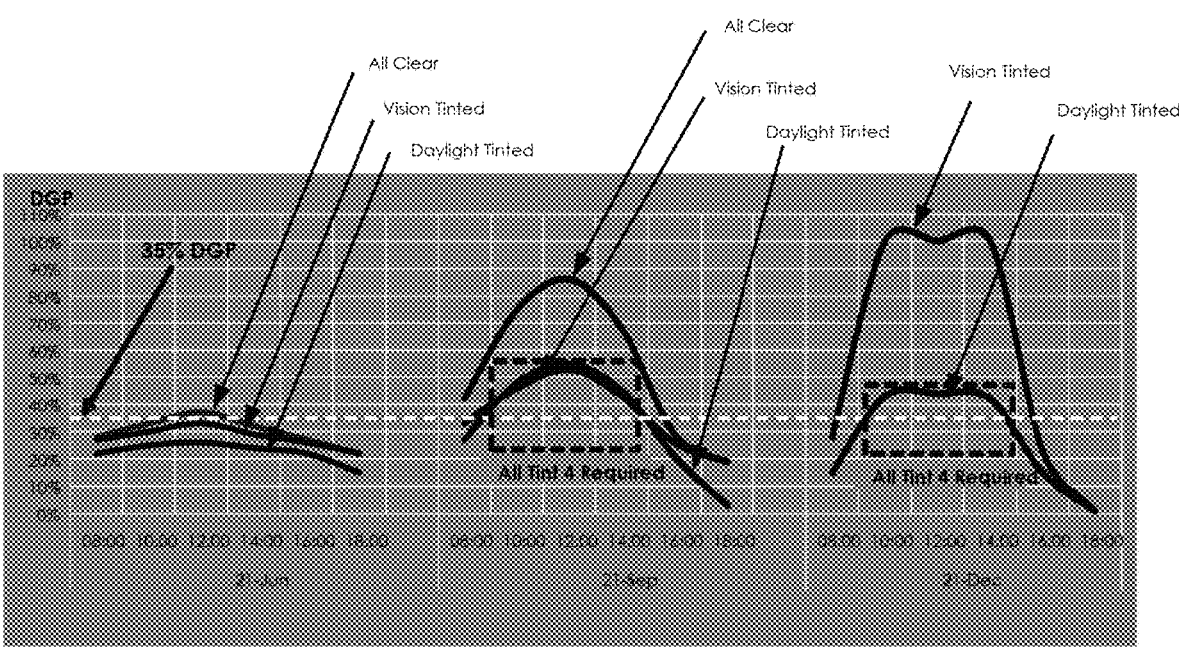
FIG. 13 is a graph of the Daylight Glare Probability (DGP) on June 21, September 21 and December 21 from sunlight through a multi-zone window in a room, according to an embodiment.
Figure 14:
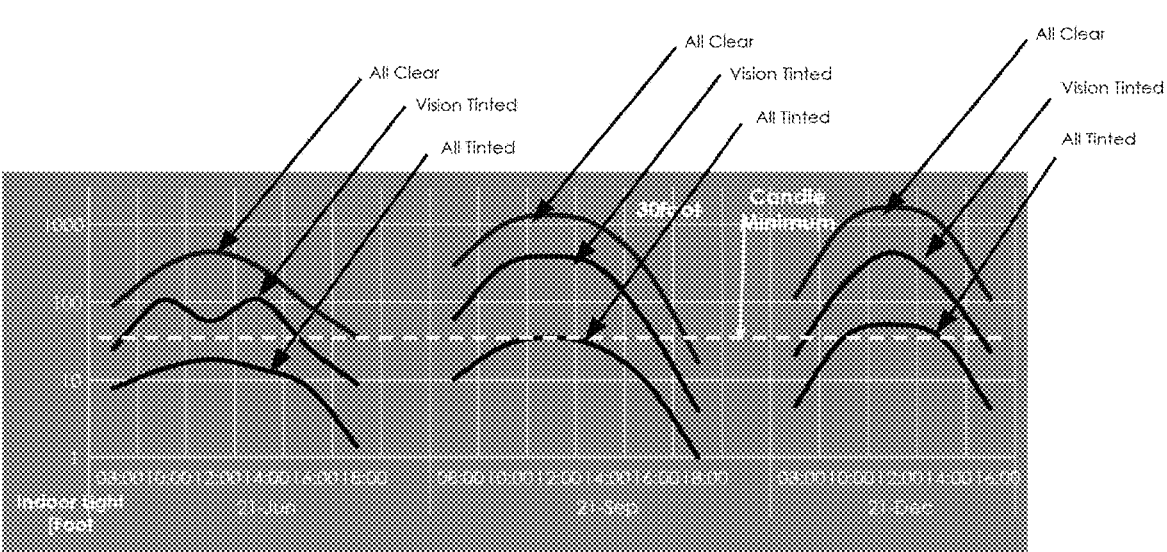
FIG. 14 is a graph of the indoor light levels on June 21, September 21 and December 21 in the room described with respect to FIG. 9, according to an embodiment.

FIG. 13 is a graph of the daylight glare probability (DGP) on June 21, September 21 and December 21 from sunlight through the multi-zone window shown in FIG. 11 at the seating rows 1 and 2 of a room, according to an embodiment. The multi-zone window has two tinting zones. FIG. 14 is a graph of the indoor light levels at desk level in foot-candle (FC) on June 21, September 21 and December 21 for the two tinting zones in the room described with respect to FIG. 13. FIG. 15 is a chart of a tinting schedule for the two-zone multi-zone window shown in FIG. 11 including illuminance levels and DGP values. As shown, from a time periods, to tinting zones provide sufficient glare control and daylighting. The darkest tint state (tint 4) is needed for the middle of the day at the end of the year.

FIG. 16 is a chart of a tinting schedule for a multi-zone window having two zones and having three zones. Compared to two zones, three zones offers more tinting options. Lower vision only can be tinted at times to slightly drop glare without affecting light levels.

Figure 17:
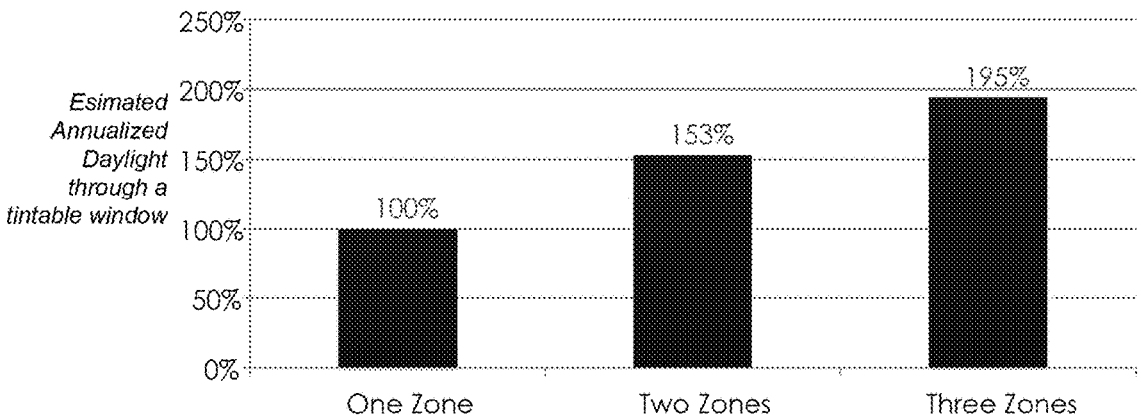
FIG. 17 is a chart showing the comparison of annualized daylight for a tintable window having one tinting zone, a multi-zone tintable window having two tinting zones that tint in a daylighting configuration, and a multi-zone tintable window having three tinting zones that tint in a daylighting configuration, according to embodiments.

FIG. 17 is a chart showing the comparison of estimated annualized daylight through a tintable window having one tinting zone, a multi-zone tintable window having two tinting zones, and a multi-zone tintable window having three tinting zones, each that implement a daylighting tinting configuration. This chart shows that with increased tinting zones, the annualized daylight increases. In this example, the window with three zones has more than 27% higher annualized daylight than the two zone configuration.

Figure 18:
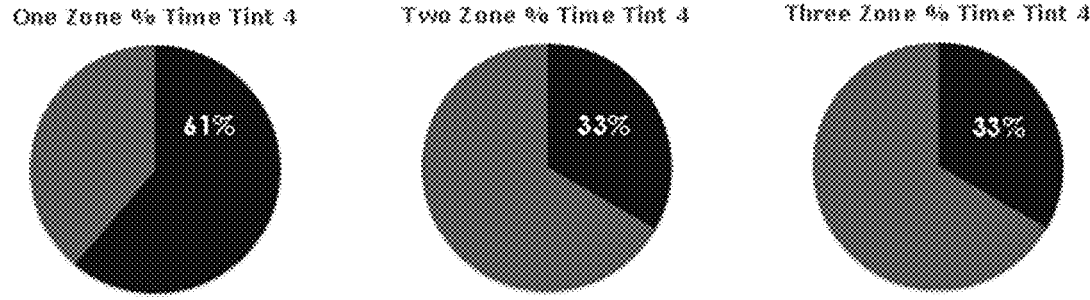
FIG. 18 shows pie charts of the percentage of working hours at the darkest tint 4 for a tintable window having one tinting zone, a multi-zone tintable window having two tinting zones that tint in a daylighting configuration, and a multi-zone tintable window having three tinting zones that tint in a daylighting configuration, according to embodiments.

FIG. 18 depicts pie charts of the percentage of estimated annualized working hours at the darkest tint 4 for a tintable window having one tinting zone, having two tinting zones that tint in a daylighting configuration, and having three tinting zones, each that implement a daylighting configuration. In this example, the multi-zone window with two zones and three zones in the daylighting configuration has spent 28% less time spent in the darkest tint state (T4) than the window with a single tinting zone.

Figure 19:
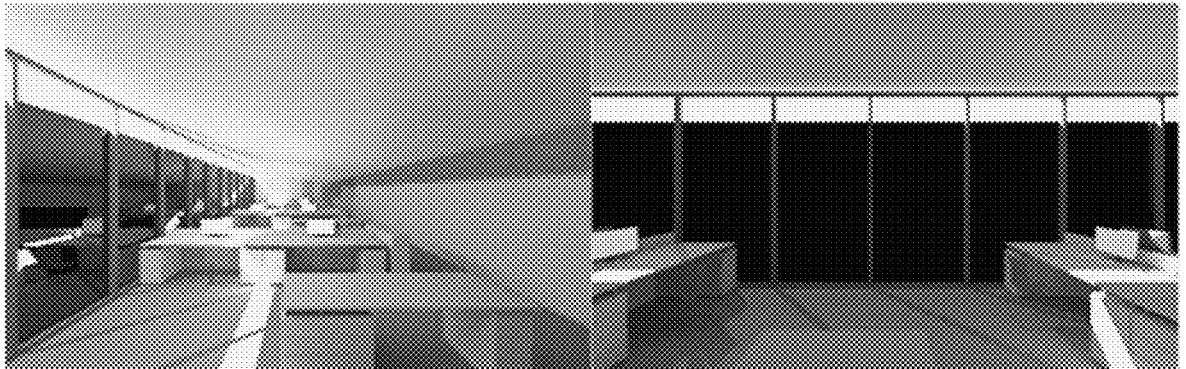
FIG. 19 shows two illustrations of a room with daylighting zone simulations, according to embodiments.

FIG. 19 shows an illustration of a simulation of two views of a room having multi-zone tintable windows with a daylighting tinting zone having a width of 15".

Figure 20:
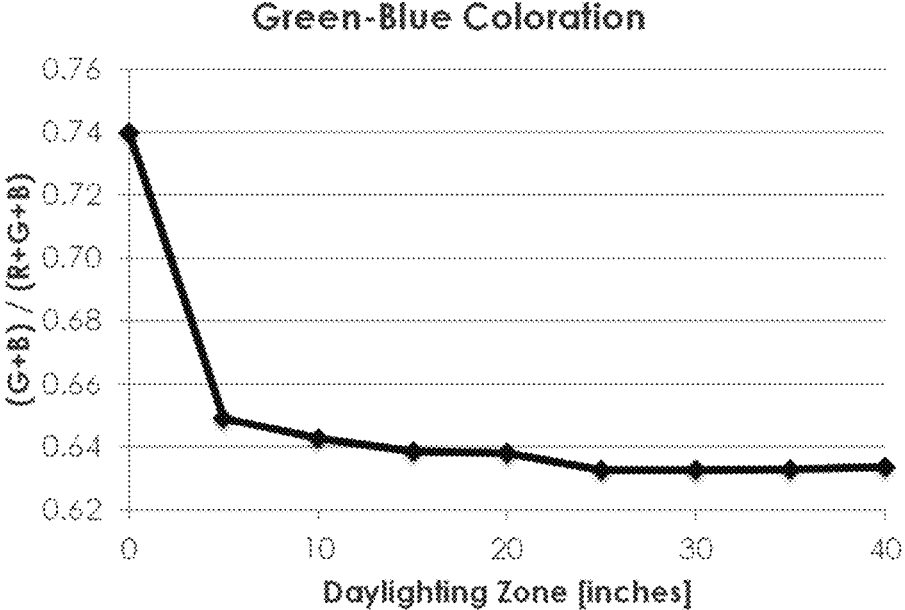
FIG. 20 shows charts of the green-blue coloration and luminance in the simulated room with the daylighting tinting zone size varying in steps of 5".
Figure 20:
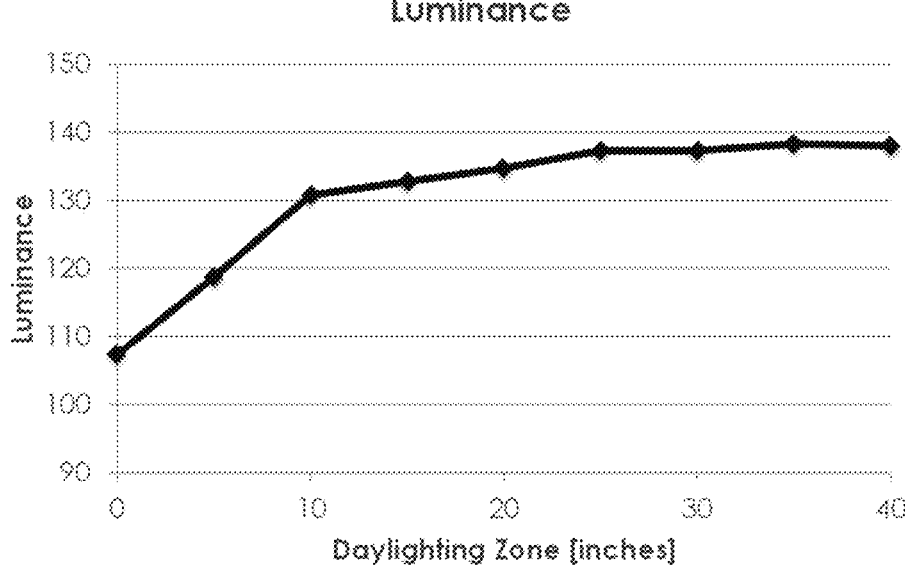

FIG. 20 shows graphs of the green-blue coloration and luminance in a simulated room with a daylighting tinting zone having a width of 5". The first 5" in the width of the daylighting zone makes the largest incremental difference in room color. One embodiment is a method of providing daylighting to a room having tintable windows between the room space and the exterior of the room, the method including allowing at least 5" of non-tinted window length when the remainder of the tintable windows' length are tinted to allow less than 5% transmission of the solar spectrum pass through them.

5. Tinting Gradient Between Tinting Zones

Some occupants may prefer to not see a sharp contrast between different tint states of adjacent tinting zones. In order to minimize this contrast, a tinting gradient can be used to transition between the different tint states in a gradient portion (area) between the tinting zones. In certain aspects, this gradient portion is a resistive zone. Examples of resistive zones can be found described in detail in U.S. patent application Ser. No. 14/137,644, titled "Multi-Zone EC Windows," filed on Mar. 13, 2013, which is incorporated herein by reference.

In some aspects, a multi-zone window comprises a gradient portion (also called herein a gradient region) between adjacent tinting zones to reduce the contrast between different tint states in the adjacent tinting zones. This gradient portion has a length that runs along the intersection of the adjacent tinting zones and a width. Generally, the width is selected to be large enough so that when the gradient portion is viewed from across the room, it does not appear as a sharp line between the tinting zones. In one aspect, the width of the gradient portion is about 10". In another aspect, the width of the gradient portion is the range of 2" to 15". In one aspect, the width of the gradient portion is about 5". In one aspect, the width of the gradient portion is about 2". In one aspect, the width of the gradient portion is about 15". In one aspect, the width of the gradient portion is about 20". In one aspect, the width of the gradient portion is about 20". In one aspect, the width of the gradient portion is at least about 10". In one aspect, the width of the gradient portion is at least about 16".

Figure 21:
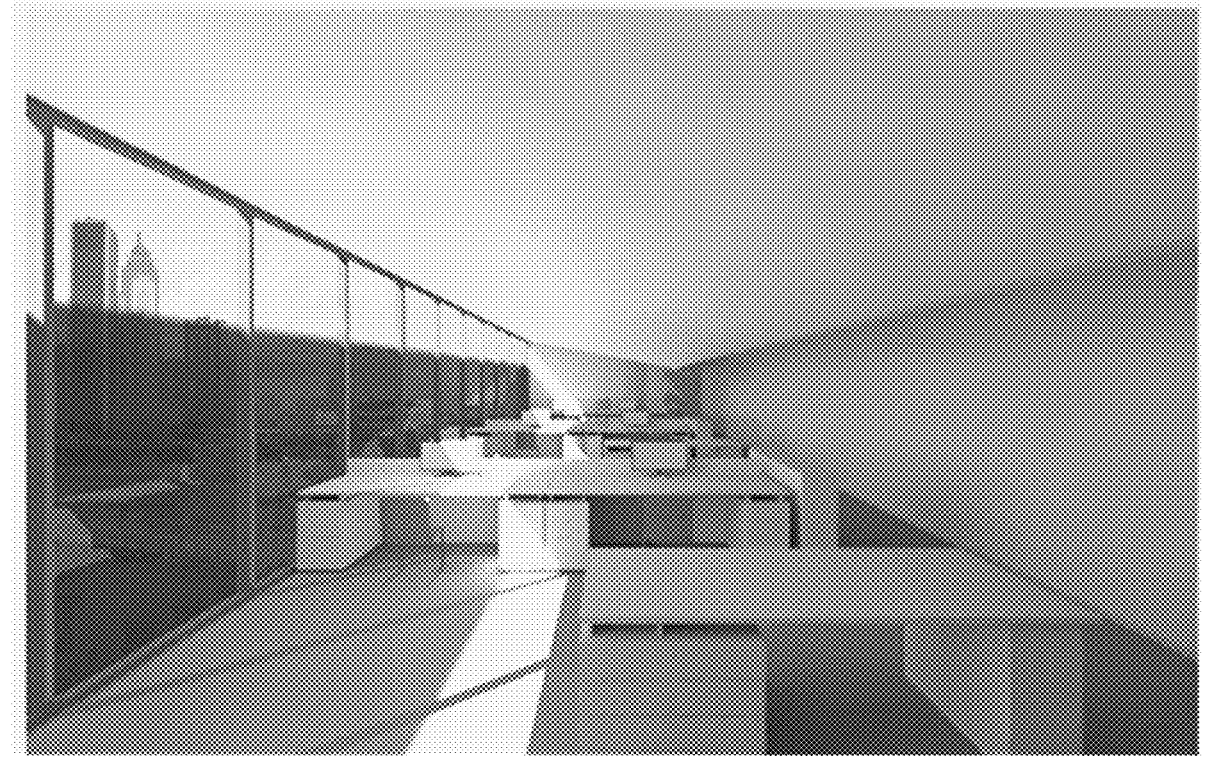
FIG. 21 is an illustration of a room with multi-zone windows with a gradient region having a width of 2" according to an embodiment.
Figure 22:
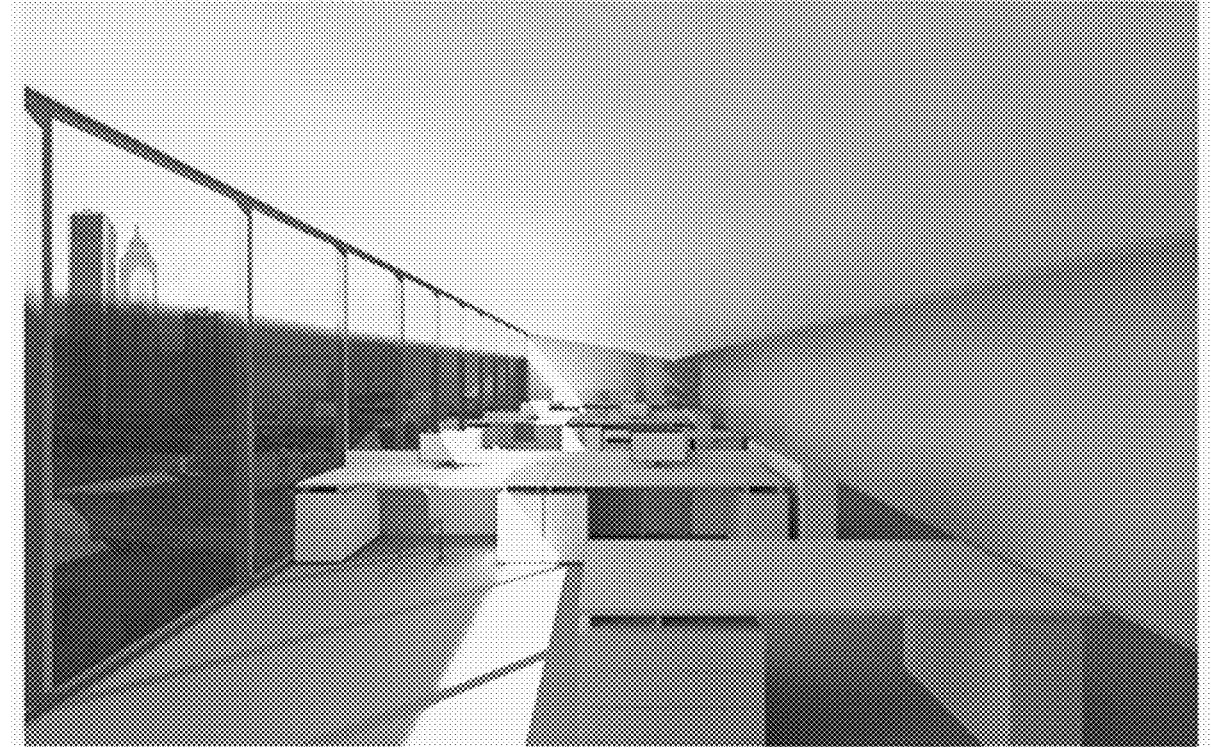
FIG. 22 is an illustration of a room with multi-zone windows with a gradient region having a width of 5" according to an embodiment.
Figure 23:
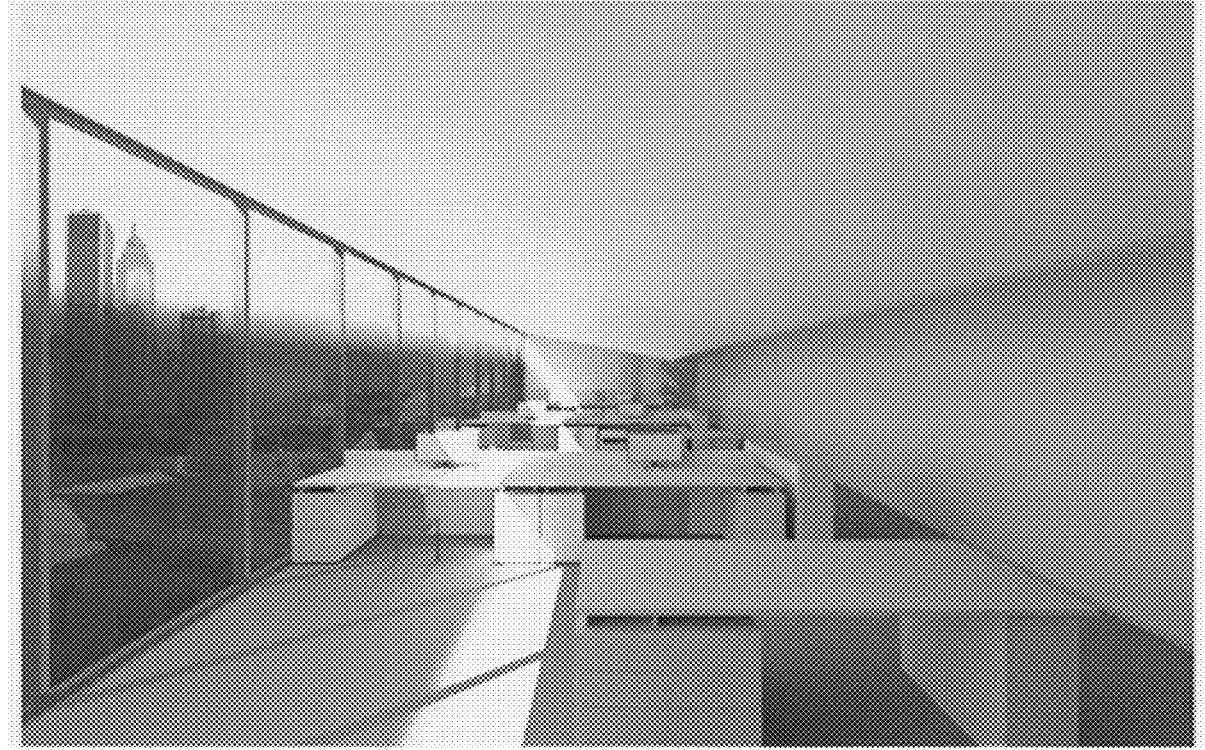
FIG. 23 is an illustration of a room with multi-zone windows with a gradient region having a width of 10" according to an embodiment.
Figure 24:
FIG. 24 is an illustration of a room with multi-zone windows with a gradient region having a width of 15" according to an embodiment.
Figure 25:
FIG. 25 is an illustration of a room with multi-zone windows with a gradient region having a width of 20" according to an embodiment.
Figure 26:
FIG. 26 is an illustration of a room with multi-zone windows with a gradient region having a width of 30" according to an embodiment.

Illustrated examples of multi-zone windows with gradient regions having different widths are shown in FIGS. 21-26. FIG. 21 is an illustration of a room with multi-zone windows having a gradient region with a width of 2" between a daylighting tinting zone and an adjacent lower tinting zone in a darker tint state. FIG. 22 is an illustration of a room with multi-zone windows having a gradient region with a width of 5" between a daylighting tinting zone and an adjacent lower tinting zone in a darker tint state. FIG. 23 is an illustration of a room with multi-zone windows having a gradient region with a width of 10" between a daylighting tinting zone and an adjacent lower tinting zone in a darker tint state. FIG. 24 is an illustration of a room with multi-zone windows having a gradient region with a width of 15" between a daylighting tinting zone and an adjacent lower tinting zone in a darker tint state. FIG. 25 is an illustration of a room with multi-zone windows having a gradient region with a width of 20" between a daylighting tinting zone and an adjacent lower tinting zone in a darker tint state. FIG. 26 is an illustration of a room with multi-zone windows having a gradient region with a width of 30" between a daylighting tinting zone and an adjacent lower tinting zone in a darker tint state.

Taking various user feedback on the various gradient region widths, it has been found that a minimum of 5" of gradient are required before users begin to ignore the contrast between bleached or lightly tinted zones and adjacent darkly tinted zones (e.g. zones tinted to levels that block between 95% and 99% of the solar spectrum). Larger tint gradient widths may accomplish the same goal, though 5" width is sufficient in most cases.

6. Occupancy Input, Dynamic Awareness of Occupancy Locations

In certain implementations, control logic is used to control the tint state of each of the tinting zones of a multi-zone tintable window, individual windows of a group (or zone) of windows, or combinations thereof. In some cases, the control logic first determines whether the room with the window is occupied or unoccupied. The control logic may make its determination based on one or more data such as, for example, one or more of scheduling information, occupancy sensor data, asset tracking information, activation data from a user via a remote control or a wall unit such as shown in FIG. 27, etc. The remote control may be in the form of handheld device such as a smart phone or may be a computing device such as a laptop. For example, the control logic may determine that the room is occupied if scheduling information indicates that the occupant is likely to be in the room. As another example, the control logic may determine that the room is occupied based on readings from an occupancy sensor. In yet another example, the control logic may determine that the room is occupied if the occupant has entered information at a manual control panel of a wall unit or remote control that indicates occupancy.

If the room is occupied, the control logic determines whether a glare condition exists in the area that is occupied or is likely occupied.

The control method determines the tint states for the tinting zones based on the locations of the occupant(s) in the room. For example, the tint states can be determined to avoid glare on a desk or other area that may be likely or is occupied. In some cases, the current location of the occupant(s) is based on the information retrieved from an occupancy lookup table. In other cases, the current location of occupants is based on the data in a signal from a sensor (e.g., occupancy sensor). The sensor may generate the signal with the location of an occupant in the room. The window controller may receive the signal. As another example, a user may provide data regarding the location of an occupant in the room, for example, via a control panel in the room.

FIG. 27 is a photograph of an example of a wall unit with a manual control panel, according to an embodiment.

In certain aspects, a control method determines tint states for tinting zones in a multi-zone tintable window having a daylighting tinting zone. In these cases, the control method determines tint states that maximize daylight while controlling glare and/or heat load from solar radiation entering the room. In certain aspects, the user can use a control panel (e.g., manual control panel in room or computer interface) to select a "daylighting mode" or a "uniform mode," another predetermined mode, or a mode customized by the user. For example, the user may be able to customize different tint states for the zones of the windows in the room e.g., "user 1-mode 1." In the "daylighting mode," the control method determines a clear or lighter tinting state for the daylighting tinting zone than for other tinting zones of the window. In the "uniform mode," the control method determines tint states for the zones based on criteria other than for purpose of daylighting.

7. Feedback Learning Multi-Zone Preferences/Occupancy Patterns

In certain aspects, the control logic used to control the tint states of the tinting zones/windows is based on feedback learning of preferences and occupancy patterns. For example, the locations of an occupant at different times/dates as determined by sensors, from user input, etc. may be stored as occupancy patterns. These locations of occupancy at different times/dates may be used to predict the locations of the occupant at a future time. The control method may then control the tint states based on the predicted locations of the occupant.

As another example, user input selecting certain tint states at certain times for different tinting zones may be stored. These tinting selections of the user may be used to predict the tint states that may be desired in the room. The control method may then control the tint states according to these predicted tint states desired by the user.

8. Light Projections into Room Used to Determine Glare Condition

In certain implementations, control logic includes instructions that determine whether direct sunlight through a tinting zone generates a glare condition in an occupancy region by calculating a three-dimensional projection of light from the tinting zone through the room. The three-dimensional projection of light may be considered to be a volume of light in a room where the outside light directly penetrates into the room. For example, the three dimensional projection may be defined by parallel light rays from the sun through a tinting zone of the multi-zone window. The direction of the three-dimensional projection into the room is based on Sun azimuth and/or sun altitude that can be calculated with a solar calculator based on the time of day and the longitudinal and latitudinal coordinates of the window. The three-dimensional projection of light can be used to determine intersections with occupancy regions in the room. The control logic determines the light projection at a particular plane and determines the amount that the light projection or a glare area associated with the light projection overlaps with the occupancy region. If the light projection is outside of the occupancy region, a glare scenario is determined to not exist. Details of control logic that uses three-dimensional projection of light to determine glare scenarios is described in PCT application PCT/US15/29675, filed on May 5, 2015 and titled "CONTROL METHOD FOR TINTABLE WINDOWS," which is hereby incorporated by reference in its entirety.

Figure 28A:
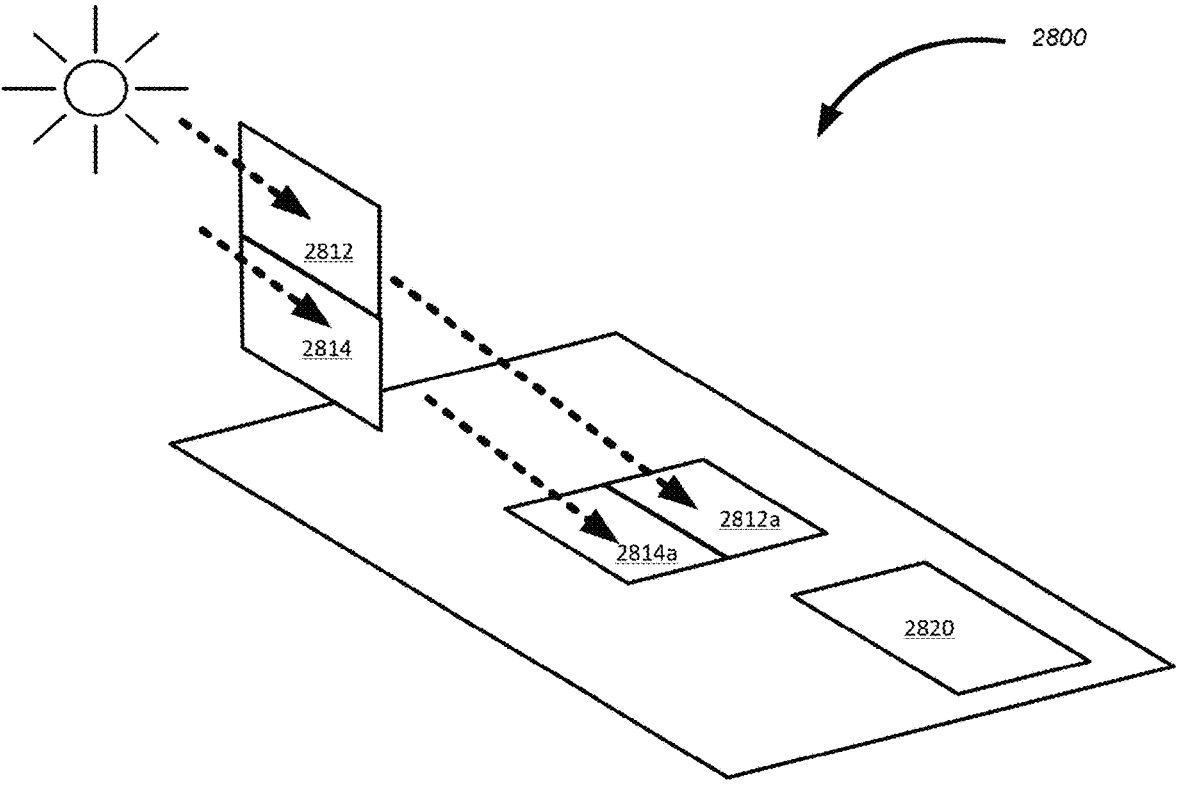
FIGS. 28A, 28B, and 28C are schematic drawings of a view of a room having a multi-zone window and three-dimensional light projections through the tinting zones, according to an embodiment.
Figure 28B:
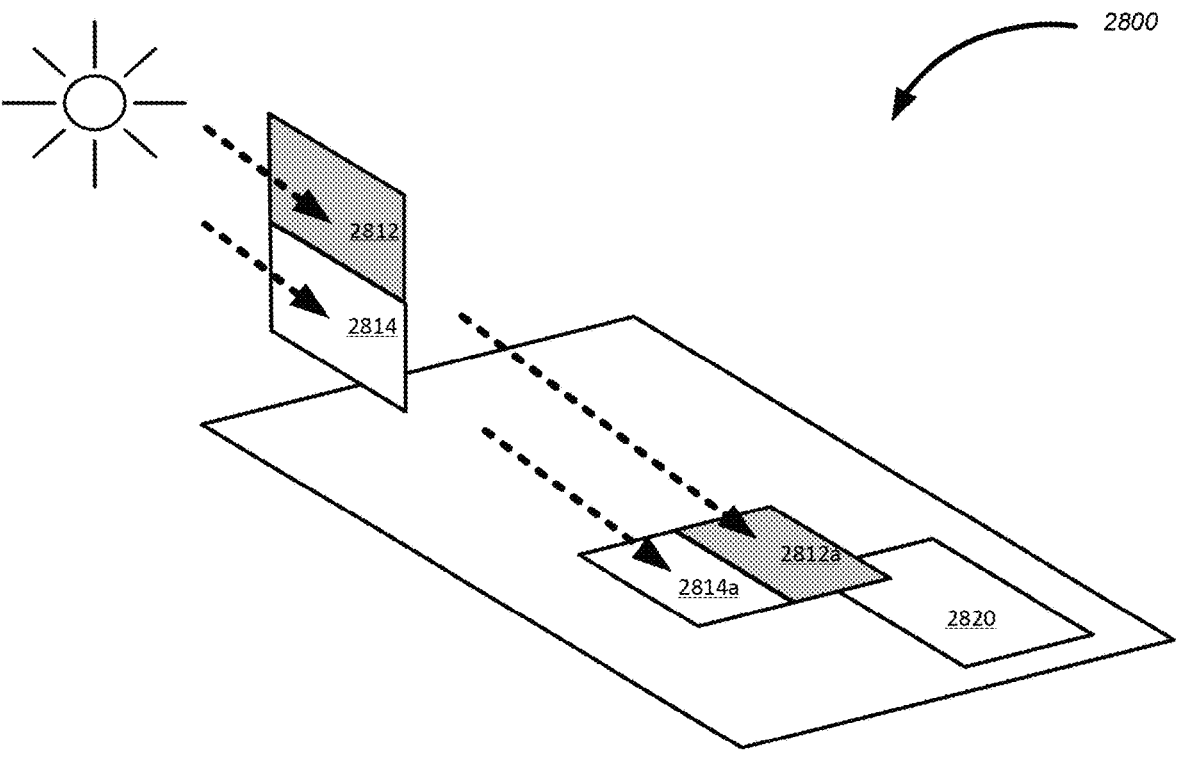
Figure 28C:
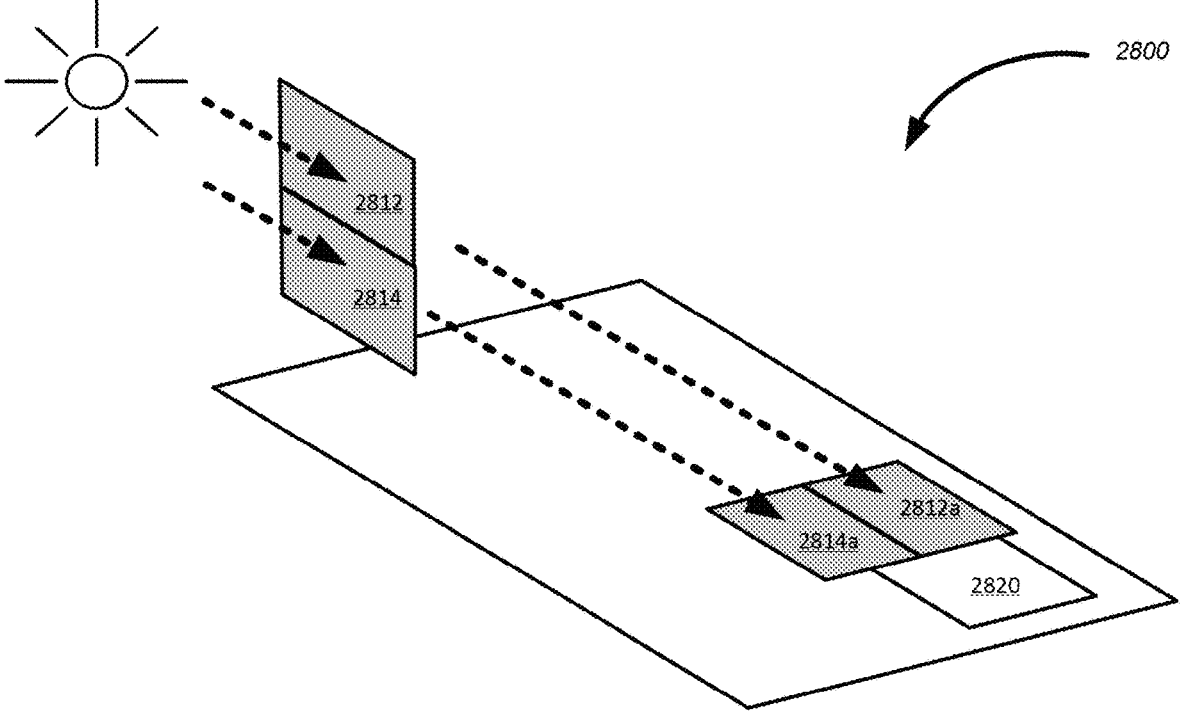

FIGS. 28A, 28B, and 28C are schematic drawings of a perspective view of a room (vertical walls not shown) 2800 having a multi-zone window 2810 with a first tinting zone

2812 and a second tinting zone 2814 in a vertical wall between the outside of a building and the inside of the room 2800, according to an embodiment. FIGS. 28A, 28B, and 28 illustrate respectively three different sunlight scenarios where sunlight is shining through the multi-zone window 2810 in three different directions 2850, 2860, 2870 (depicted as dotted arrows) associated with different positions of the sun. In the illustrated example, the room 2800 has an occupancy region 2820 that is a position or likely position of an occupant. The occupancy region 2820 may be, for example, a desk or another workspace. In this example, the occupancy region 2820 is defined as a two dimensional area on the floor of the room 2800. In the illustrated example, sunlight (depicted as directional arrows) is impinging the first tinting zone 2812 and second tinting zone 2814 of the multi-zone window 2810. Using control logic, a projection of light from each of the two tinting zones 2812, 2814 and through the room 2800 is determined based on the position of the sun. The control logic determines a two-dimensional light projection through each tinting zone, 2812a and 2814a, respectively, at the plane of the occupancy region 2820, which is coplanar to the surface of the floor of the room 2800. In the illustrated example, a first two-dimensional light projection 2812a is depicted through the first tinting zone 2812 and a second two-dimensional light projection 2814a is depicted through the second tinting zone 2814 on the floor of the room 2800. The control logic then determines whether a two-dimensional light projection from a tinting zone intersects the occupancy region. If a two-dimensional light projection intersects the occupancy region, the control logic places (holds or transitions to) the corresponding tinting zone in a darkened tint state. Although two tinting zones are shown, it would be understood that additional zones and/or different locations of tinting zones would apply using a similar method.

In the first scenario shown in FIG. 28A, for example, neither of the two-dimensional light projections 2812a, 2814a through the tinting zones 2812, 2814 intersects the occupancy region 2820. In this case, the tinting zones 2812, 2814 are placed in a clear state.

In the second scenario shown in FIG. 28B, the first two-dimensional light projection 2812a intersects the occupancy region 2820 and the second two-dimensional light projection 2814a does not intersect the occupancy region 2820. In this scenario, the first tinting zone 2812 is placed in a darkened tint state to avoid a glare scenario. Since the second two-dimensional light projection 2814a does not intersect the occupancy region 2820, the second tinting zone 2814 is placed in a clear state.

In the third scenario shown in FIG. 28C, both the first two-dimensional light projection 2812a and the second two-dimensional light projection 2814a intersect the occupancy region 2820. In this scenario, the first tinting zone 2812 and the second tinting zone 2814 are placed in a darkened tint state to avoid a glare scenario on the occupancy region 2820.

Although the illustrated example in FIGS. 28A, 28B, and 28C includes a multi-zone tintable window, a similar technique would also apply to separate and adjacent tintable windows. For example, a room may have two separate and adjacent tintable windows in a vertical wall between the outside of a building and the inside of the room. Using control logic, a three-dimensional projection of light from each tintable window is directed through the room based on the position of the sun. The control logic determines a two-dimensional light projection through each window at the plane of the occupancy region. The control logic then determines whether a two-dimensional light projection from each window intersects the occupancy region. If the two-dimensional light projection intersects the occupancy region, the control logic places (holds or transitions to) the corresponding window in a darkened tint state.

Although certain embodiments are described herein with respect to independently controlling multiple tinting zones of a multi-zone tintable window, it would be understood that similar techniques could apply to controlling multiple tintable windows (multi-zone or single-zone) of set of tintable windows. For example, a building could have an assembly of tintable windows on a facade of a building or in a room. he techniques described herein could be used to independently control the tintable windows of the assembly. That is, each tintable window may have one or more tinting zones and the techniques independently control the tinting zones of the tintable windows in the assembly.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Python using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A multi-zone electrochromic window comprising a monolithic electrochromic device, the monolithic electrochromic device configured to provide multiple tint regions comprising:

a lightly tinted region in a first vertical position on the multi-zone electrochromic window;

a darkly tinted region in a second vertical position on the multi-zone electrochromic window, having a programmably changeable tint state; and a gradient tinting region in a third vertical position between the first vertical position and the second vertical position, wherein the gradient tinting region separates the lightly tinted region from the darkly tinted region by a width of about 2-20 inches;

wherein the lightly tinted region and the darkly tinted region are uniformly tinted, and the gradient tinting region has a tinting gradient between a tint state of the lightly tinted region and the programmably changeable tint state of the darkly tinted region;

wherein the gradient tinting region comprises a resistive zone; and wherein an electrical resistivity and/or resistance to ion movement for the resistive zone is greater than an electrical resistivity and/or resistance to an ion movement for the lightly tinted region and the darkly tinted region.

2. The multi-zone electrochromic window of claim 1, wherein a portion of the lightly tinted region and a portion of the darkly tinted region overlap to form the gradient tinting region.

3. The multi-zone electrochromic window of claim 1, wherein the lightly tinted region is at a higher altitude than the darkly tinted region.

4. The multi-zone electrochromic window of claim 1, wherein the lightly tinted region is at a lower altitude than the darkly tinted region.

5. The multi-zone electrochromic window of claim 1, wherein the gradient tinting region separates the lightly tinted region from the darkly tinted region by a width of about 10-15 inches.

6. The multi-zone electrochromic window of claim 1, wherein the gradient tinting region separates the lightly tinted region from the darkly tinted region by a width of about 5 inches.

7. The multi-zone electrochromic window of claim 1, wherein the gradient tinting region reduces contrast between the lightly tinted region and the darkly tinted region.

8. The multi-zone electrochromic window of claim 1, wherein the lightly tinted region comprises a daylighting tinting zone.

9. The multi-zone electrochromic window of claim 8, wherein the daylighting tinting zone comprises a zone in a bleached state.

10. The multi-zone electrochromic window of claim 1, wherein the darkly tinted region blocks between 95% and 99% of a solar spectrum.

11. The multi-zone electrochromic window of claim 1, configured to change the programmably changeable tint state of the darkly tinted region from a first uniform tint state to a second uniform tint state lighter than the first uniform tint state.

12. The multi-zone electrochromic window of claim 1 wherein the darkly tinted region and lightly tinted region are adjacent on opposite sides to the resistive zone, and wherein the ion movement is at a given rate in the darkly tinted region, and wherein the resistive zone reduces ion movement from the darkly tinted region to the lightly tinted region to a rate lower than the given rate.

* * * * *